United States Patent
Tepper et al.

(10) Patent No.: US 7,390,343 B2
(45) Date of Patent: *Jun. 24, 2008

(54) DRINKING WATER FILTRATION DEVICE

(75) Inventors: Frederick Tepper, Sanford, FL (US); Leonid A. Kaledin, Port Orange, FL (US)

(73) Assignee: Argonide Corporation, Sanford, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 11/680,840

(22) Filed: Mar. 1, 2007

(65) Prior Publication Data
US 2007/0175196 A1 Aug. 2, 2007

Related U.S. Application Data

(63) Continuation-in-part of application No. 11/677,705, filed on Feb. 22, 2007, which is a continuation-in-part of application No. 11/531,107, filed on Sep. 12, 2006, now Pat. No. 7,311,752.

(60) Provisional application No. 60/744,043, filed on Mar. 31, 2006, provisional application No. 60/716,218, filed on Sep. 12, 2005.

(51) Int. Cl.
*C02F 1/00* (2006.01)

(52) U.S. Cl. .............................. 55/527; 55/523; 55/528; 55/DIG. 39; 95/273; 95/285; 210/660; 210/500.1; 210/505; 210/510.1; 423/627; 423/629; 436/177

(58) Field of Classification Search .................. 55/527, 55/528, 523, DIG. 39; 95/273, 285; 210/660, 210/500.1, 505, 510.1; 423/627, 629; 436/177
See application file for complete search history.

(56) References Cited

U.S. PATENT DOCUMENTS

| 2,773,601 A | 12/1956 | Keller et al. |
| 2,783,894 A | 3/1957 | Lovell et al. |
| 2,915,475 A * | 12/1959 | Bugosh ....................... 516/94 |

(Continued)

FOREIGN PATENT DOCUMENTS

DE 2410215 A 9/1974

(Continued)

OTHER PUBLICATIONS

Ahuja, S., Handbook of Bioseparations, Academic Press, 2000, TOC.

(Continued)

*Primary Examiner*—Duane Smith
*Assistant Examiner*—Minh-Chau T. Pham
(74) *Attorney, Agent, or Firm*—Alicia M. Passerin, Esq.; Cohen & Grisby, P.C.

(57) ABSTRACT

The invention is a device for purifying drinking water that has at least one fibrous structure. Preferably, there is an upstream and downstream fibrous structure. Each fibrous structure is a mixture of nano alumina fibers and second fibers arranged in a matrix to create asymmetric pores and to which fine, ultrafine, or nanosize particles are attached. Preferably, the device has an upstream antimicrobial for sterilization of retained microbes. The device is substantially more efficient at removing soluble contaminants such as halogens from a fluid stream than those previously available and is also able to retain turbidity, bacteria, and virus.

30 Claims, 20 Drawing Sheets

U.S. PATENT DOCUMENTS

| | | | |
|---|---|---|---|
| 3,031,417 A | 4/1962 | Bruce | |
| 3,234,075 A * | 2/1966 | Braitberg | 162/161 |
| 3,242,073 A | 3/1966 | Guebert et al. | |
| 3,352,424 A | 11/1967 | Guebert et al. | |
| 3,408,315 A | 10/1968 | Piane | |
| 3,852,202 A * | 12/1974 | Wells et al. | 507/205 |
| 3,947,562 A | 3/1976 | Grimshaw et al. | |
| 4,007,113 A | 2/1977 | Ostreicher | |
| 4,007,114 A | 2/1977 | Ostreicher | |
| 4,059,119 A | 11/1977 | Grossman | |
| 4,149,549 A | 4/1979 | Grossman | |
| 4,178,438 A | 12/1979 | Haase et al. | |
| 4,230,573 A | 10/1980 | Kilty et al. | |
| 4,242,226 A | 12/1980 | Siren | |
| 4,282,261 A | 8/1981 | Greene | |
| 4,288,462 A | 9/1981 | Hou et al. | |
| 4,305,782 A | 12/1981 | Ostreicher et al. | |
| 4,309,247 A | 1/1982 | Hou et al. | |
| 4,321,288 A | 3/1982 | Ostreicher | |
| 4,331,631 A | 5/1982 | Chapman et al. | |
| 4,366,068 A | 12/1982 | Ostreicher et al. | |
| 4,395,332 A | 7/1983 | Klein | |
| 4,433,697 A | 2/1984 | Cline et al. | |
| 4,455,187 A | 6/1984 | von Blucher et al. | |
| 4,473,474 A | 9/1984 | Ostreicher et al. | |
| 4,510,193 A | 4/1985 | Blucher et al. | |
| 4,523,995 A | 6/1985 | Pall et al. | |
| 4,536,440 A | 8/1985 | Berg | |
| 4,555,347 A | 11/1985 | O'Dowd et al. | |
| 4,604,208 A | 8/1986 | Chu et al. | |
| 4,606,823 A | 8/1986 | Lucas, III | |
| 4,617,128 A | 10/1986 | Ostreicher | |
| 4,664,683 A | 5/1987 | Degen et al. | |
| 4,673,504 A | 6/1987 | Ostreicher et al. | |
| 4,677,019 A | 6/1987 | von Blucher | |
| 4,708,803 A | 11/1987 | Ostreicher et al. | |
| 4,711,793 A | 12/1987 | Ostreicher et al. | |
| 4,743,418 A | 5/1988 | Barnes, Jr. et al. | |
| 4,761,323 A | 8/1988 | Muehlratzer et al. | |
| 4,807,619 A | 2/1989 | Dyrud et al. | |
| 4,824,451 A | 4/1989 | Vogt et al. | |
| 5,085,784 A | 2/1992 | Ostreicher | |
| 5,104,546 A | 4/1992 | Filson et al. | |
| 5,109,311 A | 4/1992 | Hanazono et al. | |
| 5,126,044 A | 6/1992 | Magnusson et al. | |
| 5,147,722 A | 9/1992 | Koslow | |
| 5,189,092 A | 2/1993 | Koslow | |
| 5,219,577 A | 6/1993 | Kossovsky et al. | |
| 5,225,078 A | 7/1993 | Polasky et al. | |
| 5,307,796 A | 5/1994 | Kronzer et al. | |
| 5,350,443 A | 9/1994 | von Blucher et al. | |
| 5,366,636 A | 11/1994 | Marchin et al. | |
| 5,486,292 A | 1/1996 | Bair et al. | |
| 5,562,824 A | 10/1996 | Magnusson | |
| 5,744,236 A | 4/1998 | Rohrbach et al. | |
| 5,759,394 A | 6/1998 | Rohrbach et al. | |
| 5,798,220 A | 8/1998 | Kossovsky et al. | |
| 5,804,295 A | 9/1998 | Braun et al. | |
| 5,855,788 A | 1/1999 | Everhart et al. | |
| 5,865,968 A | 2/1999 | Denton et al. | |
| 6,010,606 A | 1/2000 | Denton et al. | |
| 6,057,488 A | 5/2000 | Koper et al. | |
| 6,077,588 A | 6/2000 | Koslow et al. | |
| 6,197,515 B1 | 3/2001 | Bamdad et al. | |
| 6,235,388 B1 | 5/2001 | Yamamoto et al. | |
| 6,290,848 B1 | 9/2001 | Tanner et al. | |
| 6,321,915 B1 | 11/2001 | Wilson et al. | |
| 6,355,330 B1 | 3/2002 | Koslow et al. | |
| 6,402,819 B1 | 6/2002 | DeRuiter et al. | |
| 6,464,757 B2 | 10/2002 | Zhang et al. | |
| 6,514,413 B2 | 2/2003 | Pimenov et al. | |
| 6,524,477 B1 | 2/2003 | Hughes | |
| 6,550,622 B2 | 4/2003 | Koslow | |
| 6,630,016 B2 | 10/2003 | Koslow | |
| 6,716,218 B2 | 4/2004 | Holmes et al. | |
| 6,716,525 B1 | 4/2004 | Yadav et al. | |
| 6,797,167 B2 | 9/2004 | Koslow | |
| 6,830,822 B2 | 12/2004 | Yadav | |
| 6,838,005 B2 | 1/2005 | Tepper et al. | |
| 6,849,109 B2 | 2/2005 | Yadav et al. | |
| 6,872,311 B2 | 3/2005 | Koslow | |
| 6,872,431 B2 | 3/2005 | Kahlbaugh et al. | |
| 6,913,154 B2 | 7/2005 | Koslow | |
| 6,953,604 B2 | 10/2005 | Koslow | |
| 6,955,708 B1 | 10/2005 | Julos et al. | |
| 6,959,820 B2 | 11/2005 | Koslow | |
| 2003/0127393 A1 | 7/2003 | Tepper | |
| 2005/0029198 A1 | 2/2005 | Tepper et al. | |
| 2006/0123991 A1 | 6/2006 | Braeunling et al. | |
| 2006/0169144 A1 | 8/2006 | Forslund | |
| 2006/0225574 A1 | 10/2006 | Braeunling et al. | |

FOREIGN PATENT DOCUMENTS

| | | |
|---|---|---|
| DE | 2510467 A | 9/1976 |
| EP | 0099586 | 2/1984 |
| EP | 0958851 A | 11/1999 |
| EP | 1 219 335 | 7/2002 |
| GB | 2045828 A | 11/1980 |
| WO | 98/02231 A1 | 1/1998 |
| WO | WO 99/47456 | 9/1999 |

OTHER PUBLICATIONS

Farrah, S.R. et al., Concentration of Viruses from Water by Using Cellulose Filters Modifies by In-situ Precipitation of Ferric and Aluminum Hydroxides, Appl Envir Micro, 1985.

Gitzen, W.H., Alumina as a Ceramic Material, American Ceramic Soc., Special Pub. 4, 1970, 13-14, TOC.

Hou, K. et al., Capture of Latex Beads, Bacteria, Endotoxin and Viruses by Charge-Modified Filters, Appl Envir Micro, Nov. 1980, 892-96.

Khalil, K., Synthesis of Short Fibrous Boehmite Suitable for Thermally Stabilized Transition Aluminas Formation, Journal of Catalysis, 1198 (178):198-206, Abstract.

Lukasik, J. et al., Influence of Salts on Virus Adsorption to Microporous Filters, Appl Environ Micro, 66: 2914-20.

Lukasik, J. et al., Removal of Microorganisms from Water by Columns Containing Sand Coated with Ferric and Aluminum Hydroxides, Wat Res 33(3): 769-77, 1999, Abstract.

Sobsey, M.D. et al., Concentration of Poliovisur from Tap Water Using Positively Charged Microporous Filters, Appl Enviro Micro, 1979: 588-595.

Tepper, F., Nanosize Powders Produced by Electro-Explosion of Wire and Their Potential Applications, Argonide Corporation, Sanford, FL, Abstract, 2000.

Robinson et al., Depyrogenation by Microporous Membrane Filters, Tech Rpt No. 7, Depyrogenation, Parenteral Drug Assn, Phila, PA, 1985, TOC.

Blackford, D.B. et al., Alteration in the Performance of Electrostatic Filters Caused by Exposure to Aerosols, 4th World Filtration Congress, 7.27-7.33.

Wilkie, A.E. et al., Multi-Component Fiber Technology for Medical and Other Filtration Applications, 1st Inter. Conf. on Med. Filtration, DE Oct. 19, 2002.

Raynor, P.C. et al., The Long-Term Performance of Electrically Charged Filters in a Ventilation System, J. of Occ. and Envir. Hygiene, vol. 1(7): 463-471, Jul. 2004.

Martin, S.M. et al., Electrostatic Respirator Filter Media: Filter Efficiency and Most Penetrating Particle Size Effects, Appl. Occ. & Enviro. Hygiene vol. 15(8):609-17, 2000.

Moyer, E.S. et al., Electrostatic N-95 Respirator Filter Media Efficiency Degradation Resulting from Intermittent NaCl Aerosol Expos., Appl. Occ. & Envir. Hyg. 15(8): 600-8.

Brown, R.C. et al., Effect of Industrial Aerosols on the Performance of Electrically Charged Filter Material, Hyg. vol. 32(3): 271-94, 1988.

Henderson, D.W. et al., An Apparatus for the Study of Airborne Infection, J. Hyg. Camb. vol. 50, p. 53-67, 1952.

Johnson, P.R., Whadaya Mean?, Filtration News vol. 20(5): 10-11, 2002.

Tien, Chi, Adsorption Calculations and Modeling, 1994 Butterworth-Heinemann (TOC provided).

Mandaro, Charge Modified Depth Filters: Cationic-Charge Modified Nylon Membranes, in Filtration in the Pharmaceutical Industry, T.H. Meltzer Ed., Marcel Dekker, Inc., NY, 1987.

Sinha, D., Pretreatment Process Considerations for the Semiconductor Industry, in Ultrapure Water 7(6): 21-30, 1990.

Dicosmo et al., Cell Immobilization by Adsorption to Glass Fibre Mats, A.A. Veliky et al., Ed., Blackie Academic & Professional, 1994.

Farrah, S.R. et al., Adsorption of Viruses by Diatomaceous Earth Coated with Metallic Oxides and Metallic Peroxides, Water Sci. Tech. 24(2): 235-40, 1991 (abstract).

Katz, J. et al., Mestastable Nanosized Aluminum Powder as Reactant in Energetic Formulations, 1-7.

Meltzer, T.H. et al., Filtration in Biopharmaceutical Industry, Marcel Dekker, NY, 262-265, 1998.

Willkommen, H., Virus Validation of Filtration Procedures, PDA/FDA Viral Clearance Forum, Bethesda, MD, Oct. 2001.

Khalil, K., Synthesis of Short Fibrous Boehmite Suitable for Thermally Stabilized Transition Aluminas Formation, Journal of Catalysis, 1998(178): 198-206.

Lukasik, J. et al., Removal of Microorganisms from Water by Columns Containing Sand Coated with Ferric and Aluminum Hydroxides, Wat. Res. 33(3): 769-77, 1999.

\* cited by examiner

DRINKING WATER FILTRATION DEVICE

CROSS-REFERENCE TO RELATED APPLICATIONS

This application is a continuation-in-part application of U.S. patent application Ser. No. 11/677,705, entitled "Non-Woven Media Incorporating Ultrafine or Nanosize Particles," filed on Feb. 22, 2007, which is a continuation-in-part application of U.S. patent application Ser. No. 11/531,107, entitled "Electrostatic Air Filter," filed on Sep. 12, 2006, now U.S. Pat. No. 7,311,752 B2 which claims priority to U.S. Provisional Patent Application No. 60/716,218 entitled "Electrostatic Air Filter," filed on Sep. 12, 2005, and which also claims priority to U.S. Provisional Patent Application No. 60/744,043, entitled "Metal Impregnated Nano Alumina Fiber Composition," filed on Mar. 31, 2006.

STATEMENT OF GOVERNMENTAL RIGHTS

The subject invention was made subsequent to a research project supported by the U.S. Air Force under Contract FA8650-0-05-M5822. Accordingly, the government has certain rights in this invention.

FIELD OF THE INVENTION

The present invention relates to a filtration device, and particularly to a filtration device comprising an antimicrobial source and fibrous structure comprising powdered activated carbon for filtration of soluble and particulate contaminants including chlorine, iodine, halogenated hydrocarbons, pesticides, sediment, cysts, bacteria and virus.

BACKGROUND

The prior art provides many types of materials which filter water soluble contaminants as well as particulate matter. These filters, while fairly effective in the applications for which they were designed, do not reduce the contaminant level sufficiently. Such filters are expected to meet environmental guidelines, while having higher dirt holding capacity, lower pressure drop, lower cost and greater durability. They include those for point of entry (POE, for example, whole house or whole building), point of use (POU, for example, at a specific faucet), in a pitcher, or in a portable device. Pitchers and many portable devices require a low pressure drop, since flow must be achieved by a manually driven pump, by gravity, or by suction, as in a straw device. As the particulate reduction requirements increase, thicker filters become necessary, with commensurate increases in pressure drop.

The need for safe drinking water is growing rapidly, particularly in the developing world, Rapid population growth in China is stressing water supplies and there is little focus on improvement of municipal water systems, particularly in rural areas. For years locals have relied on the river to provide them with drinking water and to irrigate their crops. Now, though, many of those same people are dying of cancer. Many small hamlets have joined the ranks of what China's media calls the country's "cancer villages."

The situation is graver in African communities, where most of the time there is no power or local sources of water, and drinking water is carried from heavily contaminated surface sources. The death rate from gastro-intestinal diseases is endemic throughout these areas, and millions, particularly infants, die from waterborne diseases.

Fibrous media is used to remove microbial pathogens. Activated carbon is capable of removing the bad taste and odor from water as well as chlorine and other reactive chemicals such as halogenated hydrocarbons and pesticides that can be carcinogenic. Ion exchange resins are used to remove metal and other ions from water. However, no single material or chemical exists that is able to remove all contaminants.

Granular activated carbon (GAC), useful for retaining many soluble contaminants, is difficult to design into useful filters, particularly where the device is portable and subject to vibration and motion. Loose particles migrate causing channeling and clogging of the bed. Carbon filter blocks are readily fouled by small particles, and a prefilter is necessary to protect them.

Non-woven fibrous media are used extensively for filtering water of both particulate and chemical contaminants. Such a structure minimizes channeling and also allows significant filter design variations. Non-wovens are manufactured by low cost assembly methods such as paper making and are used extensively in residential and commercial water purification devices.

While having approximately equivalent (BET) surface area and iodine number, powdered activated carbon (PAC) has higher external surface area than GAC and it is generally recognized that it would have superior adsorption kinetics than GAC. However, combining it into a non-woven matrix is difficult because adhesives are required to attach it to the fiber matrix. U.S. Pat. No. 5,759,394 states that "The very act of using an adhesive to hold the particles results in a portion of the surface of the powder particles being contaminated by the adhesive and therefore becoming ineffective for filtration. A balance has to be met between the strength of the immobilization versus the maintaining of effectiveness of the powder layer. In order to minimize this contamination, larger particles are often used so that the point of contact between the surface adhesive and powder particles is small. In typical gaseous applications using activated carbon the particles are frequently 100 microns and larger; and, finely powdered activated carbon is basically only used in liquid decolorization applications despite the fact that fine powder activated carbon holds the potential of much more rapid kinetics".

Preferred filters would remove taste and odor-causing small molecules, cysts such as *Cryptosporidium*, bacteria, virus, turbidity (that might be toxic and might also harbor pathogens), chlorine and halogenated organics formed by chlorination of pathogens, and organic matter. The U.S. EPA Guide Standard provides criteria for mechanical filters for drinking water. Retention should be >6 LRV (log retention value) for bacteria, >4 LRV for virus and >3 LRV for cysts, while in a background of A2 fine test dust, an organic contaminant and under adverse conditions of salinity, pH and temperature.

Iodine has been used to sterilize drinking water. Problems arise because it is necessary to enrich the water with a large quantity of iodine (at least 1 mg/l). The iodine has to remain in contact with the water for a long time, followed by the subsequent removal of iodine from the outflowing water. At iodine concentrations in water exceeding 4 mg/l, water acquires a distinct iodine odor. Long term consumption of iodinated water affects the thyroid gland. Scavenging of iodine downstream of the filter is necessary to assure a concentration below 0.5 µg/l.

Given this, there is a need among consumers for drinking water filter devices with better adsorption efficiency for soluble contaminants, superior microbial and particulate retention and that also has a low pressure drop, and preferably a pressure drop that is low enough to be used with gravity feed.

SUMMARY OF THE INVENTION

The present invention meets these needs. In an embodiment, the present invention is a new particulate filter or filter media for gaseous media that satisfies the need for a high efficiency and high capacity particulate filter that intercepts pathogens and other particulate matter from air or gas streams, including liquid aerosolized particulate matter while also having a low pressure drop.

In another embodiment, the present invention satisfies the need for a non-woven fibrous medium that retains ultrafine or nano particles without the need for binders or adhesives.

Accordingly, it is an object in an embodiment of the present invention to provide a filtration efficiency that is at least as high as conventional HEPA filters and that is resistant to liquid aerosol clogging.

It is yet another object in an example of an embodiment of the invention to provide a media that filters aerosolized bacteria and viruses.

It is a further object in an example of an embodiment of the present invention to produce an air filter that has a high porosity and is therefore more tolerant of adsorbing aqueous mists than conventional filter material.

It is still a further object in an example of an embodiment of the invention to provide media that has a filtration efficiency that is at least as high as conventional ULPA or Super ULPA filters.

It is still a further object in an example of an embodiment of the invention to provide a filter media that has a pressure drop that is lower than that which occurs in conventional filters.

It is still a further object in an example of an embodiment of the invention to provide a filter media that has a larger pore size and higher porosity than that in HEPA filters, therefore providing for a higher capacity for water droplets before flooding.

It is still a further object in an example of an embodiment of the invention to provide a filter media that is energy-efficient.

It is yet another object in an example of an embodiment of the present invention to provide a filter media that has an extended filter life compared to conventional filters.

It is yet another object in an example of an embodiment of the present invention to provide a filter media that has low maintenance costs.

It is still a further object in an example of an embodiment of the present invention to provide a filter media that filters hazardous waste materials and that has minimal costs associated therewith.

It is yet another object in an example of an embodiment of the present invention to provide a filter media that is strong enough to be pleated.

It is another object in an example of an embodiment of the present invention to provide a method of manufacture of a filter or filter media that filters gaseous media at a filtration efficiency that is at least as high as conventional HEPA filters and that is resistant to liquid aerosol clogging.

It is yet another object in an example of an embodiment of the present invention to provide a method of using a filter or filter media to remove particulates and aerosols from gaseous media.

It is another object in an embodiment of the present invention to provide a non-woven fiber matrix into which nanostructures are engineered at a low manufacturing cost It is also object in an embodiment of the present invention to provide a non-woven medium that removes soluble and volatile organics and halogens from fluid and gas streams at high efficiency, high capacity, and with a low pressure drop.

It is yet another object in an embodiment of the present invention to provide a chemical sorption medium that also filters particulates, including microbial pathogens, from fluid media.

It is also an object in an embodiment of the present invention to incorporate powdered, nano size catalysts, including photocatalysts, oxidation catalysts, or powdered activated carbon impregnated with catalysts, into a non-woven medium by attaching the catalysts or powdered activated carbon to a non-woven scaffold.

It is still a further object in an embodiment of the present invention to engineer a non-woven medium containing ultrafine or nanosize powder that is held to the medium to minimize dusting.

It is still a further object in an embodiment of the present invention to incorporate finely powdered or nanosize ion exchange resins and macroporous polymers into a non-woven medium.

It is still a further object in an embodiment of the present invention to incorporate biologically active components such as DNA or RNA into a non-woven medium.

It is another object in an embodiment of the present invention to provide a method for incorporating nano size pigments, color reactant chemicals, and fine abrasives into a non-woven medium.

It is yet another object in an embodiment of the present invention to provide a device for purifying drinking water that filters soluble and particulate contaminants from the drinking water.

It is still another object in an embodiment of the present invention to provide a device that is able to be gravity fed.

It is yet another object in an embodiment of the present invention to provide a device that is capable of sanitizing water to greater than 6 LRV of bacteria, 4 LRV of virus, and 3 LRV of cysts.

Generally, the present invention is a filter or fibrous structure for fluids comprising nano alumina fibers that adsorb particles from the fluid and a plurality of second fibers arranged in a matrix with the nano alumina fibers to create asymmetrical pores. In an example, the second fibers are comprised of fibers whose minor dimension is larger than the minor dimension of the nano alumina fibers by about one order of magnitude. The second fibers are included with the nano alumina fibers in order to provide a scaffolding for creating pores or large interfiber spaces into or onto which nano alumina fibers are dispersed. In examples, the asymmetric pore size is greater than about 5 µm. In an embodiment, a plurality of fine, ultrafine, or nanosize particles are deposited onto the nano alumina fibers to improve removal of contaminants from the fluid medium.

Coarse fibers provide or form larger pores into or onto which nano alumina fibers are dispersed. However, coarse fibers have less surface area per unit volume or mass, and therefore the amount of nano alumina dispersed thereon or in the pores is significantly reduced. Therefore, in another embodiment, second fibers are comprised of a combination of coarse and fine fibers. The inclusion of fine fibers provides additional surface area so that more nano alumina fibers can be loaded into or onto the media.

While not wishing to be bound by theory, ultra fine and nanosize particles that have diameters that are smaller than the average pore size of the filter media are retained by electroadhesive forces on the nano alumina fibers. Particles larger than the pore size of the media are held largely by mechanical entrainment. No binders are used in the fibrous structure that would envelop or otherwise desensitize the particles deposited onto the nano alumina fibers.

In another embodiment, the invention is a water filtration device comprising at least one fibrous structure. Each fibrous structure comprises nano alumina fibers and second fibers mixed therewith, the second fibers being arranged to create asymmetric pores. Preferably, the water filtration device comprises 1+y upstream fibrous structures, where y is any integer from 0 to y, and preferably 0 to 5, and 1+n downstream fibrous structures, where n is any integer from 0 to n, and preferably 0 to 10. In an example, the upstream and downstream fibrous structures are unified in a single fibrous structure. In a preferred example, at least one of the upstream and/or downstream fibrous structures further comprises a plurality of particles deposited on the nano alumina fibers. Preferably, the particles comprising at least one of the upstream fibrous structure are an antimicrobial such as iodine or silver. In an example, the antimicrobial is impregnated in powdered activated carbon. In a more preferred example, at least one of the downstream fibrous structure also comprises a plurality of particles, such as powdered activated carbon, deposited on the nano alumina fibers to catch any particles that are shed from the upstream fibrous structure during filtration. In another example, at least one of the downstream fibrous structures comprises nano alumina fibers and second fibers mixed therewith in order to catch any particles that are shed during filtration.

In another embodiment, the invention is directed to methods of manufacturing the filter medium or fibrous structure.

In another embodiment, the invention is directed to methods of using the nano alumina filter media or fibrous structure to remove toxic contaminants and other particulate matter from fluid streams.

These and other details, objects and advantages of the present invention will become better understood or apparent from the following descriptions, examples, and figures showing embodiments thereof.

BRIEF DESCRIPTION OF THE FIGURES

FIG. 13 is a graphical depiction of the relationship between the pressure drop and pore size as a function of fiber diameter.

FIG. 14 is a comparison of pressure drop of the claimed nano alumina filter media and a sub-HEPA filter.

FIG. 15 is a transmission electron micrograph of a nano alumina fiber on a microglass fiber enveloped by nanospheres of silica.

FIG. 16 is a graphical depiction of the adsorption of soluble iodine by the claimed nano alumina fibers compared to adsorption by commercially available media containing activated carbon.

FIG. 17 is a transmission electron micrograph of a nano alumina fiber attached to a microglass fiber.

FIG. 18 is a graphical depiction showing the effect of iodine adsorption by three layers of filter media.

FIG. 19 is a schematic of an example of the claimed filter device.

FIG. 20 is a schematic of an example of the claimed filter device.

DETAILED DESCRIPTION

Definitions

In order to properly understand the disclosure of the claimed invention, certain terms used herein are described in the following paragraph. While the inventors describe the following terms, the inventors in no way intend to disclaim the ordinary and accustomed meanings of these terms.

The term "electrostatic" as used herein is defined as of or relating to electric charges.

The term "aspect ratio" as used herein is defined as the ratio of the longitudinal length of a fiber to the cross-sectional diameter of the fiber.

The term "nano alumina" as used herein is defined as fibers having an aspect ratio in excess of about 5, where the smallest dimension is less than about 50 nm. The cross section of the fiber may be either circular (cylindrical fiber) or rectangular (platelet) in shape. The fibers are comprised of alumina, with various contents of combined water to result in compositions principally of AlOOH with various amounts of $Al(OH)_3$, with possible impurities of gamma and alpha alumina.

The term "lyocell" as used herein refers to a fibrillated cellulose fiber precipitated from an organic solution in which no substitution of hydroxyl groups takes place and no chemical intermediates are formed (Courtaulds, Ltd.).

Figure 1:
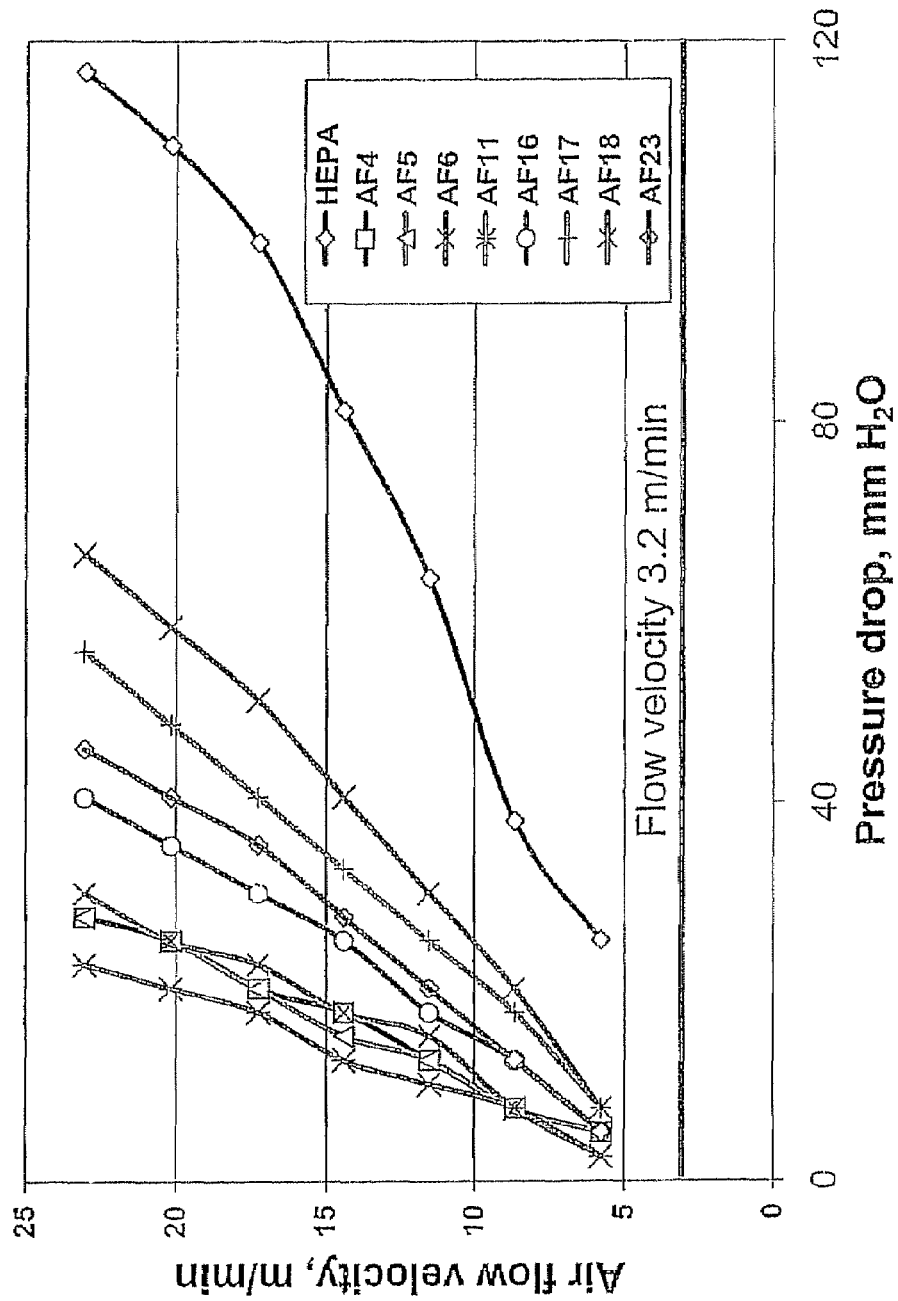
FIG. 1 is a graphical depiction of air flow velocities through the claimed nano alumina filters and a HEPA filter as a function of pressure drop across the filters.

The term "High Efficiency Particle Air" (HEPA) refers to a grade of filter media that is capable of retaining >99.97% of 0.3 µm particles.

The term "Ultra Low Penetration Air" (ULPA) refers to a grade of filter media that is capable of retaining >99.99% of a specified particle size at a specified medium velocity.

The term "Super ULPA" refers to a grade of filter media that is capable of retaining >99.9999% of a specified particle size at a specified medium velocity.

As used herein, the term "adsorbent" is defined to be any material that is capable of adsorbing impurities primarily by physical adsorption to its surface.

The term "absorbent" is defined to be any material that is capable of drawing a substance into its inner structure.

The term "contaminant reduction" is defined to be an attenuation of an impurity in a fluid, wherein the impurity is intercepted, removed, or rendered chemically or biologically inactive in order to improve the utility of the fluid, such as by rendering the fluid safer for human use or more useful in industrial applications.

The term "NanoCeram" refers to mixtures of nano alumina fibers and coarse fibers where the coarse fibers serve as a scaffolding for the nano alumina fibers to create an array having asymmetric pores.

A "fine powder" is defined to be a powder having average particle size that is substantially below 100 mesh, and is preferably below 325 mesh (44 µm).

An "ultrafine particle" is defined to be a particle having an average particle size that is between 0.1 and 10 µm.

A "nano particle" is defined to be a particle having an average particle size that is less than 0.1 µm, including but not limited to nucleic acids (e.g., DNA and RNA), proteins, low solubility or semi-volatile drugs, macromolecular particles, functionalized polymers, ligands with engineered functionality, and carbon tubes.

A "microorganism" is defined to be any living organism that may be suspended in a fluid, including but not limited to bacteria, viruses, fungi, protozoa, and reproductive forms thereof including cysts and spores.

"Paper" or "paper-like" is defined to be a generally flat, fibrous layer or mat of material formed by a wet laid process.

A "particle" is defined to be a solid or microencapsulated liquid having a size that ranges from colloidal to macroscopic, with no limitation on shape.

A "sorbent" is defined to be any powder particle that is capable of removing contaminants from a fluid stream, including catalysts that are capable of converting contaminants into another form less hazardous form?. The term "sorbent" also includes a powdered catalyst or a catalyst impregnated onto a solid powdered or granular support such as activated carbon.

A "medical structure" is defined to be a nonwoven medium useful in medical applications such as containment of infection, wound protection, and the like.

The term "furnish" is defined to be the recipe used to form the fibrous structure.

The term "POE" is the point of entry to a single home, building, or the like.

The term "POU" is the point of use at a single point, such as a single faucet, portable purifier, or the like.

Description of Embodiments

In an embodiment, the present invention provides a filter media for removing particles, including liquid and particularly water aerosolized particles, from a fluid medium that is passed through the media in order to reduce contaminants therein. In examples, the particles are pathogens such as bacteria, viruses, mold, fungi, mildew, organic matter, inorganic matter, microorganisms, carbonaceous particles, metal working fluid mists, paint mists, pesticides, ink mists, or acid mists. In examples, the fluid stream has liquid aerosolized particles such as water aerosolized particles. In an example, the filter media is a non-woven, electrostatic media. The filter media comprises nano alumina fibers mixed with second fibers. In an example, the nano alumina are non-spherical. The second fibers are arranged in a matrix to create asymmetrical pores. In an example, fine metallic aluminum powder is reacted with the second fibers to form the electrostatic media. The reaction is carried out by adding ammonia to the aluminum and second fiber mixture. The mixture is heated to the boiling point of water. In another example, aluminum tri-hydroxide is heated under conditions of high temperature and pressure in the presence of the second fibers to form the electrostatic media. The reaction is carried out at about 175° C. and approximately 5 bar for about thirty minutes.

Second fibers may be any fiber that is strong enough to tolerate pleating, including microglass, cellulose, or fibrillated cellulose. In an example, second fibers have a minor dimension that is larger than the minor dimension of the nano alumina fibers by at least about one order of magnitude. In examples for an air or gas filter, average pore sizes range from about 4 to about 48 µm. Preferably, average pore size is greater than about 10 µm. More preferably, average pore size is greater than about 20 µm. In general, pore size is related to the diameter of second fibers. Therefore, a plurality of second fibers having a small diameter will create a plurality of asymmetrical pores having small pore sizes, while a plurality of second fibers having a larger diameter will create a plurality of asymmetrical pores having comparatively larger pore sizes. See, e.g., Table 1 and FIG. 13. However, as the diameter of the second fiber increases, the surface area to unit volume ratio decreases and as a result fewer nano alumina fibers are dispersed on the second fibers and/or in the pores. Therefore, in a preferred example, the plurality of second fibers is comprised of a combination of a plurality of coarse and a plurality of fine fibers. Fine fibers may all have substantially similar average diameters, or some fine fibers may have different diameters. The inclusion of fine fibers results in a corresponding reduction in pore size. See, e.g., Table 1 and FIG. 13.

The pore sizes determine the pressure drop across the filter media. In a preferred example, the pressure drop is less than about 35 mm $H_2O$ for a final composite filter or filtration unit at a flow velocity of about 3.2 m/min.

In an example, the claimed filter media further comprises a particulate sorbent, preferably a colloidal particle that is added to the filter media. To adsorb volatile organics, nerve agents, or mustard gas, activated carbon is added as a fine powder (for example, particles having a size as small as about 1 µm and having an average size of about 28 µm), to provide more rapid adsorption than typical larger granular carbons.

In an example, the claimed filter media further comprises a binder. The binder may have a fiber shape (Invista T104) or may be a resin such as Rohm or Haas Rhoplex HA-16. Inclusion of binder increases strength and/or pleatability of the fiber media, although binder is not necessary for bonding particles to the structure.

In an example, the filter media may further comprise an antimicrobial agent that is mixed with the plurality of nano alumina and second fibers. In manufacture, after the slurry is made and before the mixture is filtered onto a screen, the antimicrobial agent is added and adsorbed to the nano alumina fibers in order to make it available as an antimicrobial agent. In an example, the antimicrobial agent is silver. In other examples, ions such as copper and zinc work either synergistically with silver as an antimicrobial agent. In yet another example, ions such as copper and zinc work alone as an antimicrobial agent.

In an example of the present invention, the filter media is electrostatically charged, such that the nano alumina fibers capture particles such as pathogens and other matter. In an example, the filter media is a homogenous non-woven filter.

In an example, the fluid media is pretreated or preconditioned by flowing a plurality of particles therethrough. Particles may have diameters ranging from about 0.3 to about 1.5 µm. Inclusion of these particles blocks at least some of the largest pores of the plurality of asymmetrical pores in order to reduce initial leakage through the filter media. Additionally, preconditioning helps to create or produce HEPA or ULPA capability throughout the use of the filter. In an example, the plurality of particles is a plurality of latex spheres, although the plurality of particles may be made of any substance that is able to block at least some of the largest pores.

In an example, the claimed nano alumina filter media has a retention efficiency that is at least as good as HEPA In another example, the claimed filter media has a retention efficiency that is at least as good as ULPA.

In another embodiment, the claimed invention is a method of manufacturing the nano alumina fluid filter. The method of manufacture comprises the steps of forming nano alumina fibers in the presence of a plurality of second fibers. The second fibers are arranged to form a plurality of asymmetrical pores. In an example, the nano alumina filter media is formed into a homogenous single layer. In another example, the nano alumina filter media is formed into more than one layer. In yet another example, the nano alumina filter media is pleated.

The filter media may be used in a filtration system. In use, an air or gas stream is passed through the filter media and particulate matter is removed therefrom by retaining the particles in the filter media. In an example, the fluid medium comprises a suspension of water droplets. Examples of use of the filter include, but are not limited to, use in room air filtration, use in respirators or face masks, use in automotive air filters, use in a clean room, use in an operating room, or use in an industrial setting, such as to remove paint or other particular matter contained in industrial mists. In an example, the filter media is used in an environment that has a humidity that is greater than about 75% RH.

In another embodiment, the present invention has wide applications in nanotechnology and provides a fibrous structure for retaining particles that are very difficult to disperse and contain within fibrous webs. In examples, the dispersed particles are sorbents or catalysts that can remove contaminants from fluid streams. Examples of contaminants include: organic compounds such as halogenated organics, pesticides, and volatile organic compounds. In other examples, the contaminants are bacteria and virus, mold, fungi, mildew, organic matter, inorganic matter, microorganisms, carbonaceous particles, metal working fluid mists, paint mists, pesticides, ink mists, or acid mists.

The fibrous structure is a web or fabric or other medium having a structure of individual fibers that are interlaid in a disorganized manner. Preferably, the fibrous structure is prepared by wet laying, but it may also be prepared by other methods well known in the art including air laying, meltblowing, spunbonding and carding. The fibrous structure comprises nano alumina fibers mixed with and attached to second fibers as described above and further comprising a plurality of fine, ultrafine, or nanosize particles (described in more detail below) disposed onto the nano alumina fibers. The second fibers are arranged in a matrix to create asymmetrical pores.

As described above, fine metallic aluminum powder is reacted with the second fibers to form the fibrous structure. The reaction is carried out by adding ammonia to the aluminum and second fiber mixture. The mixture is heated to the boiling point of water. The fine, ultrafine, or nano particles are added to the mixture either before the aluminum water reaction, during the water reaction at boiling, or after the mixture is cooled to room temperature. The resulting furnish (formulation) is converted to a fibrous structure by applying suction to the underside of a screen, as when a paper handsheet is formed or as on a paper making machine, methods that are well known in forming non-woven media via wet processing.

A plurality of fine, ultrafine, or nano particles are disposed onto nano alumina fibers. In examples, the plurality of particles is a chemisorbent, a high surface area adsorbent, or a catalyst that converts a contaminant into a less hazardous compound. Examples of sorbents include activated carbon; silica, silicates, aluminasilicates, titanium silicate lead adsorbent, and silica gel; zeolites; activated alumina; metal and metal oxides including titanium dioxide; catalysts such as precious metals and transition metal catalysts, including platinum, palladium, silver and silver oxide, iridium, rhodium and gold, and copper activated manganese dioxide; bone char; calcium hydroxyapatite; magnesia; perlite; talc; polymeric particulates; clay; ion exchange resins; ceramics; and combinations thereof.

In another example, the plurality of fine, ultrafine, or nano particles is RNA, a micro or nanosize polymer, a biologically active macromolecule such as DNA, a functionalized macromolecule, or a microencapsulant of substances that control release of an enveloped material, such as microencapsulated dyes, drugs that may be released from a non-woven wound dressing, drugs that are able to be vaporized into an inhalation stream, or agents that are capable of neutralizing toxic substances such as chemical warfare agents.

In another example, the plurality of ultrafine or nano particles is activated carbon. The claimed fibrous structure comprising powdered activated carbon provides a more rapid adsorption of contaminants than commercially available activated carbon filled media. Examples of the claimed fibrous structure comprising powdered activated carbon are useful to protect military and civilian personnel from biological and chemical attacks that are delivered as an aerosol or through contamination of the water supply.

In an example, the fibrous structure is used in medical applications, such as a wound dressing or an inhaler.

In another embodiment, the claimed invention is a method of manufacturing the fibrous structure. The method of manufacture comprises the steps of forming nano alumina fibers in the presence of a plurality of second fibers. The second fibers are arranged to form a plurality of asymmetrical pores, A plurality of fine, ultrafine, or nanosize particles are added to the mixture for disposal onto the nano fibers. In an example, water is removed from the mixture. In an example, the fibrous structure is formed into a homogenous single layer. In another example, the fibrous structure is formed into more than one layer. In yet another example, the fibrous structure is pleated.

In use, a fluid stream is passed through the fibrous structure and contaminants are removed therefrom by retaining the contaminants in the fibrous structure. Examples of use of the claimed fibrous structure include but are not limited to purification of drinking water or air supplies. Specific examples include use of the fibrous structure in an in-room air filtration system, in respirators, in automotive air filters, in a clean room, in an operating room, and in industrial settings, such as to remove paint or other particulate matter contained in industrial mists. Additionally, the claimed fibrous structure is useful to remove biological agents, such as anthrax or the smallpox virus, chemical agents, such as nerve gas, or radiological agents, such as those that might be delivered by a radiologically dirty bomb, from drinking water or air supplies. The ability to remove nuclear, biological, and chemical agents (NBC) is required in personal respirators and protective shelters, and in NBC suits that are capable of protecting the wearer from assimilation of agents.

In another example of use, a layer of the nano alumina/coarse fiber composite is placed downstream of the claimed fibrous structure to collect any particles or contaminants that escape during use.

In another embodiment, the claimed invention is a water filtration device comprising at least one fibrous structure. Each fibrous structure comprises nano alumina fibers and second fibers mixed with the nano alumina fibers. As described above, the second fibers are arranged to create asymmetric pores. Preferably, the device comprises 1+y upstream fibrous structures and 1+n downstream fibrous structures. In an example, the upstream and downstream fibrous structures are unified in a single fibrous structure. Preferably, at least one of the upstream and downstream fibrous structures comprises a plurality of fine, ultrafine, or nanosize particles deposited on the nano alumina fibers, as described above. In a preferred example, the particles are powdered activated carbon and/or an antimicrobial agent such as a halogen, chloramines, silver, zinc, copper, organic microbials such as triclosan, a common antimicrobial agent, or a combination thereof. Preferably, the halogen is iodine, but may also be chlorine or bromine. In an example, the powdered activated carbon is impregnated with an antimicrobial agent as described above. In other examples, particles comprising the upstream and/or downstream fibrous structures are inorganic sorbents such as titanium dioxide or titanium silicate to remove lead, arsenic, soluble aluminum, and/or copper from the fluid.

In use, the downstream fibrous structure comprises particles as described above to catch any particles that are shed during filtration from structures positioned upstream thereto. In the preferred embodiment, the particles comprising the downstream fibrous structure are powdered activated carbon.

The pressure drop across the fibrous structures comprising the claimed device is minimized so that reasonable flow rates occur through the use of gravity. The device comprising the fibrous structures is able to retain soluble organic and inorganic matter, such as pesticides, herbicides, and pollutants, all of which may contribute to poor taste and odor of the fluid, toxic metals, microbial pathogens, and particulate matter and contaminants, including submicron colloidal matter with high efficiency and high capacity. The claimed device is able to adsorb halogens from fluid streams at dynamic adsorption rates greater than existing devices that use other carbon-filled media. Preferably, the device sanitizes drinking water to about 6 Log Retention Value (LRV) of bacteria, about 4 LRV of virus, and about 3 LRV of cysts.

Figure 19:
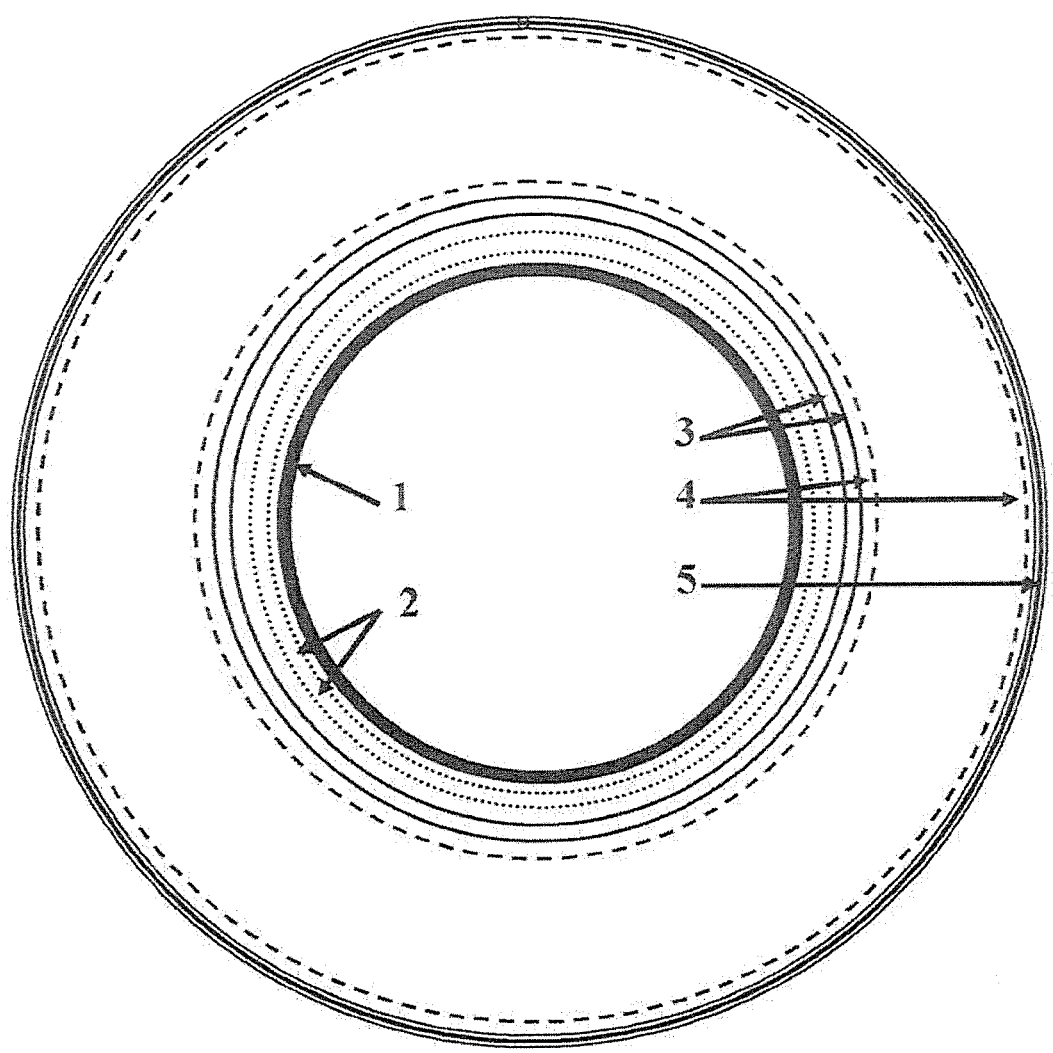
Figure 20:
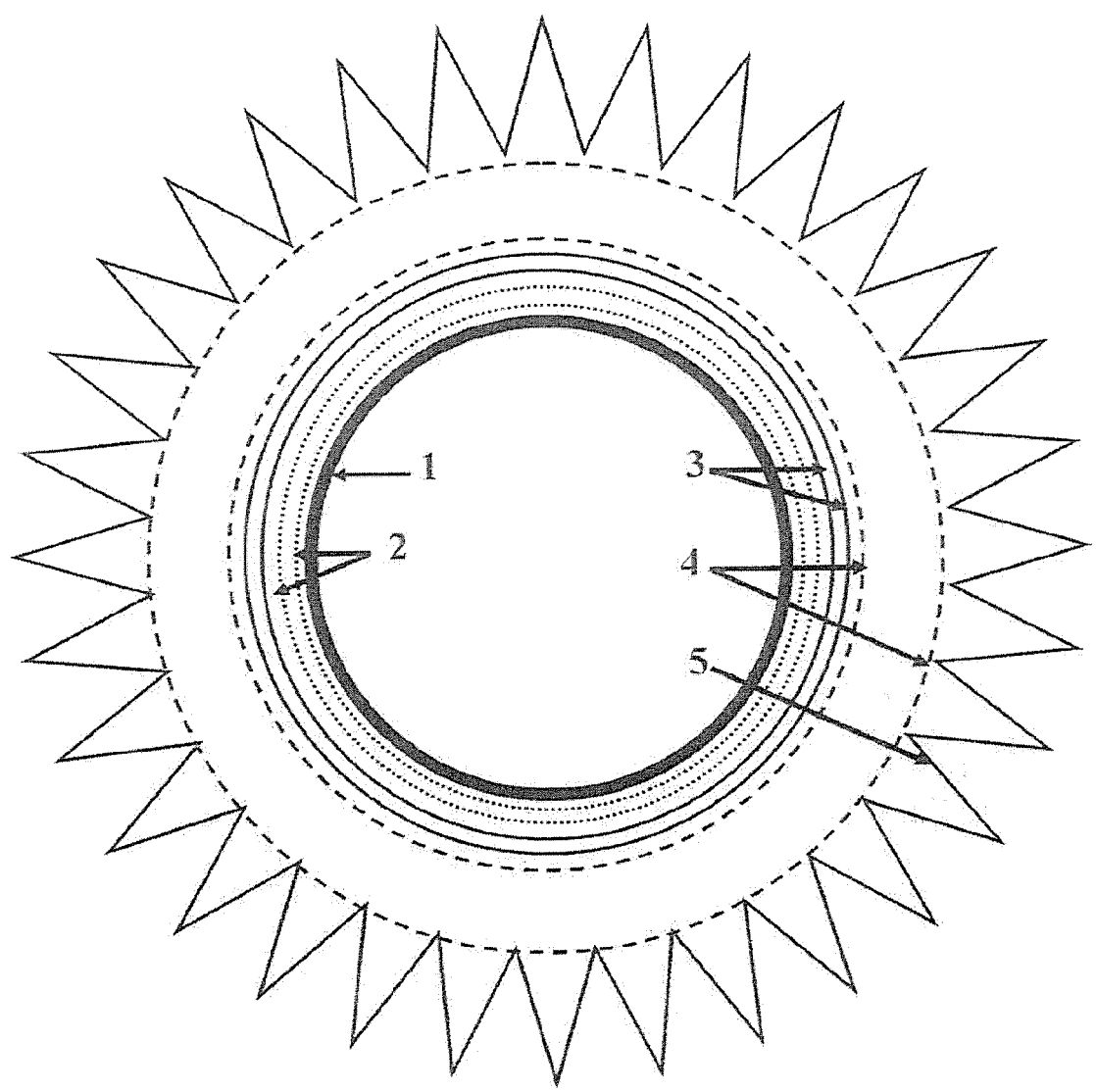

Schematics of examples of the claimed device are shown in FIGS. 19 and 20. These examples are not intended to be limiting, however. The fibrous structures comprising the claimed device may be assembled as either a pleated section (not shown), a spiral wound multilayer section that is wrapped around a perforated mandrel (FIG. 20; described in more detail below), or a hybrid of pleated and spiral sections (FIG. 19; described in more detail below). Any number of fibrous structures may be used as long as the number used does not interfere with the intended function of the claimed device. As described above, preferably there are 1+y upstream fibrous structures, where y is an integer from 0 to y, and preferably 0 to 5, and there are 1+n downstream fibrous structures, where n is an integer from 0 to n, and preferably 0 to 10.

In another example, a silver or halogen source, such as an iodine source, is placed upstream from the claimed device, including elemental iodine supported on ceramic substrates or incorporated into other physical structures, granular activated carbon impregnated with halogen or silver, iodinated ion exchange resins, or fine particle and fibrous resins devoid of antimicrobial that might remove trace metals and resins supported on PAC carbon.

Other plumbed in applications include a POU mounted on a faucet. The device would only require approximately 6 layers of media consisting of PAC-$I_{(o)}$-NC and PAC-NC and would then be able to meet NSF/ANSI 53 (Drinking Water Treatment Units—Health Effects) for cysts, pesticides and particulates, and also be able to retain greater than 6 LRV of bacteria and greater than 4 LRV virus for more than 800 L (assuming municipal water at <1 NTU).

Gravity flow applications require less than 1 bar, and preferably less than 0.2 bar, but their anticipated volume and flow requirements are substantially below that of an in-line system. For instance, the flow requirement for POU known in the art that would produce 30 liters of clean water for African villagers overnight is only about 0.06 lpm at a head pressure of 0.15 bar. The claimed filtration device can sanitize and deliver such flows even if the head pressure is only 1.5 meters of water.

In an example, the claimed filtration device is a small filter cartridge mounted inside of a plastic bottle. Pressure applied by the user is adequate to drive contaminated water through the filter at sufficient volumes to provide adequate and sanitized water for drinking. In another example, the claimed filtration device is a small cartridge mounted in a housing of about 29 mm diameter and 215 mm long (i.e., a straw) that has an inlet for contaminated water and an outlet that is placed in the mouth of the user. Sucking on the straw provides sufficient force to provide an adequate stream of sanitized water for at least a few hundred liters before having to change the filter.

In an example, the claimed device is portable. In examples, the device is useful for water purification or sanitation by campers, travelers, war fighters, the poor, and others who do not have access to power and/or municipal water sources. In other examples, the claimed device is used in combination with a pitcher to form a pitcher filter, a faucet or water outlet to form a POU or a purification system to form a POE such as is used in high value buildings to protect against biological agents such as anthrax, small pox virus, and/or chemical or radiological agents such as those that might be delivered by a radiologically dirty bomb.

EXAMPLES OF THE PRESENT INVENTION

Examples—Air Filter Medium

The following examples illustrate several embodiments of the present invention. These examples should not be construed as limiting. All percentages are by weight. Calculations for determining pore size are provided in the discussion following the Examples.

Example 1

The object of the experiments outlined below was to develop a nano alumina media having a pressure drop substantially equivalent to HEPA media and a filtration efficiency substantially higher than HEPA. It was also an object of the experiments to correlate the nano alumina filter media's water adsorption performance with that of a known HEPA filter media (hereinafter, "the Donaldson HEPA filter") to allow optimization of air filtration using water adsorption data.

Twenty four slurries of nano alumina on microglass mixtures were produced by reacting 5 µm diameter alumina powder (Valimet Corp. #H-5) in water at 100° C. in the presence of mulched borosilicate glass fiber wool of random lengths (Lauscha). Non-woven fiber media containing nano alumina were formed on a 1×1 ft sheet mold and were strengthened with 17-23% bi-component fibers (Invista T104, 20 µm diameter, ½" length) that served as binder. Rhoplex binder was also added, about 2% by weight in liquid form. The sheets were labeled AF1-AF24.

The filters were tested as a single layer with an air stream having a flow velocity ranging from about 5.6 to about 23 m/min. The surface area available for filtration was about 8.2 cm². The filters were compared to the NanoCeram® water filter and the Donaldson HEPA filter in order to compare the characteristics of the inventive nano alumina air or gas filter to a water filter and a conventional HEPA filter.

Figure 13:
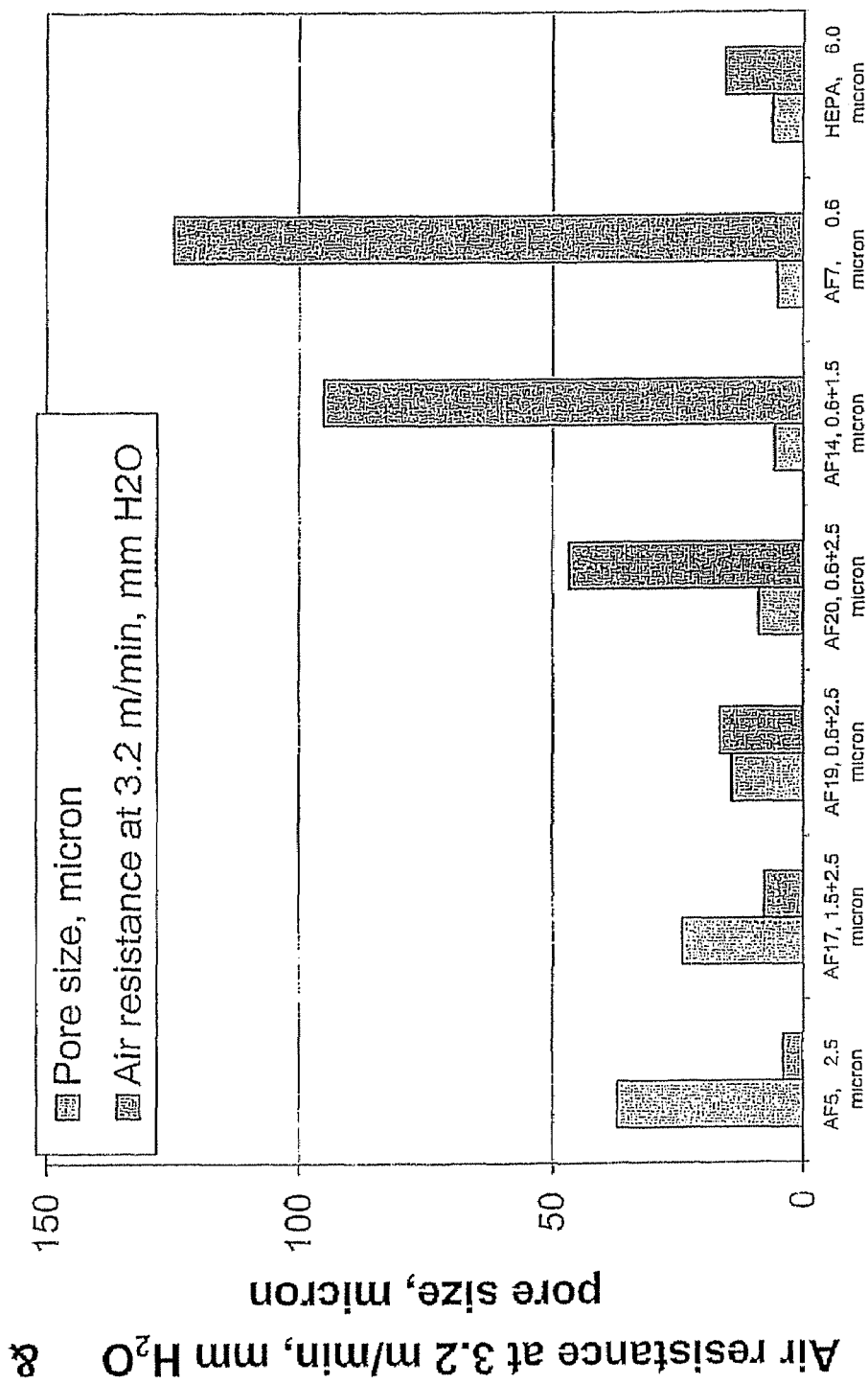

Table 1 shows the composition, porosity, pressure drop, and average pore size for each hand sheet and the NanoCeram and HEPA media. FIG. 13 also shows the pore size and pressure drop for some of the nano alumina filters that were tested. Each filter media shown in Table 1 and FIG. 13 was tested as a single layer media. However, in use, performance may be improved by stacking more than one layer As shown in Table 1, filters AF1-AF12 were comprised of nano alumina fibers mixed with microglass fibers of a single average diameter, either about 0.6 µm, about 1.5 µm, or about 2.5 µm. Filters AF13-AF24 were comprised of nano alumina fibers mixed with a combination of coarse and fine microglass fibers as follows: about 0.6 µm+about 1.5 µm; about 0.6 µm+about 2.5 µm; or about 1.5 µm+about 2.5 µm. The percentage of each fiber size comprising a given nano alumina filter media is indicated in Table 1.

TABLE 1

Composition and Property of Nano Alumina Test Filters

| | % Nano Ceram | % bi-component fibers/ % cellulose | % glass micro Fibers | glass microfiber diameter, µm | Basis weight g/m² | Porosity, fraction | Air ΔP @ 3.2 m/min, mm H₂O | Average pore size, (Eq. [3]), µm |
|---|---|---|---|---|---|---|---|---|
| Nano-Ceram | 35 | 13/21 | 31 | 0.6 | 160 | 0.88 | 130 | 3.8 |
| AF1 | 3.8 | 24/0 | 72.2 | 1.5 | 156 | 0.93 | 10.4 | 19 |
| AF2 | 11.7 | 22/0 | 66.3 | 1.5 | 170 | 0.92 | 12.3 | 17 |
| AF3 | 20 | 20/0 | 60 | 1.5 | 178 | 0.91 | 13.0 | 16 |
| AF4 | 3.8 | 24/0 | 72.2 | 2.5 | 155 | 0.95 | 4.1 | 35 |
| AF5 | 7.7 | 23/0 | 69.3 | 2.5 | 150 | 0.96 | 4.0 | 37 |
| AF6 | 11.7 | 22/0 | 66.3 | 2.5 | 160 | 0.96 | 4.3 | 38 |
| AF7 | 7.7 | 23/0 | 69.3 | 0.6 | 164 | 0.92 | 125 | 5.2 |
| AF8 | 20 | 20/0 | 60 | 0.6 | 198 | 0.90 | 151 | 4.8 |
| AF9 | 33.3 | 16.7/0 | 50 | 0.6 | 240 | 0.88 | 204 | 4.2 |
| AF10 | 11.7 | 22/13.3 | 53 | 1.5 | 164 | 0.93 | 10.4 | 21 |
| AF11 | 7.7 | 23/13.9 | 55.4 | 2.5 | 144 | 0.94 | 3.4 | 37 |
| AF12 | 20 | 20/12 | 48 | 0.6 | 178 | 0.90 | 134 | 5.1 |
| AF13 | 11.7 | 22/0 | 16.6 | 0.6 | 162 | 0.92 | 34.0 | 10 |
| | | | 49.7 | 1.5 | | | | |
| AF14 | 11.7 | 22/0 | 33.2 | 0.6 | 168 | 0.91 | 95 | 5.7 |
| | | | 33.1 | 1.5 | | | | |
| AF15 | 11.7 | 22/0 | 49.7 | 0.6 | 172 | 0.90 | 105 | 5.4 |
| | | | 16.6 | 1.5 | | | | |
| AF16 | 7.7 | 23/0 | 17.3 | 1.5 | 160 | 0.94 | 5.7 | 28 |
| | | | 52 | 2.5 | | | | |
| AF17 | 7.7 | 23/0 | 34.6 | 1.5 | 154 | 0.94 | 7.6 | 24 |
| | | | 34.6 | 2.5 | | | | |
| AF18 | 7.7 | 23/0 | 52 | 1.5 | 160 | 0.94 | 9.2 | 22 |
| | | | 17.3 | 2.5 | | | | |
| AF19 | 7.7 | 23/0 | 17.3 | 0.6 | 168 | 0.92 | 16.6 | 14 |
| | | | 52 | 2.5 | | | | |
| AF20 | 7.7 | 23/0 | 34.6 | 0.6 | 158 | 0.90 | 46.6 | 8.7 |
| | | | 34.6 | 2.5 | | | | |
| AF21 | 7.7 | 23/0 | 52 | 0.6 | 158 | 0.91 | 75.5 | 6.4 |
| | | | 17.3 | 2.5 | | | | |
| AF22 | 11.7 | 22/13.3 | 26.5 | 0.6 | 168 | 0.92 | 48.2 | 8.8 |
| | | | 26.5 | 1.5 | | | | |
| AF23 | 7.7 | 23/13.9 | 27.7 | 1.5 | 146 | 0.93 | 6.7 | 25 |
| | | | 27.7 | 2.5 | | | | |
| AF24 | 7.7 | 23/13.9 | 26.5 | 0.6 | 156 | 0.90 | 43.3 | 8.5 |
| | | | 26.5 | 2.5 | | | | |
| HEPA | NA | NA | NA | NA | 48 | 0.84 | 15.5 | 6.0 |

Note:
NA—not applicable

Relationship Between Microglass Fiber Diameter and Media Porosity

The data of Table 1 illustrate that media being comprised of microglass fibers having small diameters also had lower porosities and small pore sizes. These relationships are further illustrated in FIG. 13. For example, media comprised of 0.6 μm microglass fibers had porosities of about 90% and pore sizes ranging from 4.2 to 10 μm. Media comprised of 1.5 μm microglass fibers had porosities of about 92.3% and pore sizes ranging from about 16 to about 21 μm. Finally, media comprised of 2.5 μm microglass fibers had porosities of about 95.3% and pore sizes ranging from about 35 to 38 μm.

The data of Table 1 and FIG. 13 also illustrate that media having the largest pore sizes or porosities also had the smallest pressure drops. For example, media having porosities of about 95% had pressure drops of about 3.4 to about 4.3 mm $H_2O$, in contrast to pressure drops of about 125 to about 204 mm $H_2O$ for porosities of about 90%.

In examples where the filter media was comprised of a combination of coarse and fine fibers, pore size was not increased as dramatically as it was when the coarse fibers were present alone (see, e.g., Table 1 and FIG. 13). For example, 2.5 μm fibers combined with 1.5 μl fibers have pore sizes ranging from about 22-28 μm and porosities of about 94%, with a corresponding pressure drop of about 5.7 to about 9.2 mm $H_2O$.

Notably, the majority of samples AF1-AF24 had a pore size that is greater than the pore size in the Donaldson HEPA filter. For example, AF6 had a pore size that was more than six times greater than the Donaldson HEPA filter pore size.

Air-Flow Filtration Characteristics

Filters from the set of test filters AF1-AF24 were separated based on their airflow performance. The data for filters having a pressure drop of less than 10 mm $H_2O$ at 3.2 m/min are shown in FIG. 1. The solid line corresponds to a flow velocity of 3.2 m/min. The results show that there are several formulation variations of the claimed nano alumina fiber material that have a lower pressure drop than HEPA filters. These results are thought to be due to the larger pore size of the new filter media.

Evaluation of Filtration of Particulate Matter Using Monodisperse Latex Testing Traditionally, oil based aerosols such as DOP (Di-octyl phthalate) have been used to simulate liquid aerosols, and sodium (NaCl) or potassium (KCl) chloride aerosols have been used to simulate solid particles when evaluating air filter material. The inventors compared the adsorption of ultrafine monodisperse latex spheres in water with that of HEPA filters and then attempted to establish a correlation based on data from DOP and NaCl tests. Specifically, air filters AF3 (average pore size 16 μm, see Table 1), AF6 (average pore size 38 μm), see Table 1, and the Donaldson HEPA filter, having a diameter of about 25 mm and an effective surface area of about 3.7 $cm^2$, were challenged with a fluid stream of clean (RO) water having 1 μm latex spheres at a constant flow rate of about 0.1 m/min. Although Table 1 describes filter media arranged in a single layer, stacks of one to four layers were used in this experiment in order to optimize performance of the filter media in air and water applications. Influent and effluent turbidity (in NTU or nephelometric turbidity units) in water was measured using a LaMotte Model 2020 turbidimeter.

Figure 2:
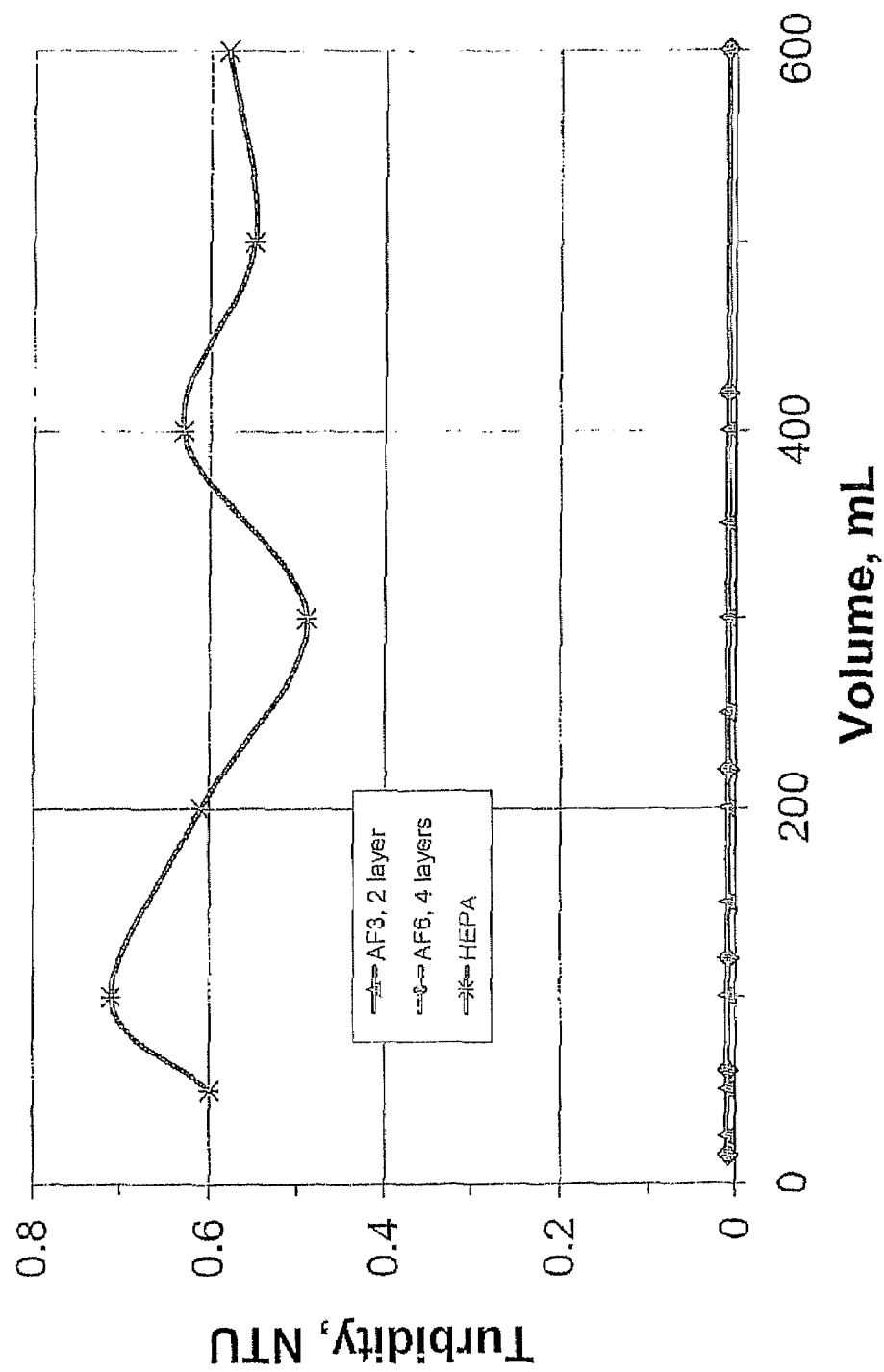
FIG. 2 is a graphical depiction of turbidity as a function of volume during filtration of 0.2 μm latex spheres suspended in water through the claimed nano alumina filters and a HEPA filter.

FIG. 2 shows a graphical depiction of the turbidity in the effluent leaving filters comprised of nano alumina and microglass fibers compared to a conventional HEPA filter. As shown, the inventive filters comprising the nano alumina and glass fibers exhibited virtually undetectable turbidity in the effluent compared to the HEPA filter.

The results of this experiment were surprising because the inventive filters retained 0.2 μm particles even though filters AF3 and AF16 had average pore sizes of about 16 and 38 μm, respectively. It was expected that filters having such large average pore sizes would not be able to retain particles that were so much smaller. The very poor retention of the HEPA filter in the water media was also surprising, indicating that HEPA filters have a much poorer particle retention in water than in air, and thus behave substantially differently in the two environments.

The objective of correlating water adsorption data to air performance was not successful and therefore air filter test data were relied on for subsequent experiments.

Examples 2-10

In Examples 2-10, the nano alumina filter media labeled AF3, AF6, AF11, and AF16 were used to further characterize the inventive nano alumina filter media as compared to the Donaldson HEPA filter. As set forth in Table 1, AF3 was comprised of 1.5 μm microglass fibers, AF6 and AF11 were comprised of 2.5 μm microglass fibers, and AF16 was comprised of a combination of 1.5 and 2.5 μm microglass fibers.

Example 2

Initial DOP and NaCl Initial Particle Penetration

Filters AF3 (average pore size 16 μm), AF6 (average pore size 38 μm), AF11 (average pore size 37 μm), and AF16 (average pore size 28 μm), manufactured in Example 1, and the HEPA filter, were sent to Nelson Laboratories in Salt Lake City, Utah, for DOP and neutralized monodisperse NaCl aerosol testing. The challenge concentration was $1.5 \cdot 10^6$ particles/$cm^3$ at 32 L/min through 100 $cm^2$ filters. The aerosols had a median particle size of 0.3 μm which were considered to be in the most penetrating size range. The test samples were prepared in the form of 10×10 cm squares or about 4-5" diameter discs. Three ply or three-layer flat sheets were tightened into the test device and challenged with an air stream at 32 L/min. The data are shown in Table 2.

TABLE 2

Initial Penetration of DOP and NaCl

| Sample | # plies | DOP/NaCl | Initial airflow resistance (mm $H_2O$) | Particle penetration, % |
|---|---|---|---|---|
| HEPA | 1 | DOP | 32.8 | 0.02 |
|  |  | NaCl | 32.8 | 0.025 |
| AF16 | 3 | DOP | 29.1 | 0.513 |
|  |  | NaCl | 32.1 | 0.323 |
| AF6 | 4 | DOP | 23.4 | 1.27 |
|  |  | NaCl | 23.6 | 0.755 |
| AF11 | 4 | DOP | 19.5 | 2.72 |
|  |  | NaCl | 19.4 | 1.60 |
| AF3 | 1 | DOP | 21.2 | 4.12 |
|  |  | NaCl | 21.3 | 2.61 |

Filter AF16 had the lowest initial NaCl and DOP aerosol penetration, although even this penetration was not comparable to that of the HEPA filter. This sample is composed of a mixture of 1.5 and 2.5 micron microglass and contains only 7.7% nano alumina. It has a pore size of approximately 28 μm. The results show that many of the nano alumina formulations had an initial penetration higher than the HEPA specification.

Example 3

NaCl Aerosol Capacity Testing

Filters AF3, AF6, AF11, and AF16, and the HEPA filter (100 cm² test area) were challenged by the NaCl aerosol at a flow rate of 32 liters/min for approximately 3 hours each. About 0.0067 mg/min/cm² of NaCl was delivered to each filter, which is equivalent to about 40 mg/hr. As described above, typically three layers of AF16 (1.2 mm each, total of 3.6 mm) were necessary to achieve the equivalent pressure drop of the HEPA, so the testing was done with three layers vs. HEPA.

rapidly the filter media will approach the "lifetime" pressure differential assuming other variables are held constant.

A filter having an increased capacity is of considerable benefit because it reduces the cost of frequent filter change-outs. Additionally, many filters, including those that intercept bacteria and viruses or nuclear materials, have to be disposed of as hazardous waste. Therefore, reducing the frequency with which hazardous waste filters have to be changed and disposed of is a further economic benefit.

Table 3 presents results of the NaCl aerosol tests at air flow rates of about 3.2 m/min for filters disclosed in U.S. Pat. No. 6,872,431 to Kohlbaugh ("the '431 patent") and the inventive fibers comprising nano alumina and microglass fibers at a "pre-HEPA" level for removal of 0.3 μm particles, wherein "pre-HEPA" is defined as a media efficiency ranging from about 98.9% to about 99.6%. Table 3 also presents the results of challenging one of the inventive filters (a single layer of filter AF16) with the most penetrated particle size of 0.33-0.40 μm of neutralized KCl at a flow rate of about 4.6 m/min.

TABLE 3

NaCl (0.3 μm) Aerosol Penetration of Test Samples at "pre-HEPA"[b] Level

| Media | Initial particle penetration % | Number of Layers | Single layer efficiency % | Thickness, mm | Time to 125 mm H₂O, min | Time to 50 mm H₂O, min |
|---|---|---|---|---|---|---|
| U.S. Pat. No. 6,872,431 | 0.6[a] | 10 | 40 | 0.54[b] | <170[c] | <80[c] |
| U.S. Pat. No. 6,872,431 | 0.4[d] | 14 | 28 | 0.75[b] | <230[c] | <125[c] |
| U.S. Pat. No. 6,872,431 | 0.4[a] | 25 | 20 | 1.4[b,e] | <260[c] | <170[c] |
| AF6 | 0.76 | 4 | 80[f] | 1.8 | 320[f] | 160 |
| AF16 | 1.1[g] | 1 | 98.9[g] | 1.2 | 170[f] | 100[f] |

Notes:
[a]this is an estimated value based on equations on the disclosure of the '431 patent, pages 23-24;
[b]these are estimated values based on the data disclosed in the '431 patent, page 35, lines 1-10;
[c]these are estimated values based on the data disclosed in the '431 patent, page 43;
[d]this is an estimated value based on the data disclosed in the '431 patent, page 39;
[e]the estimated thickness exceeds the limit for filter media construction (see claim 14, the '431 patent);
[f]these are estimated values;
[g]this filter was challenged with the most penetrated particle size of about 0.33 to about 0.40 μm of neutralized KCl at about 4.6 m/min.

Figure 3:
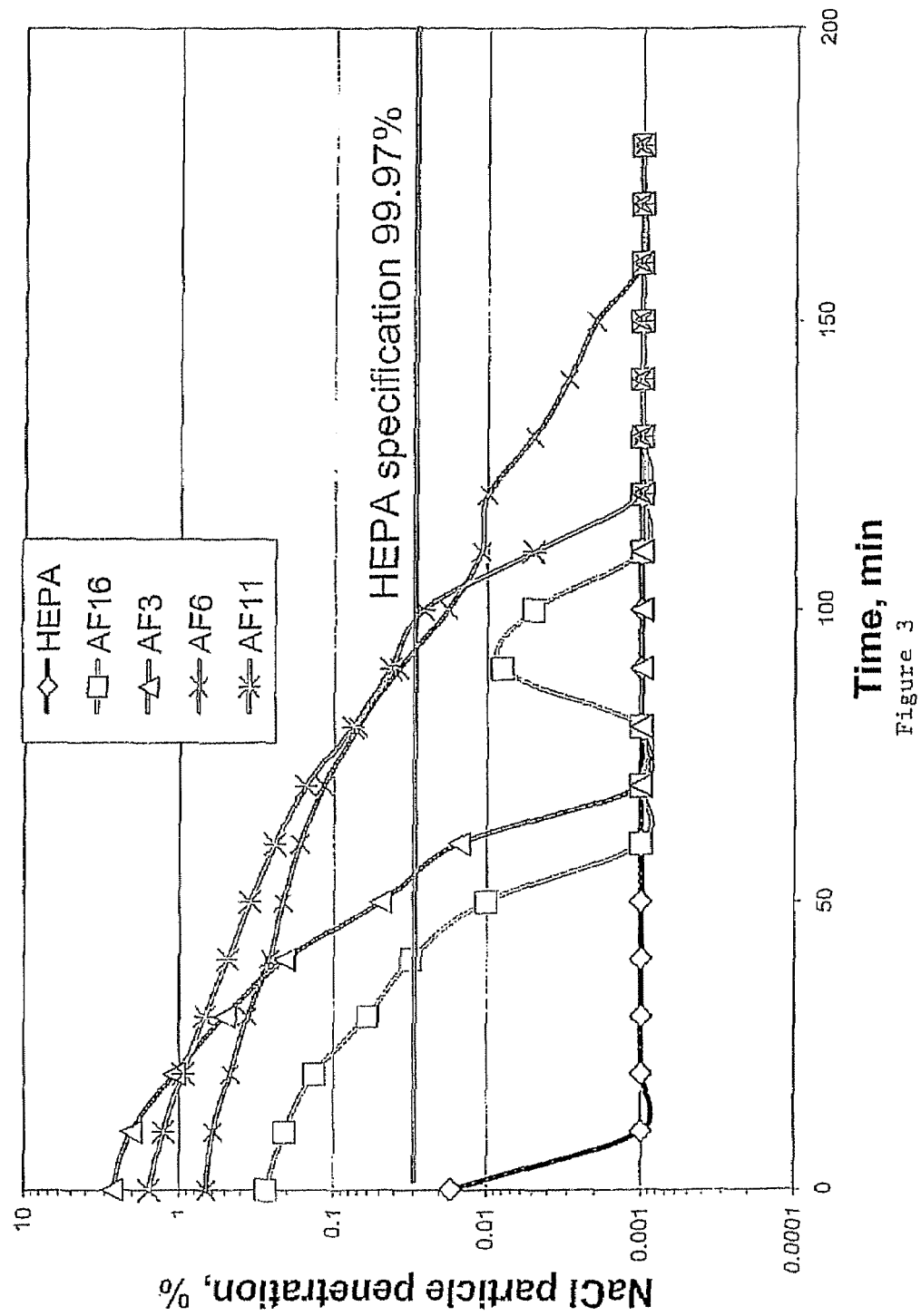
FIG. 3 is a graphical depiction of penetration of the claimed nano alumina and HEPA filters while continuously challenging them with 0.3 μm NaCl aerosols.

FIG. 3 shows a graphical depiction of the penetration of each filter tested by NaCl aerosols as a function of time. As shown, filter AF16 had the lowest initial NaCl aerosol penetration but was still considerably above that of the HEPA. AF16 had the lowest initial penetration and was therefore used for further evaluation.

Capacity

Figure 4:
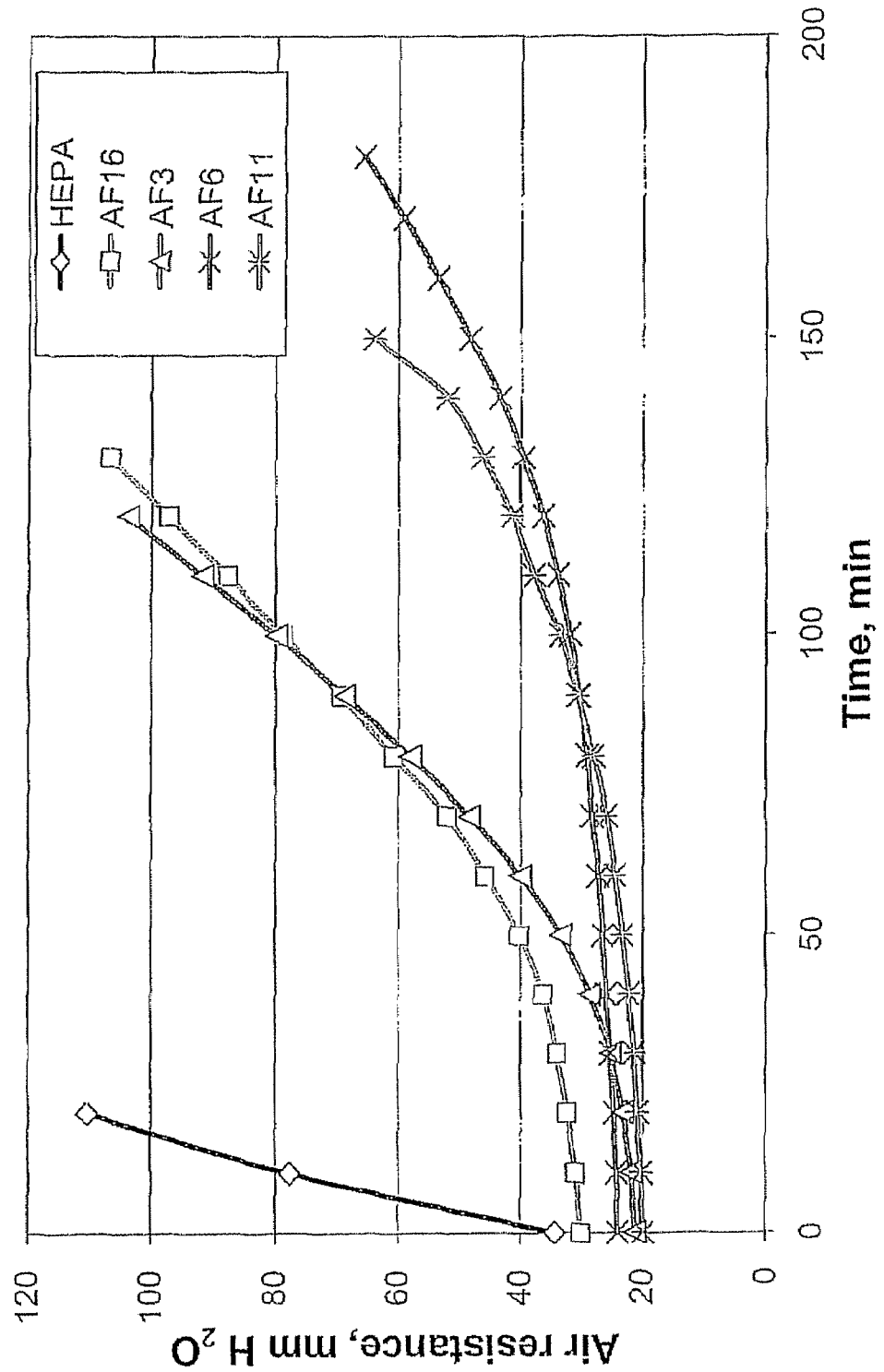
FIG. 4 is a graphical depiction of air resistance of the claimed nano alumina and HEPA filters while continuously challenging them with 0.3 μm NaCl aerosols.

FIG. 4 shows a graphical depiction of the air resistance of the filters as a function of time. Capacity (or filter life) in this example is defined as the time (minutes) required to reach a pressure drop (ΔP) of 50 mmH₂O. As shown in FIG. 4, all of the inventive nano alumina filters tested had a capacity that is at least ten times that of the HEPA filter. Filters AF6 and AF11 have capacities that exceeded that of HEPA by a factor of about 30 times. These data are important because the "lifetime" of a filter is typically defined according to a selected limiting pressure drop across the filter. The pressure buildup across the filter defines the lifetime at a defined level for that application or design. Since the buildup of pressure is a result of load, for systems of equal efficiency, a longer life is typically directly associated with a higher capacity. Efficiency is the propensity of the media to trap rather than pass particulates. Typically the more efficient a filter media is at removing particulates from a gas flow stream, in general the more The results shown in Table 3 indicate that at the "pre-HEPA" level:

1. The AF6 media, which is pleatable, has greater capacity to reach a pressure drop of about 125 mm H₂O and about 50 mm H₂O compared to the media disclosed in the '431 patent incorporating either 10, 14, or 25 layers. The life expectancy at 125 and 50 mm H₂O is improved by about 40%, 28%, and 20%, respectively.
2. A single layer of AF16 media has a life expectancy and removal efficiency of the most penetrating particles (KCl, 0.33-0.4 μm) that exceeds that of the filters disclosed in the '431 patent for 10 and 14 layer composites.

These data are important because they show that the nano alumina fiber media has an increased life expectancy compared to the '431 filter and because their removal efficiency of particles exceeds that of the '431 filter. Thus, not only are the claimed nano alumina filters more cost-effective, they also perform better. Additionally, it is much less costly to manufacture a single media than one with 10-14 different layers, and in the latter case, one has to worry about delamination.

Table 4 presents results of the NaCl aerosol tests at air flow rates of about 3.2 m/min for filters disclosed in the '431 patent and the inventive fibers comprising nano alumina and microglass fibers at a HEPA level for removal of 0.3 μm particles.

TABLE 4

Results of NaCl Aerosol Tests at a HEPA Level

| Media | Composite efficiency, % | Number of Layers | Single layer efficiency, % | Thickness, mm | Time to 125 mm H$_2$O, min | Time to 50 mm H$_2$O, min |
|---|---|---|---|---|---|---|
| U.S. Pat. No. 6,872,431 | 99.97[a] | 16 | 40 | 0.89[b] | <170[c] | <80[c] |
| U.S. Pat. No. 6,872,431 | 99.97[a] | 25 | 28 | 1.4[b] | <230[c] | <125[c] |
| AF6 | 99.97[d] | 5 | 80[d] | 1.8 | 300[d] | 140[d] |
| AF11 | 99.976[d] | 6 | 75[d] | 2.5 | 310[d] | 120[d] |
| Donaldson HEPA | 99.975 | 1 | 99.975 | 0.2 | 24 | 3.5 |

Notes:
[a]these are estimated values based on the equations disclosed in the '431 patent, pages 23-24;
[b]these are estimated values based on the data disclosed in the '431 patent, page 35, lines 1-10 (note that the estimated thickness exceeds the limit for filter the media construction, per claim 14 of the '431 patent);
[c]this is an estimated value based on data disclosed in the '431 patent, page 39, lines 39-45;
[d]this is an estimated value.

The data shown in Table 4 indicate that the AF6 and AF11 media have greater capacities to reach a pressure drop of 125 or 50 mm H$_2$O compared to the media disclosed in the '431 patent that has 16 or 25 layers. The inventive media improves the life expectancy of the filter by at least 80% to 125 mm H$_2$O terminal pressure with respect to the '431 patent's media, although the '431 patent's media having 25 layers has a comparable life expectancy to a pressure drop of 50 mm H$_2$O.

Example 4

Preconditioning

The objective of this example was to eliminate the initial leakage when tested to a HEPA protocol. It was hypothesized that the largest pore sizes in the filter media (which contains a wide range of pore sizes because of the asymmetric fiber arrangement) were responsible for the initial leakage. It was further hypothesized that injection of a foreign particle into the filter to condition the filter prior to use would flow into the largest of pores, blocking them and thereby reducing this leakage to improve the filter's efficiency.

In order to test this hypothesis, the filters were pre-loaded with a conditioning agent so that pores were plugged prior to use. Sample AF16 (25 mm diameter filter) was used in this test. Monodisperse latex spheres (Duke Scientific) were used to condition the filters because these spheres are stable in air and not affected by a humid air stream. Experiments were carried out in which latex spheres had diameters of either 0.2, 0.5, or 1 μm. The spheres were loaded onto the filter and the air resistance was measured.

Air flow resistance was measured as described above. Pre-loading with 0.2 μm spheres had minimal effects on the pressure drop in the inventive filters (data not shown) and after some pre-loading the turbidity of the effluent was measurable.

Figure 5:
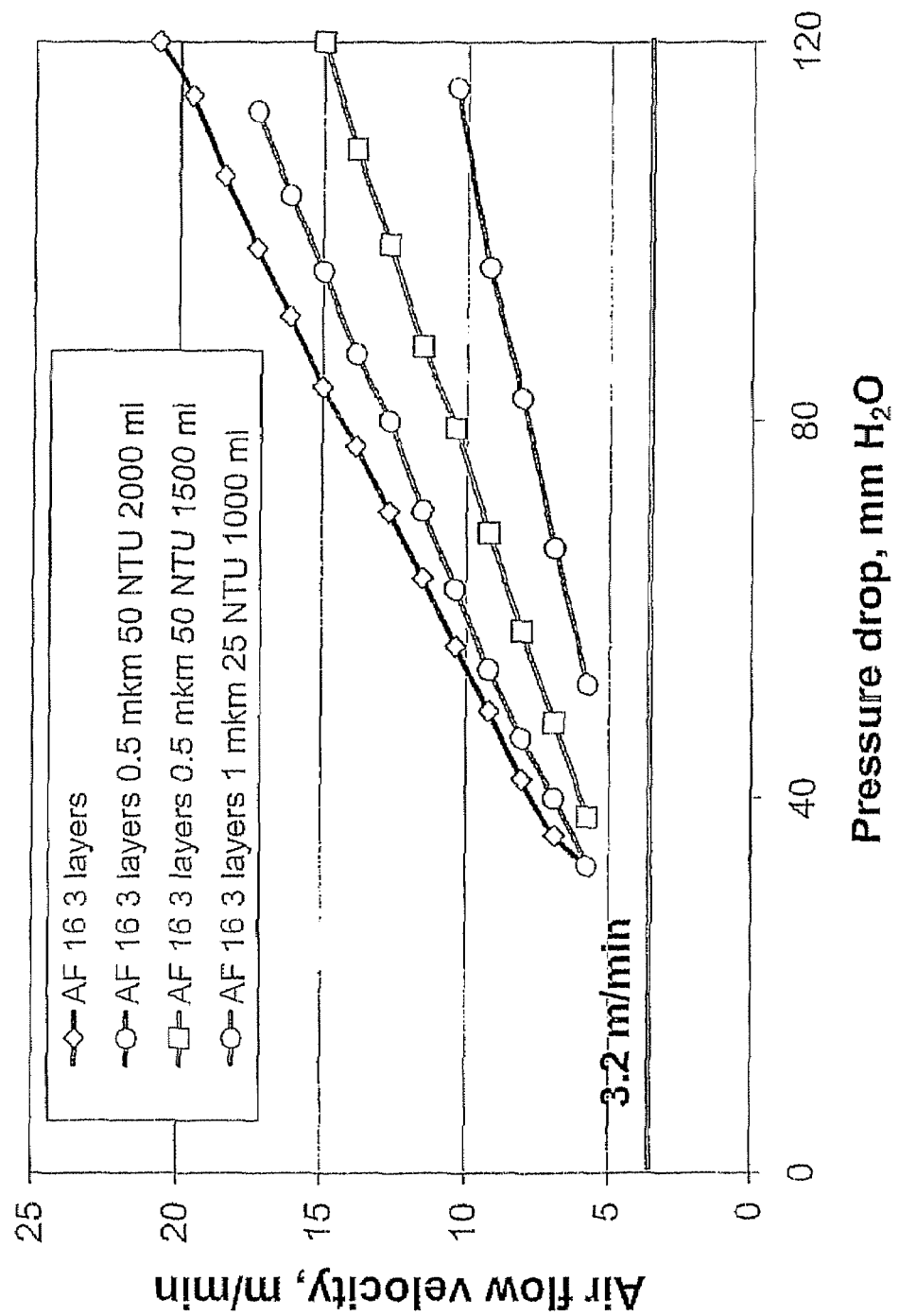
FIG. 5 is a graphical depiction of air flow velocity vs. pressure drop through the claimed nano alumina filters after being preconditioned with 0.5 and 1 μm latex spheres.

FIG. 5 is a graphical depiction of the air velocity and change in pressure after pre-loading the inventive filters with 0.5 or 1 μm latex spheres. During pre-loading, it was noted that the turbidity of the effluent was below the detection limit of 0.01 NTU, suggesting quantitative adsorption of these larger particles by the filter media. The data suggest that 0.5 and 1 μm latex spheres are suitable for pre-conditioning the filters with spheres.

In summary, the results of Example 4 show that:
1. Foreign particulates such as monodispersed particulates can be used to condition nano alumina filter media.
2. Measurement of the turbidity during preloading is an effective way to monitor and control the preloading process.
3. Samples can be loaded with 0.5 and 1 μm latex beads to mirror the pressure drop (ΔP) that occurs during NaCl aerosol testing.
4. The 0.2 μm latex particle is too small to achieve the desired ΔP.

As an alternative to the costly latex particles, less costly and preferably sub-micron particles, may be used to precondition the filters, including for example, ultrafine granular carbon, fumed silica agglomerates (Cab-O-Sil), or metal oxides.

Example 5

NaCl Penetration and Capacity Testing for Preloaded AF16 Samples

Test samples were prepared by preloading 0.5 μm latex spheres onto one face of a filter consisting of 3 layers of AF 16 media. The media was prepared as circular discs with an area of 175 cm$^2$. The samples (100 cm$^2$ test area) were challenged (at Nelson Laboratories) with an NaCl aerosol at a flow rate of 32 liters/min for approximately 3 hours each. The approximate mass of NaCl that was delivered to the filter was 0.0067 mg/min/cm$^2$, or 40 mg/hr or 0.5%/hr of the exposed mass of the filter. At a flow rate of 32 liters/min, the velocity was 3.2 m/min. Filter thickness of three layers AF 16 was about 0.36 cm, resulting in a computed residence time of about 0.07 sec.

Figure 6:
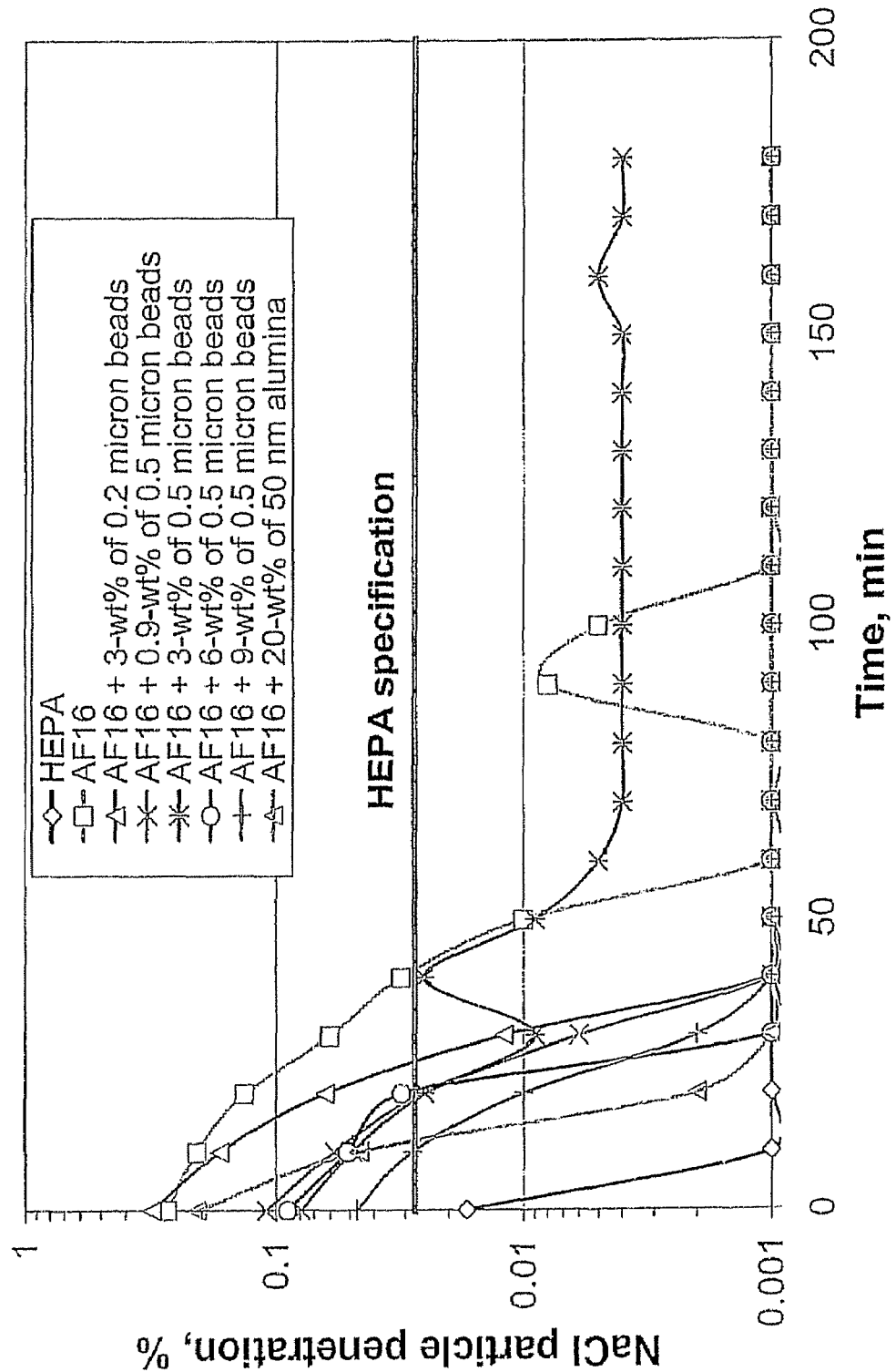
FIG. 6 is a graphical depiction of the penetration of the claimed nano alumina filters preconditioned with latex beads compared to a nano alumina filter without preconditioning and a HEPA filter when penetrated by 0.3 μm NaCl aerosols.

FIG. 6 shows a graphical depiction of the air resistance of nano alumina filters preconditioned with latex spheres during NaCl loading. As shown, over the 3 hours of test, the air resistance of all of the nano alumina test samples was much lower than that of HEPA. The HEPA filter reached a ΔP of 50 mm H$_2$O in about 4 minutes, while the nano alumina samples took about 40 minutes to reach the same ΔP (one nano alumina filter that contained 9 wt % latex reached a ΔP of 50 mm H$_2$O in about 30 minutes). This improvement in the filter life, which is about 7-10 ten times greater than HEPA, is a benefit for applications that use high efficiency filters, including hospital, military collective protection, homeland security, automotive and respirator filters.

Figure 7:
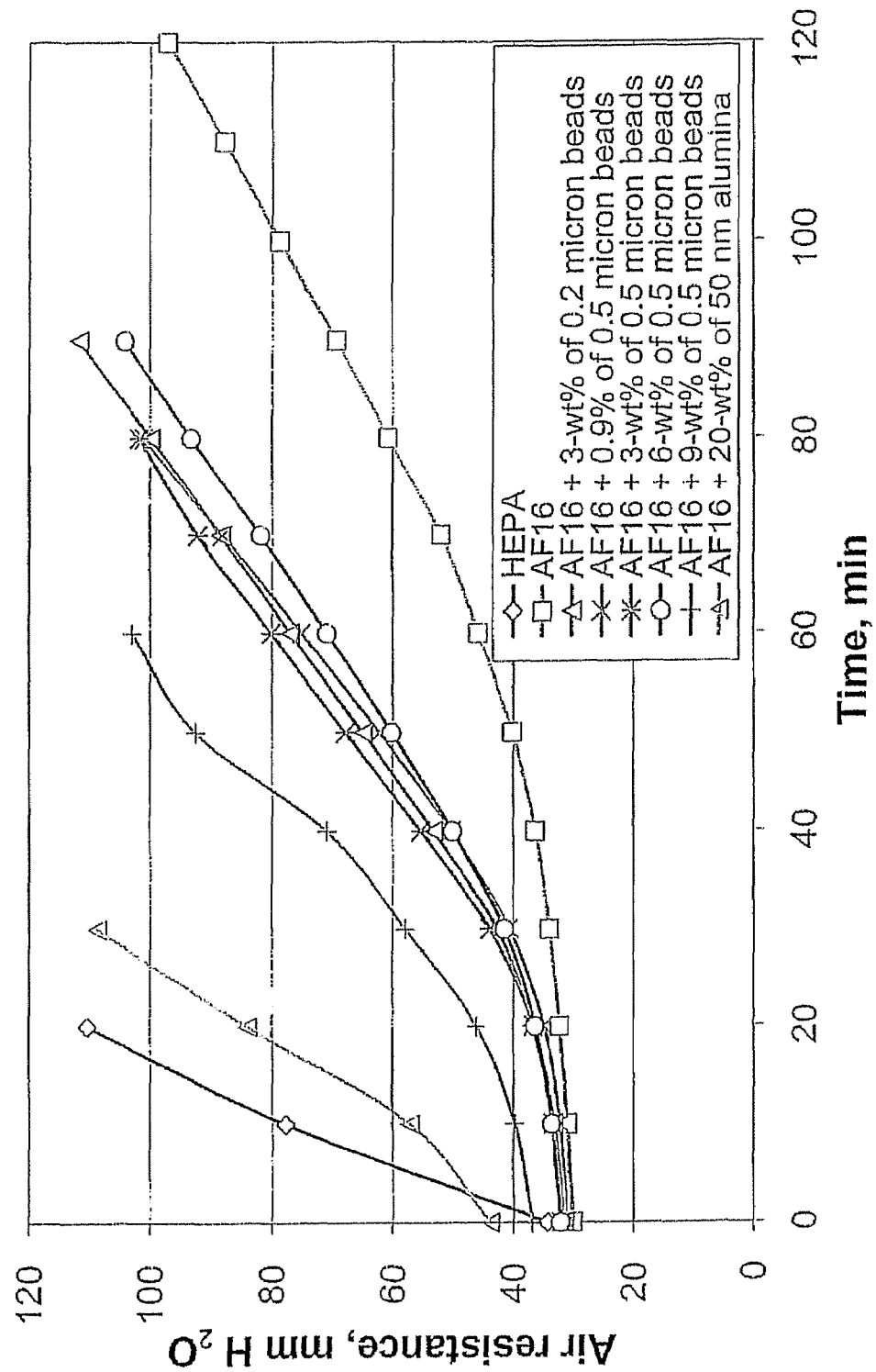
FIG. 7 is a graphical depiction of the air resistance of the claimed nano alumina filters preconditioned with latex beads compared to that of a nano alumina filter without preconditioning and a HEPA filter.

FIG. 7 shows a graphical depiction of the NaCl penetration of nano alumina filters preconditioned with latex beads. Although the initial penetration was riot reduced to 0.03%, the retention increased with continued loading of the NaCl particles. All of the pre-conditioned AF 16 samples had lower initial NaCl penetration than AF 16 itself. There is a trend towards better performance with increased preloading of 0.5 μm latex beads, with the lowest value being 0.047% penetration for 9 wt % latex as compared to the 0.03% penetration that defines HEPA.

Example 6

Figure 8:
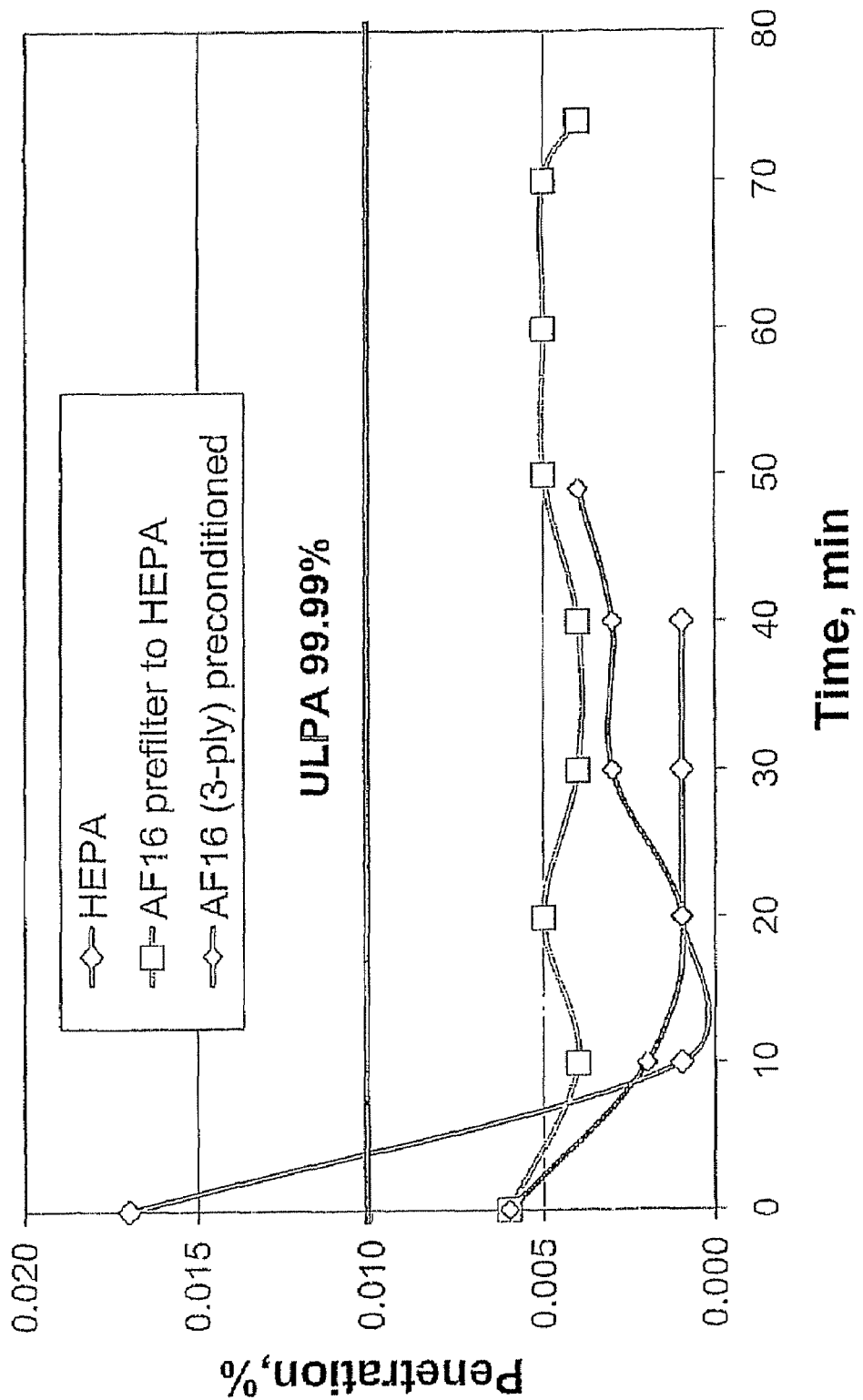
FIG. 8 is a graphical depiction of the penetration of 0.3 μm NaCl aerosols through the claimed nano alumina filters and a HEPA filter.

Filter media were tested for NaCl aerosol retention at Nelson Laboratories as in Example 2. FIG. 8 shows a graphical depiction of the penetration of 0.3 μm NaCl aerosols through test media. In this example, the following samples were compared: HEPA; a single layer of AF16 without preloading that was used as a prefilter for the HEPA filter; and three layers of AF16, preconditioned with latex particles. As shown, the HEPA only filter could not be rated as an ULPA. In contrast, the preconditioned AF16 filter had an initial and continued retention of >99.99%, thereby qualifying it as an ULPA filter. Additionally, as shown in FIG. 8, adding a single layer of AF16 (not preconditioned) as a prefilter to the HEPA also resulted in an ULPA rating. These data show that the claimed nano alumina filter media have a retention that exceed that of conventional HEPA filters such as the Donaldson HEPA filter, and that using nano alumina as a prefilter increases the HEPA rating to an ULPA rating.

Figure 9:
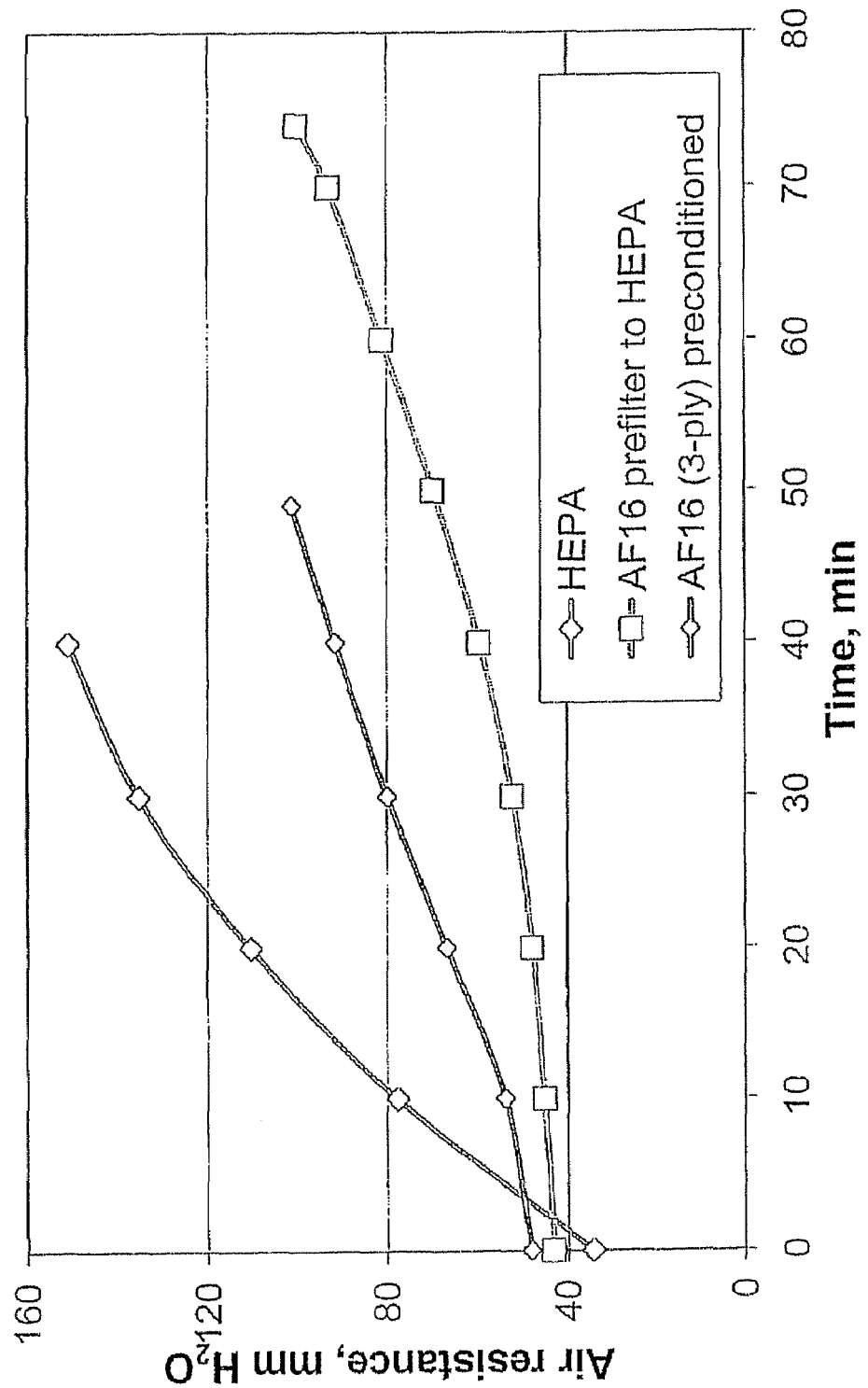
FIG. 9 is a graphical depiction of the air resistance of the claimed nano alumina filters and a HEPA filter during NaCl aerosol capacity testing.

FIG. 9 shows a graphical depiction of the air resistance of the test filters during NaCl aerosol capacity test for the samples described above. The addition of a single layer of AF16 without preconditioning extended the life of the HEPA filter by about 700%, to a 50 mm ΔP threshold, which would result in considerable savings if used in practice.

Thus, the claimed filters are more effective at retaining particles and have a greater life expectancy than conventional HEPA filters and therefore these claimed nano alumina filter media are more cost-effective.

Example 7

Samples of AF16 media were tested at LMS Technologies, Inc. (Edina, Minn.) in accordance with EPA Method 319 regulations that are specific for measuring filtration systems for paint overspray arrestance in the aerospace industry. In U.S. industrial finishing operations, 30% of paint that is sprayed, amounting to 90 million gallons, is overspray, with much of this dispersed into the atmosphere.

Figure 10:
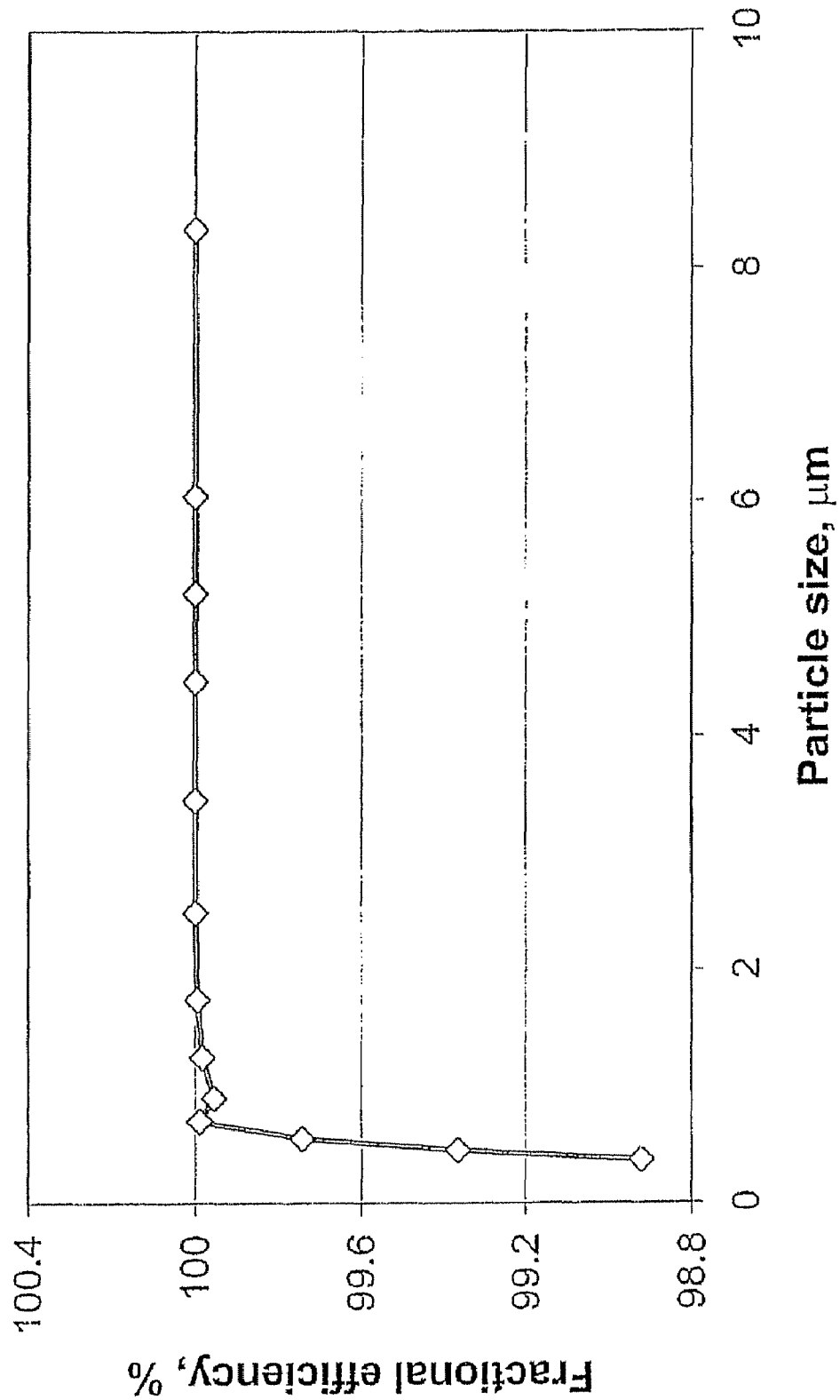
FIG. 10 is a graphical depiction of fractional efficiency of the claimed nano alumina filters as a function of particle size of aerosolized KCl droplets.

One layer of AF16 media was tested at a flow velocity of 15 fpm. The initial pressure drop was 22 mm H$_2$O. FIG. 10 shows a graphical representation of the retention or fractional efficiency of a test filter as a function of particle size. These same data are presented in Table 5.

Figure 14:
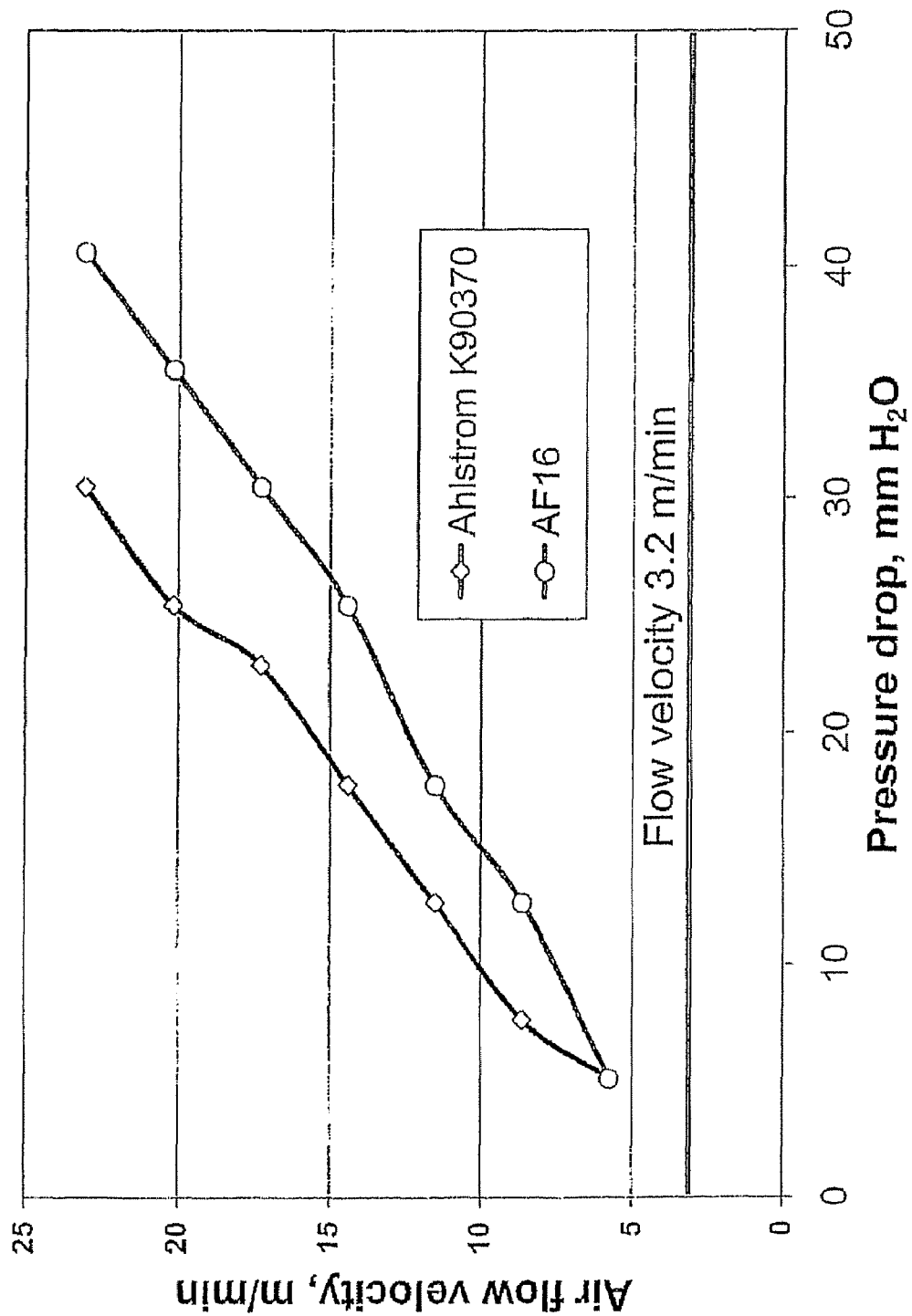

The filter was also compared to a commercial sub-HEPA filter (Trinitex K903-70, manufactured by Ahlstrom). FIG. 14 compares the pressure drop of the Trinitex filter to that of filter AF16. As shown, the pressure drop across the two filters is very similar. Importantly, the retention by the AF16 was extraordinarily better than the EPA specification as well as the Ahlstrom media over all particle size ranges of the comparison. The data show that the new media can substantially improve the performance of sub-HEPA media without requiring preconditioning.

TABLE 5

Retention of KCl aerosols as a function of particle size

| Size range (μm) | Initial retention by one layer of nano alumina filter media AF16 (%) | EPA 319 Specification | Ahlstrom Trinitex |
|---|---|---|---|
| 0.33-0.40 | 98.923 | | 52% |
| 0.40-0.50 | 99.365 | >75% | 59% |
| 0.50-0.60 | 99.743 | | 63% |
| 0.60-0.80 | 99.989 | >85% | 68% |
| 0.80-1.00 | 99.955 | | 74% |
| 1.00-1.50 | 99.983 | | 90% |
| 1.50-2.00 | 99.995 | >95% | 95% |

Example 8

A co-pending patent application addresses the use of silver in controlling the proliferation of bacteria. Therefore, the inclusion of silver in the air filtration media was tested here. Three nano alumina handsheets were prepared from aluminum powder as described for sample HF0404 in example 1, with the exception that silver nitrate (0.1%, 0.3% and 1 wt % as silver to the dry weight of the slurry) was added to the slurry. Samples (25 nm diameter) were mounted in a filter holder and were loaded with 10 ml of 8×10$^7$ CFU/ml of *Klebsiella terrigena* suspension in buffered water solution. Bacteria were eluted from the filters in reverse direction with 3 ml of solution containing 3% beef extract and 0.35% glycine solution at pH 7.5 immediately after loading and then after 1, 5, and 18 hours of dwell.

Figure 11:
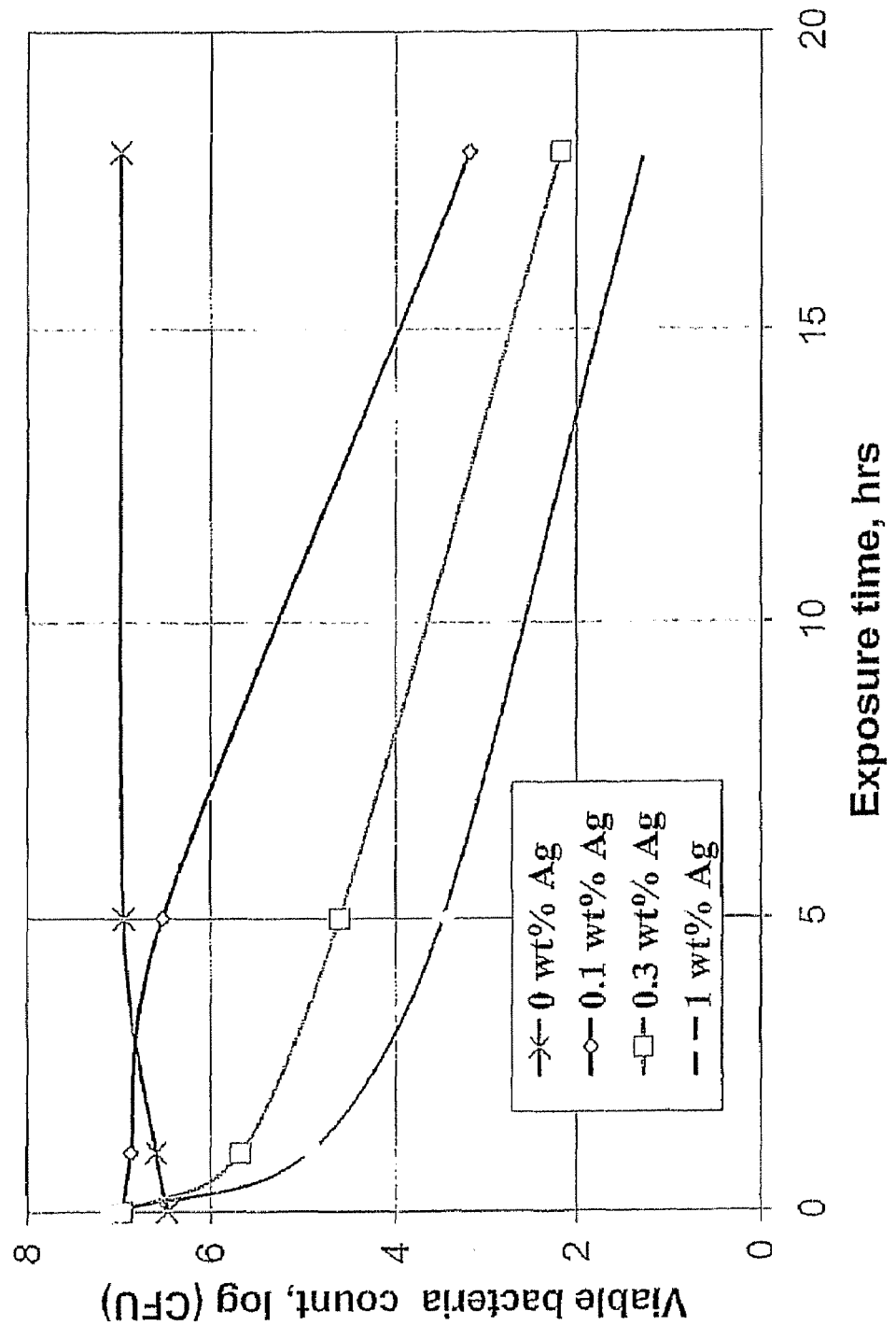
FIG. 11 is a graphical depiction of the antimicrobial effect of the claimed silver impregnated nano alumina filters on bacterial proliferation.

FIG. 11 shows a graphical depiction of the antimicrobial effect of the inclusion of ionic silver on nano alumina fibers as a function of time of exposure to the filter. As shown, silver impregnated nano alumina filters controls bacterial proliferation, with improved control as the percent silver nitrate increased.

Tests also showed that 1% silver had no discernable affect on filtering MS2 virus, demonstrating that the virus efficiency of the filter media was not affected after adsorption of the 1% silver.

These results show that addition of silver nitrate to the filter minimizes any re-entrainment of bacteria or virus off the filter because it acts as an antimicrobial agent. The effluent of silver from filters that had been impregnated was about 30 μg/L, substantially below the 100 μg/L, required by the EPA for drinking water. Once used, the filter can be disposed of as sanitary waste rather than costly hazardous waste.

Example 9

Testing Media Samples with Aerosolized *E. Coli* Bacteria

Figure 12:
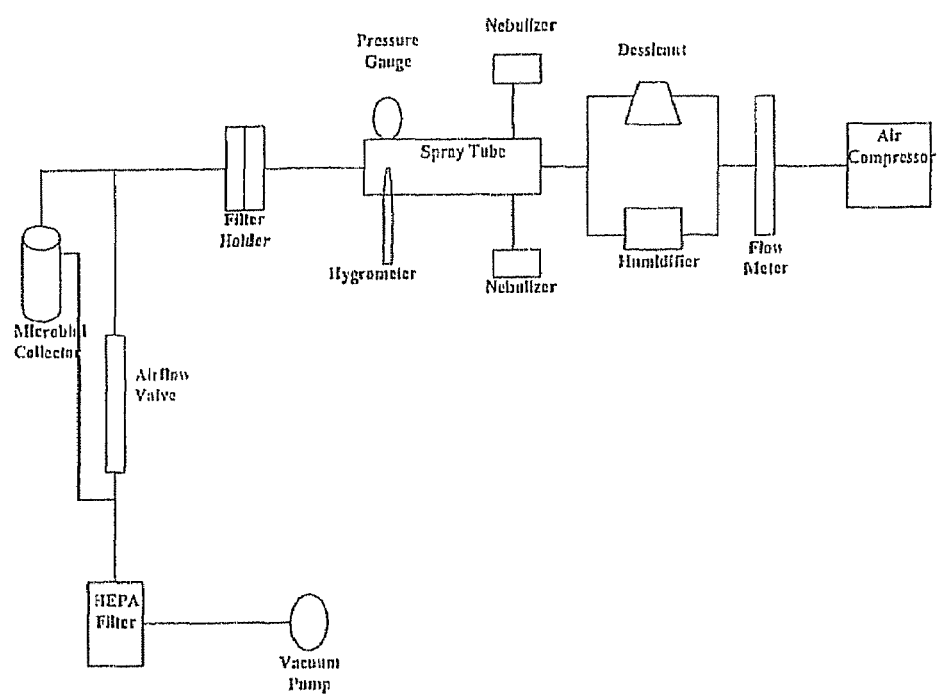
FIG. 12 is a schematic of the system used to challenge the claimed nano alumina filters with waterborne bacterial aerosols.

An apparatus known in the art was assembled and tested with *E. coli* bacteria. In the apparatus, a schematic of which is shown in FIG. 12, 5 ml of *E. coli* $1.4 \cdot 10^9$ CFU/ml suspension in buffer solution was nebulized by a DeVilbiss PulmoMate Nebulizer (Model SR4650D). A second nebulizer was operated with an equal amount of buffer solution. The generated aerosols were injected into a 5 cm diameter, 90 cm long tube. The relative humidity was adjusted by mixing air that passed through the wet and dry arms of the air conditioner beforeentering the spraying tube. The relative humidity and temperature of the air close to the end of the tube were measured by a humidity meter. Approximately ⅓ of the flow from the outlet of the aerosol tube was passed through the AGI-30 impinger. The rest of the flow was passed through the 12 mm inner diameter tubing and was then combined with the air escaping through the impinger. The air flow was passed through the HEPA filter (Whatman, PolyVent-1000 Cat #6713-1075).

Total flow was 38 liters of air per minute. Two nebulizers produced the airflow of 12 L/min (6 L/min each) and 26 L/min of the airflow was supplied by the air compressor. Airflow through the impinger was 12 L/min.

Filter efficiency was calculated as:

$$\% \text{ Efficiency} = \frac{\left(\begin{array}{c}\text{Upstream } E. \text{ coli concentration}-\\ \text{Downstream } E. \text{ coli concentration}\end{array}\right) \times 100\%}{\text{Upstream } E. \text{ coli concentration}} \quad [1]$$

where the upstream *E. coli* concentration was determined without the filter in the *E. coli* laden airstream and the downstream *E. coli* concentration was determined with the filter in the *E. coli* laden airstream, at or near 100% relative humidity.

In the first experiment three layers of the AF16 filter media (not preconditioned with particles) was assembled into a 90 mm diameter filter holder. In the second experiment, one layer of Donaldson HEPA was assembled into the same filter holder. As shown in Table 6, the AF16 filter media had a retention of the bacteria that was about 50 times greater than that of the HEPA filter.

TABLE 6

Percentage efficiency of nano alumina filter against aerosolized *E. coli* challenge (Condition - 32 LPM, 100% RH, Temperature 23.9° C.)

| Filter media | Thickness, mm, (# plies · thickness) | Average Pore size[a], μm | Filter/ No filter | Number of *E. coli* bacteria determined in AGI-30 buffer solution, CFU | *E. coli* retention efficiency, % |
|---|---|---|---|---|---|
| AF16 | 3.6 (=3 × 1.2) | 28 | Filter No Filter | <1 $5.9 \cdot 10^5$ | >99.9998 |
| AF6 | 7.2 (=4 × 1.8) | 38 | Filter No Filter | <4 $5.2 \cdot 10^5$ | >99.9992 |
| AF3 | 0.9 (=1 × 0.9) | 16 | Filter No Filter | <4 $5.2 \cdot 10^3$ | >99.9992 |
| AF11 | 1.3 (=1 × 1.3) | 37 | Filter No Filter | 4 $6.7 \cdot 10^4$ | 99.994 |
| Donaldson HEPA | 0.4 (=1 × 0.4) | 6 | Filter No Filter | 40 $5 \cdot 10^5$ | 99.992 |

Note:
[a]data from Table 1

Each AF sample has a pore size that is substantially larger than the pore size of the conventional HEPA air filter. As is generally known in filtration, larger pore size media have less propensity for clogging. This tolerance for clogging would also extend to the ability of the inventive filters to be less resistant to flooding by water droplets.

The demonstrated ability of nano alumina fibers to remove higher levels of bacteria was a surprising result and is a major benefit, particularly where the filter is used for collective protection as in a hospital where immuno-compromised patients are treated, or for protection during a biological warfare attack. Such media would also be beneficial in an improved respiratory filter to improve bacterial retention. A further benefit is the lower pressure drop of the invention as compared to HEPA, particularly as the filter loads. Finally, another advantage is that the pore size of the nano alumina filter media is much larger, resulting in a much more porous filter, allowing it to retain much more water should it be exposed to continuous loading by water droplets or mists.

Example 10

Two experiments were performed as described in Example 9, with the exception that the aerosol contained MS2 virus (25 nm size), and the testing was done at two different relative humidities. In this case the samples tested had a small pore size (~2 μm) and were 0.4 mm thick.

TABLE 7

Percentage efficiency of nano alumina filter against aerosolized MS2 virus

| Relative Humidity % | Challenge concentration, PFU/ml[a] | Filter/ No filter | Number of MS2 viruses determined in AGI-30 buffer solution, PFU | Detection limit, PFU/ml | MS2 collection efficiency by impinger % | MS2 retention efficiency % |
|---|---|---|---|---|---|---|
| 94 | $2.6 \cdot 10^7$ | Filter[b] | <150 | 100 | NA | >99.96 |
|    |                  | No Filter[c] | $4.2 \cdot 10^5$ | 100 | 2.1 | |
| 60 | $1.3 \cdot 10^7$ | Filter[d] | <1 | 1 | NA | >99.999 |
|    |                  | No Filter[e] | $1.1 \cdot 10^5$ | 100 | 1.3 | |

Notes:
[a] 2 ml of MS2 challenge solution was aerosolized;
[b] Challenge time - 6 minutes; collected volume of virus solution - 1.5 ml;
[c] Challenge time - 10 minutes; collected volume of virus solution - 2.2 ml;
[d] Challenge time - 6 minutes; collected volume of virus solution - 1.0 ml;
[e] Challenge time - 6 minutes; collected volume of virus solution - 1.5 ml.

Table 7 shows that the filter had a high collection efficiency for aerosolized virus. These results are important because viruses, which are generally one or two orders of magnitude smaller than bacteria, are very difficult to retain by depth filter media. The retention of virus by HEPA is also problematic because many pathogenic viruses are smaller than 0.1 µm in size, which is substantially smaller than the 0.3 µm test particle used in defining HEPA. Effective filtration of a monodisperse virus would be very inefficient. If the virus is enveloped in a water aerosol, then HEPA filters that are generally hydrophobic lose efficiency as water accumulates. The claimed nano alumina filter media provides a higher efficiency and capacity and would therefore be useful in filter masks and collective protection systems, such as in hospitals and for biodefense.

Example 11

Lyocell/NC and Cellulose/NC Handsheets

Eighty grams of refined lyocell (20% solids), purchased from Fiber Innovation Technology, were dispersed in 0.75 L of RO water, using a kitchen style blender (12 speed Osterizer blender) on a "high-ice crush" setting for 2 minutes. The quantity of aluminum powder added to the mixture (1 g) was such that after reaction the solids would consist of 12 parts AlOOH and 88 parts lyocell fibers (sample AF34 in Table 8). Similarly the quantities of aluminum powder added to the mixture (2 g) and 1 g of fumed silica dry powders before aluminum-water reaction were such that after reaction the solids would consist of 20 parts AlOOH, 5% fumed silica and 75 parts lyocell fibers (sample AF35 in Table 8). As a control, the handsheets of pure lyocell (AF33), cellulose (AF28) and a mixture of 72% cellulose and 28% AlOOH (AF32) were prepared.

TABLE 8

Composition and properties of lyocell/cellulose containing handsheets and results of MS2 retention

| Sample # | Composition | Basis weight g/m² | Breaking length, m | Porosity, fraction | Average pore size, µm | Number of layers | MS2 retention[a] % |
|---|---|---|---|---|---|---|---|
| AF28 | 100% Cellulose | 166 | 460 ± 28 | 0.82 | 8 | 3 | 0% |
| AF32 | 72% Cellulose + 28% NC[b] | 229 | <10 | 0.89 | 13 | 3 | 20% |
| AF33 | 100% Lyocell | 166 | 1022 ± 136 | 0.50 | 1.8 | 1 | 0% |
|      |              |     |            |      |     | 2 | 10% |
|      |              |     |            |      |     | 3 | 20% |
| AF34 | 88% Lyocell + 12% NC[b] | 188 | 1013 ± 19 | 0.50 | 2.0 | 1 | 99.9994 |
|      |                         |     |           |      |     | 2 | >99.9997 |
|      |                         |     |           |      |     | 3 | >99.9997 |
| AF35 | 75% Lyocell + 5% Cab-O-Sil + 20% NC[b] | 183 | 906 ± 44 | 0.50 | 1.8 | 1 | >99.9997 |
|      |                                          |     |          |      |     | 2 | >99.9997 |
|      |                                          |     |          |      |     | 3 | >99.9997 |

Notes:
[a] $2.0 \cdot 10^7$ PFU/ml challenge solution of MS2 and was prepared. A 10 ml aliquots of MS2 suspension were filtered through 25 mm diameter discs at flow rate of 40 ml/min;
[b] NanoCeram Discs (25 mm) were cut from samples, as described above, and were challenged with MS2 viruses at an input concentration of $2.0 \cdot 10^7$ PFU/ml and at flow rate of 40 ml/min. Table 8 shows that the handsheets made from pure cellulose, microfibrillated cellulose (lyocell), or a 72% cellulose/28% NC mixture, have no or very little MS2 virus removal efficiency. The 88% lyocell/12% NC and 75% lyocell/5% Cab-O-Sil/20% NC mixture have efficiencies even greater than a single layer of NC (99.5%, see Table 18), indicating that lyocell is an excellent fiber support for the nano alumina.

Examples—Fibrous Structure

The Examples provided below show the incorporation of fine, ultrafine, or nanosize particles into a non-woven structure. Examples include a sorbent, a catalyst, powdered activated carbon, a nanosize carbon, RNA, $TiO_2$ particles (50 nm), and filmed silica (primary particle size approximately 15 nm, as agglomerates several hundred nanometers large). In each case, the forming time is substantially less when nano alumina is used, making it practical to manufacture the new media by wet forming (paper making) methods.

Examples are also provided that compare the claimed fibrous structure containing powdered activated carbon to that of commercially available activated carbon media by comparing the breakthrough of soluble iodine through the respective media. The breakthrough through a single layer of approximately the same basis weight of the commercial media is almost immediate, whereas the claimed filtration medium has a life that is about 800 times greater.

Example 12

Starting Materials

Slurries of nano alumina on coarse fibers such as microglass or lyocell were prepared from aluminum powder. Briefly, two grams of microglass fibers (Lauscha Fiber International, borosilicate glass, grade B-06-F, 0.6 μm diameter) were dispersed in 0.75 L of permeate from a reverse osmosis water generator, using a kitchen style blender (12 speed Osterizer blender) on a "low-clean" setting for 2 minutes. Quantities of 1.36 g and 0.61 g, respectively, of aluminum powder (Atlantic Equipment Engineers, grade AL-100, 1-5 μm) were added to glass microfibers such that after reaction they would produce respectively 60 parts AlOOH/40 parts microglass and 40 parts AlOOH/60 parts microglass.

Ammonium hydroxide (8 ml of 36% per 750 ml of mulch) was added to initiate the reaction of aluminum with water to form the AlOOH and hydrogen. The mixture was heated to boiling and kept at boiling for 10 minutes until the mixture turned white (unless the added particle is black), and was then cooled and neutralized to approximately pH 7 using hydrochloric acid. The result is nano alumina formed onto the coarser fiber (hereinafter, "NC" mixture), such as microglass or lyocell, described in the subsequent examples.

Next, the sorbent particles are added as a dry powder or a suspension of powders (e.g. $TiO_2$) in water to the slurry of nano fibers and coarse fibers, either before or after the aluminum-water reaction. The slurries were then manually mixed.

The following examples show the claimed fibrous structure comprising nano size particles, including amorphous fumed silica (average particle size (APS) ~15 nm, Cabot Corp., Cab-O-Sil, grade M5), $TiO_2$ powders with APS ~50 nm, that are produced in Russia and sold by Argonide Corp, and ribonucleic acid (RNA), with the smallest dimension is less than about 1 nanometer. Other examples are given where the particle is a sorbent (PAC) obtained from Calgon Carbon (WPH grade, 99%-100 mesh, 95%-200 mesh and 90%-325 mesh, APS ~28 μM), and 30 nanometer carbon nano powders obtained from Aldrich (Cat. #633100).

In other examples, Arizona test dusts, principally composed of silica, were added to the NC mixtures. Two different grades of the Arizona test dusts were used, 0-3 μm (APS 1.13 μm) and 0-5 μm (APS ~2 μm), both available from PTI Powder Technology Inc.

An example is also shown for a catalyst added to the NC mixture, Carulite-400 (type C), which is a copper activated manganese dioxide powder (Hopcalite type) with particle size of 3-8 μm, available from Carus Chemical Company.

The ratio of the particle to the nanoalumina/coarse fiber ("NC") network is dependent on the desired performance properties of the media. For instance, there are trade-offs on the ability of a PAC-NC composite to remove organic versus particulate contaminants that would alter the selected PAC content. A PAC-NC composite that has a reduced amount of PAC increases the ability of the fibrous structure to remove bacteria, viruses, and other contaminants from the fluid stream, thus yielding, for example, drinking water that is substantially sanitized from microbials as well as removing soluble contaminants including chlorine, halogenated hydrocarbons, and toxic soluble metals.

Other fibers such as cellulose or polyester bicomponent may be added for the purpose of strengthening the fibrous structure and making it more flexible.

Example 13

Formation of Furnishes

In this example, two grams or 1.3 grams of particles as described in Example 12 (i.e., amorphous fumed silica, RNA, Carulite, fine test dust, nanocarbon and PAC, and $TiO_2$) were added to the 60/40 or 40/60 NC slurries prepared as described in Example 12 to produce NC-slurries containing 28-wt % particulate powders. The slurries were manually mixed. Similarly, 5 g and 3.33 g of the powders listed above were added to the 60/40 and 40/60 slurries to produce 50-wt % particulate powder loading. With the exception of $TiO_2$ loaded NC structure (see below), the powder was added after the reaction was initiated. In all examples, experiments were run adding particles before and after the reaction was initiated in order to evaluate when the optimal time is to add particles to the mixture. However, where particles comprise RNA (Table 13), particles are added after initiating the reaction in order to avoid denaturing the particles. In the case of PAC (Tables 14, 15), the particles are added either prior to or after initiating the reaction.

The mixtures were then diluted with RO water in a ratio of 2000:1. A 500 ml aliquot of the slurry was poured into a 47 mm vacuum filter holder. The furnish was filtered through a 47 mm diameter filter disc punched out from a woven Teflon media (70 mesh size) placed onto the filter holder. Vacuum from a rotary pump was applied to the water collection reservoir and the forming time (the time from the start of the filtration step until all fluid was passed through the formed disc) was recorded as forming time. The finished discs were oven dried and weighed after cooling and after reaching equilibrium with the laboratory air. In some cases, the latter weight was recorded and the total weight was compared to the weight of the original components in order to estimate the yield of particles on the NC substrate.

Example 14

Nano $TiO_2$/Nano Alumina/Microglass Fibrous Structures

Five (5) g of 50 nm $TiO_2$ nanopowders were dispersed in a glass beaker filled with 1 L, of RO water and then agitated in an ultrasonic generator (Fisher Scientific, Model F20) for 30 min. After 24-hr stand, the top portion (~0.6 L) of the supernatant was slowly decanted to separate the suspended particles from any agglomerates settling down.

One hundred ml aliquots of the above $TiO_2$ suspension were added to a 0.75 L, of NanoCeram 60/40 that had been previously formed as in Example 12. Two control mixtures were used, one containing 0.85 L of $TiO_2$ water (to measured weight) and a second containing microglass (no nano alumina) in 0.85 L. The concentration of $TiO_2$ nanopowders was determined by evaporating the water and weighing the residue. Similarly two hundred ml aliquots of the above $TiO_2$ suspension were added to a 0.75 L of the 60/40 furnish prior to aluminum-water reaction. Control mixtures of 0.95 L of $TiO_2$ in water (to measure weight) and a second containing microglass (no nano alumina) in 0.95 L. The concentration of $TiO_2$ nanopowders in the controls was also determined by evaporating the water and weighing the residue.

Table 9 shows the composition of the furnishes, their forming time and the turbidity of the collected effluent.

TABLE 9

Forming of nano $TiO_2$-containing non-woven

| Sample # | % Nano alumina[a] | % glass micro fibers[a] | % $TiO_2$ particles | Forming time, min | Effluent turbidity, NTU |
|---|---|---|---|---|---|
| 628 | 56 | 38 | 7[b] | 0.7 ± 0.2 | 20 |
| 629 | 0 | 94 | 7[b] | 2.2 ± 0.6 | 114 |
| 643 | 53 | 35 | 12[c] | 1.0 ± 0.2 | 40 |
| 644 | 0 | 88 | 12[c] | 23 ± 6 | 132 |

Notes:
[a]ratio of nano alumina/microglass is 60%/40%;
[b]$TiO_2$ powders were added to 60/40 furnish that had been previously formed;
[c]$TiO_2$ powders were added before the aluminum-water reaction had been initiated.

Samples 628 and 643, which included nano alumina in the mixture, had a much more rapid forming time than samples 629 and 644, which did not have any nano alumina added to the mixture. A comparison of the turbidity of the respective eluents shows that when nano alumina is present, there is greater retention of the nano particle into the fibrous structure.

The average pore size of the titanium dioxide containing fibrous structure, based upon water flow measurements as shown in Examples 1-10 above was estimated to be about 3 μm. Yet it is able to contain about 7-12% of its basis weight of a particle that is almost two orders of magnitude smaller than the pore size of the finished media. Without being bound by theory, the forming time is reduced because the nanoparticles are tightly bound to the NC structure and do not constrict flow, while in the absence of nanoalumina, the nanoparticles are free to agglomerate within the pore structure, thickening the mixture and impeding flow.

Other nano size oxides and refractory compounds such as carbides, nitrides or nano diamond could be similarly retained in such a structure. For instance, pigment oxides and light sensitive nano materials could be incorporated into such a fibrous structure, and a fibrous structure containing nano diamond or nano tungsten carbide could be used as a polishing cloth for high precision surface finishing. The structure would not only serve to distribute and suspend the abrasive, but it would also serve as a collector of debris developed during polishing.

Example 15

Silica/NC/Microglass Filter Fibrous Structure

A fibrous structure containing silica (Table 10) was prepared as described in Example 13. In two samples (sample 630 and 642), filmed silica was added to the furnish. Fumed silica is known to form colloidal suspensions that are very difficult to filter. It is used extensively as a thickener.

In sample 630, the fumed silica was added before the reaction. Of the initial solids, equivalent to approximately 200 g/m², only 63 g/m² was collected on the filter. That amounts to approximately 90% of the original alumina and fumed silica added, leaving only the microglass fibers to be retained on the 70 mesh filter. We hypothesize that adding the fumed silica at the beginning results in its combining with the nano alumina as it is being formed, with the result that there was little or no adherence of the nano alumina to the microglass, causing the loss of both silica and nano alumina to the effluent.

TABLE 10

Forming of NC non-wovens with silica particles

| Particle | Particle size, μm | Sample # | % Nano alumina[a] | % glass micro fibers[a] | Wt % silica, initial | Forming time, min | Basis weight g/m² | Particle losses, % |
|---|---|---|---|---|---|---|---|---|
| Fumed silica | 0.01 | 630 | 43 | 29 | 28[b] | 1.3 | 63[c] | ~90[d] |
| | | 631 | 0 | 72 | 28 | >100[e] | NA[f] | NA[f] |
| | | 642 | 43 | 29 | 28[g] | 1.2 | 212[c] | 0 |
| Fine test dust, 0-3 μm | 1 | 632 | 43 | 29 | 28[b] | 1.5 | 217[c] | 0 |
| | | 633 | 0 | 72 | 28 | 35 | 140[c] | ~80[h] |
| Fine test dust, 0-5 μm | 2 | 634 | 43 | 29 | 28[b] | 0.6 | 200[c] | 0 |
| | | 635 | 0 | 72 | 28 | 13 | 140[c] | ~80[h] |

Notes:
[a]ratio of NC/microglass is 60%/40%;
[b]powders were added before the aluminum-water reaction;
[c]target basis weight is 200 g/m²;
[d]both, NC and silica were lost as NC-silica aggregates;
[e]filtering terminated after 100 min where only 40% of mixture passed through the filter disc
[f]data not attainable
[g]powders were after the aluminum-water reaction;
[h]almost all silica particles were lost.

In sample 642, fumed silica was added after the aluminum-water reaction. In this case, the forming time was very rapid, and there was no loss of weight. This demonstrates a method for retaining fumed silica, with its very high surface area (200±25 m²/g), into a fibrous structure.

Figure 15:
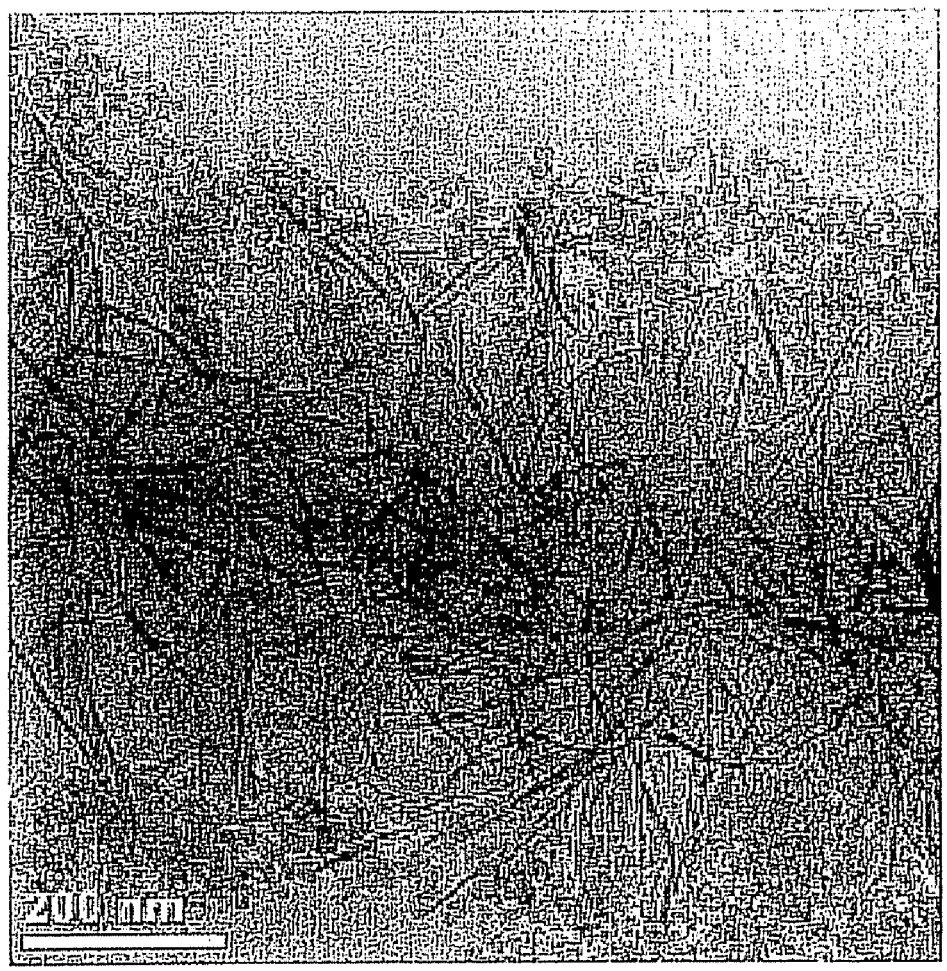

FIG. 15 is a transmission electron microscopic view of same 642. The nanofibers appear as whiskers estimated from this and other micrographs to be 2-3 nanometers in diameter with a length of several hundred nanometers. Spheres of nano silica appear along the axis, completely enveloping the nano alumina/microglass composite.

In sample 631, the control without nano alumina, the fumed silica formed a colloid which clogged the mesh, considerably extending the forming time to greater than 100 minutes.

Samples 632 through 636 represent media produced by adding test dusts that are used extensively in filter development and are comprised mostly of micron size silica. The test dust was added prior to the aluminum reaction. When there was no dust added to the mixture, the loss of particles into the effluent was substantially complete and when dust having sizes of 0-3 or 0-5 μm was added to the mixture, the loss of particles into the effluent was substantially zero. Additionally, the forming time was 35 and 22 times greater, respectively, for the 0-3 and 0-5 μm dusts, without the nano alumina than with it being present in the furnish.

The attached fumed silica can function as a sorbent or be chemically manipulated by reaction to attach organic legends.

Example 16

Catalyst

Testing of Sample 634, shown in Example 15 above, was repeated in this example, with the exception that Carulite, a copper activated $MnO_2$ catalyst, was substituted for the silica.

The forming time, as shown in Table 11 shows that the addition of Carulite catalyst to the NC furnish has a forming time which is a fraction of that furnish without the nano alumina. A short forming time is related to freeness and is vital in continuous manufacture of non-woven media by wet forming methods.

The resulting catalyst would be more efficient than granular forms, allowing shallower bed depths to achieve oxidation of carbon monoxide or ozone because the larger surface area of the catalyst compared to that of a large granule results in faster reaction of, e.g., gas phase components.

The catalyst could also be a precious metal such as nanosize platinum attached to the nano alumina. Both the nano alumina and the microglass supporting structure are stable at approximately 150° C. and above so that the NC/platinum catalyst structure is also stable. At temperatures starting at about 150° C., nanosize platinum is capable of oxidizing contaminants such as carbon monoxide and unburned hydrocarbons from gases including automotive exhausts.

TABLE 11

Forming of NC non-woven with a catalyst

| Particle | Primary particle size, μm | Sample # | % Nano alumina[a] | % glass micro fibers[a] | Wt % Carulite particles | Forming time, min |
|---|---|---|---|---|---|---|
| Carulite 400, Type C | 3-8 | 624 | 43 | 29 | 28[b] | 1.1 ± 0.4 |
| | | 625 | 0 | 72 | 28 | 4 ± 1 |

Notes:
[a]ratio of NC/microglass is 60%/40%;
[b]powders were added before the aluminum-water reaction.

Example 17

Nanocarbon

Testing of Sample 634, shown in Example 15 above, was repeated in this example, with the exception that nanocarbon particles were substituted for the silica. Table 12 shows that nanocarbon loaded NC furnish has a forming time which is a fraction of that furnish without the nano alumina. No difference in forming time was noted when the nanocarbon was added either before or after the NC was formed.

Such forms of carbon, suspended in a non-woven, would have sorption properties exceeding GAC, and perhaps also PAC.

TABLE 12

Forming of Nanocarbon-containing NC

| Particle | Primary particle size, μm | Sample # | % Nano alumina[a] | % glass micro fibers[a] | Wt % nano carbon | Forming time, min |
|---|---|---|---|---|---|---|
| Nanocarbon | 0.03 | 645 | 43 | 29 | 28[b] | 0.45 ± 0.10 |
| | | 646 | 0 | 72 | 28 | 2.0 ± 0.5 |
| | | 647 | 43 | 29 | 28[c] | 0.5 ± 0.1 |

Notes:
[a]ratio of NC/microglass is 60%/40%;
[b]powders were added before NC formation;
[c]powders were added after NC formation

Example 18

RNA

Testing of Sample 634, shown in Example 15 above, was repeated in this example, with the exception that RNA (Ribonucleic acid from Torula yeast, available from Sigma, Cat #R6625) was substituted for the silica. As shown in Table 13, RNA loaded NC furnish has a forming time that is about 8% of that furnish without the nano alumina.

TABLE 13

Forming of Bio-Engineered Nanostructures

| Particle | Particle size, μm | Sample # | % Nano alumina[a] | % glass micro fibers[a] | Wt % RNA | Forming time, min |
|---|---|---|---|---|---|---|
| RNA | 0.001[c] | 648 | 43 | 29 | 28[b] | 0.45 ± 0.10 |
|  |  | 649 | 0 | 72 | 28 | 5.5 ± 0.5 |

Notes:
[a]ratio of NC/microglass is 60%/40%;
[b]powders were added after the aluminum-water reaction,
[c]RNA minimum dimension This example demonstrates that nano alumina fibers can attach elementary biological particles that could be incorporated into a fibrous structure to provide a biological function. In an example, biologically active components such as growth factors are incorporated into medical structures such as non-woven wound dressings to enhance healing. In a further example, nano silver particles are added to such dressings to serve as an antimicrobial. In another example, the fibrous structure is used to deliver nutritives and drugs to permeate the epidermis. In still other examples, a fibrous structure could also is used to sense where a specific nucleic acid or protein, attached to the non-woven, can interact with a specific biological or chemical agent.

In still other examples, artificial macromolecular particles, including for examples, polymer particles having specific functional groups, are also distributed and fixed into a non-woven format. In examples, bacteria are attached to serve as a biocatalyst. Bacteria suspended in a non-woven maintains viability because of the ease of perfusion of oxygen, carbon dioxide and waste products through the media.

Example 19

Powdered Activated Carbon

Testing of Sample 634, shown in Example 15 above, was repeated in this example, with the exception that powdered activated carbon (PAC) was substituted for the silica. As shown in Table 14, the fibrous structure comprising PAC has a forming time which less than 5% of that furnish without the nano alumina.

TABLE 14

Forming of PAC mixtures

| Particle | Sample # | % Nano alumina | % glass micro fibers | % particles estimated at start | Forming time, min | Basis weight g/m² |
|---|---|---|---|---|---|---|
| Calgon | 650 | 43[a] | 29[a] | 28 | 0.6 | 198[b] |
| PAC | 651 | 0 | 72 | 28 | 13 | 200[b] |

Notes:
[a]ratio of NC/microglass is 60%/40%;
[b]target basis weight is 200 g/m²

Example 20

Lyocell

Ten grams of refined lyocell (20% dry weight), purchased from Fiber Innovation Technology, were dispersed in 0.75 L of RO water, using the blender described in Example 12 on a "high-ice crush" setting for 2 minutes. The quantity of aluminum powder added to the mixture (0.61 g) was such that after reaction the solids would consist of 40 parts AlOOH and 60 parts lyocell fibers. Dry PAC powders were added before aluminum-water reaction and the slurries were then manually mixed in a 1 L beaker and the aluminum-water reaction was carried out as in Example 12.

Table 15 shows the composition of a PAC-containing furnish and one without nano alumina. The forming time of the PAC version is 16% when containing nano alumina. The influent turbidity of the PAC-NC furnish was 10 compared to an influent turbidity of 360 NTU without nano alumina, apparently as a result of rapid integration of the PAC with the other fibers Macro fibrous agglomerations were visibly formed in the stock solution when nano alumina was present. It was noted that settling was very rapid when a half liter of stock solution of PAC-NC was mixed in a 750 ml beaker, and settling occurred within the beaker within 30-40 seconds, eventually clearing about 80% of volume of the supernatant to a turbidity less than 10 NTU, while the PAC/lyocell (without nano alumina) mixture did not settle for several hours. It was also noted that the effluent turbidity in the case of PAC-NC was approximately 12 times less than when nano alumina was absent, with the result that a large fraction of activated carbon particles go into the drain. It is likely that these would be the smallest of the particles, and the ones most likely to contribute to rapid adsorption kinetics. The ability of the NC to form aggregates with PAC, resulting in a high yield of composite, was clearly demonstrated with lyocell as a substitute for microglass.

TABLE 15

Forming of PAC mixtures with lyocell

| Particle | Sample # | % Nano alumina | % lyocell Fibers | % PAC | Forming time, min | Influent turbidity, NTU | Effluent turbidity, NTU |
|---|---|---|---|---|---|---|---|
| Calgon | 652 | 29 | 43 | 28 | 0.8 ± 0.1 | 10 ± 2 | 1.1 ± 0.2 |
| PAC | 653 | 0 | 72 | 28 | 5.0 ± 1.4 | 360 ± 40 | 13 ± 2 |

Example 21

PAC Handsheets

In this example, various handsheets were prepared from furnishes as in Example 20, except that the components were increased for the larger area test samples. Additionally, in this example, bicomponent fiber (Invista T105) and cellulose were added to improve flexibility and strength. The cellulose was added before the aluminum water reaction was initiated, and the bicomponent was added after the furnish was cooled and neutralized to about pH 7. Finally, in this example, the furnish was diluted to 500:1 rather than the 2000:1.

Handsheets, 12"×12", were prepared using a headbox with suction of water through a screen to form the paper like sheet. The handsheet was air dried at room temperature. In samples where a polymeric fiber such as bicomponent was used, the handsheets were oven dried and cured at 160° C. for twenty minutes. A handsheet with pure NanoCeram media without any carbon, denoted as NC in Table 16, was prepared in a similar fashion.

TABLE 16

Composition and properties of PAC containing handsheets

| Media | % AlOOH | % Cellulose | % polyester fibers | % glass micro fibers | % PAC | Thickness mm | Basis weight $g/m^2$ | Average pore size, μm |
|---|---|---|---|---|---|---|---|---|
| 616 | 15 | 9 | 8 | 16 | 52 | 1.2 | 276 | 3.8 |
| 617 | 14 | 8 | 8 | 13 | 57 | 1.2 | 269 | 3.7 |
| 618 | 15 | 9 | 16 | 14 | 46 | 1.5 | 287 | 4.8 |
| 619 | 12 | 7 | 25 | 12 | 44 | 2.2 | 356 | 5.8 |
| 620 | 12 | 7 | 14 | 12 | 55 | 1.2 | 297 | 3.9 |
| 621 | 11 | 7 | 27 | 11 | 44 | 1.9 | 322 | 6.8 |
| NC | 37 | 20 | 13 | 30 | 0 | 0.8 | 220 | 2.4 |

Pore size is determined as described above in Examples 1-10. The pore size of all test samples is larger than that of nanoalumina/microglass filters, resulting in less pressure drop and higher flow rate capability.

Example 22

The purpose of this series was to measure retention of microbes by the fibrous stricture and to compare it to filters comprising only nano alumina/microglass. A 25 mm disc was cut from sample number 617, described in Example 21 and Table 16 above. Another 25 mm disc was cut from NC media. The discs were challenged with a solution of *Brevundimonas diminuta* (available from ATCC, Cat. No 11568). *B. diminuta* is the smallest culturable bacteria, having a minor dimension of only 0.3 μm. Both types of samples were challenged with a 10 ml aliquot of bacteria at a rate of 40 ml/min, were collected into sterile vials, and were then assayed for *B. diminuta*. While the PAC-NC was capable of 99% retention (Table 17), the NC without the PAC was superior. Reduction of the PAC from its high level (57%) enhances bacteria retention. Both types of filters were also challenged with MS2 viruses (available from ATCC, Cat. No 15597-B1) that are 25 nanometers in size. Table 18 shows that the PAC-NC has almost equivalent virus retention to NC.

TABLE 17

*B. Diminuta* retention by NC and PAC/NC media

| Media | Thickness, mm | Basic weight, $g/m^2$ | Input concentration, $CFU^a$/ml | *B. Diminuta* removal[b], % |
|---|---|---|---|---|
| 617[c] | 1.2 | 269 | $1 \cdot 10^4$ | 99 |
| NC | 0.8 | 220 | $7 \cdot 10^5$ | 99.95 |

Notes:
[a] Colony Forming Units (CFU);
[b] a 10 ml aliquots were passed through 25 mm discs at rate of 40 ml/min and collected into sterile vials;
[c] 57-wt % of PAC (see Table 16).

TABLE 18

MS2 retention by NC and PAC/NC media

| Media | Thickness, Mm | Basic weight, $g/m^2$ | MS2 input concentration, $PFU^a$/ml | MS2 removal[b], % |
|---|---|---|---|---|
| 616[c] | 1.2 | 276 | $6 \cdot 10^6$ | 99 |
| 617[c] | 1.2 | 269 | $1.8 \cdot 10^6$ | 99 |
| NC | 0.8 | 220 | $6 \cdot 10^5$ | 99.5 |

Notes:
[a] Plaque Forming Units (PFU);
[b] a 10 ml aliquots were passed through 25 mm discs at rate of 40 ml/min and collected into sterile vials;
[c] see Table 16.

Example 23

The purpose of this series was to measure the dynamic adsorption efficiency of soluble contaminants from an aqueous stream. Iodine was used as a surrogate because the capacity of activated carbons is quoted by manufacturers of GAC and PAC carbons as iodine number. Iodine is also a suitable surrogate for chlorine, which is intentionally added as a disinfectant into water streams, but contributes to poor taste and odor of drinking water. Drinking water filters use activated carbons to remove chlorine.

In this example, Iodine solutions of 20 ppm were passed through single layer, 25 mm discs of several furnishes of PAC-NC at a flow rate of about 50 ml/min. Two ml aliquots were collected into a cuvette (1 cm pass length). The absorbance values of both stock solution and the effluent were measured at a wavelength of 290 nm with the use of a Genesys-10 UV/VIS spectrophotometer. The method has a detection limit of approximately 0.3 ppm.

The data in Table 19 show that the volume of effluent reaches 0.5 ppm (above 0.5 ppm, iodine taste is apparent to an average person) and 10 ppm (50% of the influent level of 20 ppm).

The efficiency of PAC/NC structure to retain iodine under such dynamic conditions is compared to media from three manufacturers (A, B, and C). The media was sectioned from cartridges (2.5" diameter×10" long) obtained commercially.

Figure 16:
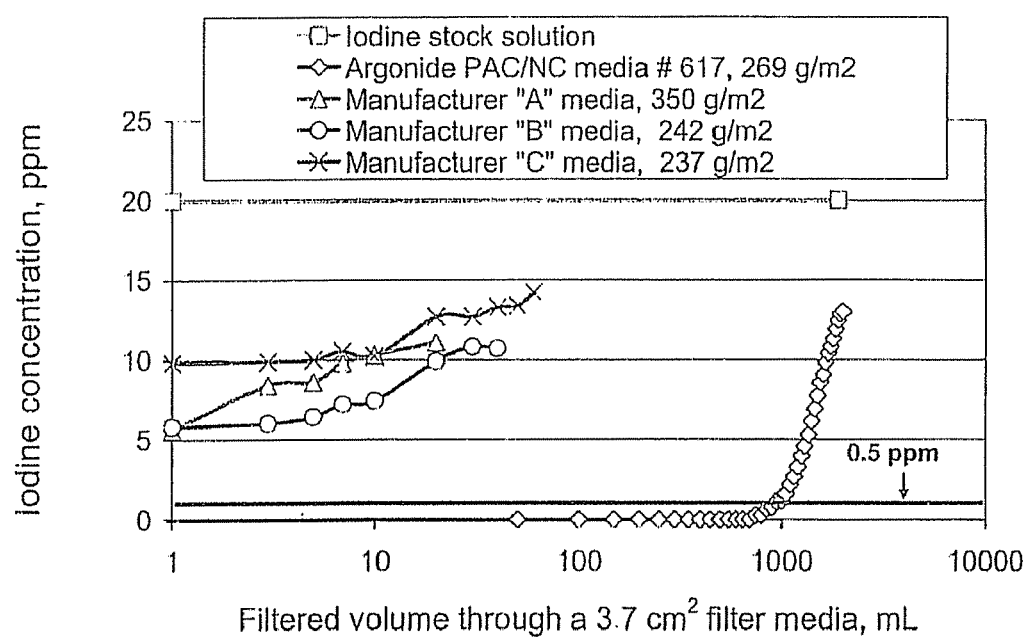

Breakthrough was almost immediate in the case of the commercially available filter media, while the PAC-NC stricture had extensive capacity for iodine. FIG. 16 shows a breakthrough curve for sample 617 compared to the media of the three manufacturers. A semi-log plot is used to enhance the details of the breakthrough curves, particularly for the commercial filter media.

The data also show that a single layer of the commercial media would immediately allow iodine into the effluent that would be detectable by taste and odor, In contrast, the new PAC-NC structure was able to pass approximately 800 ml of solution containing 20 ppm iodine before iodine reached 0.5 ppm. This extraordinary dynamic capacity, with such a rapid adsorption reaction compared to commercial media (greater than 800 to 1), was not anticipated. While not wishing to be bound by theory, it is likely that the fine particles of powdered activated carbon are retained within the structure and not washed out.

Table 19 shows the volume of solution purified of iodine to a concentration of 0.5 and 10 ppm. The amount of iodine adsorbed to 10 ppm is shown, along with a calculated value of iodine capacity, comparing the mass of iodine removed under dynamic conditions versus the static adsorption capacity from manufacturers' iodine number values. The PAC/NC samples all had similar breakthrough curves, with each retaining approximately 55%-72% of the static capacity for iodine before detecting iodine leakage, while the capacity utilized by the commercial media was at most only 3.4%. These data highlight the benefits of utilizing very fine particulates that are retained within a structure to physically adsorb or chemisorb contaminants from a fluid.

TABLE 19

Adsorption of 20 ppm iodine by a single layer of media

| Media | Basis weight, g/m² | % of carbon in media | Volume (ml) of iodine to 0.5 ppm | Volume (ml) of iodine to 10 ppm | Amount of iodine adsorbed to 50% influent, mg (iodine)/g carbon | % of static sorption capacity |
|---|---|---|---|---|---|---|
| PAC/NC, #617 | 269 | 57 | 850 | 1700 | 443 | 55[a] |
| PAC/NC, #618 | 287 | 46 | 750 | 1850 | 533 | 67[a] |
| PAC/NC, #619 | 356 | 44 | 600 | 1760 | 553 | 67[a] |
| PAC/NC, #620 | 297 | 55 | 850 | 2110 | 517 | 65[a] |
| PAC/NC, #621 | 322 | 44 | 850 | 2050 | 579 | 72[a] |
| Manufacturer "A" | 350 | 50[b] | <1[d] | 10[d] | 2[b] | 0.4[b,c] |
| Manufacturer "B" | 242 | 20-30[b] | <1[d] | 20[d] | 11-17[b] | 2.2-3.4[b,c] |
| Manufacturer "C" | 237 | 20-30[b] | <1[d] | 5[d] | 3-4[b] | 0.6-0.9[b,c] |

Notes:
[a] iodine number for Calgon WPH PAC is >800 mg/g. In this example it is taken to be 800 mg/g;
[b] estimated value;
[c] iodine number of 500 mg/g assumed for estimated carbon mass of A, B, and C media;
[d] three series of measurements, reproducible within each series. To avoid any possibility of by-pass due to lack of wetting, each sample was wet for 2 hours and then flushed as usual with RO water.

Example 24

Testing of samples as in Example 23 were repeated in this example, with the exception that the influent was 500 ppm compared to 20 ppm. Two different wavelengths were used to enhance the detection limit: 290 nm for the low concentration effluents, and 450 nm for the higher concentrations, where the detection limit is also approximately 3 ppm. A higher utilization capacity (76% through 147%) was attainable (Table 20) approaching and exceeding the lower value of the static limit as defined by the iodine number. The higher utilization with higher challenge concentrations can be explained by Langmuir or Freundlich adsorption isotherms that predict a higher retention of sorbate with higher concentrations. The values of static capacity greater than 100% is explained since the iodine number defined by Calgon Carbon, the manufacturer, is greater than 800 mg/g. The value of 800 mg/g was assumed in the calculation.

TABLE 20

Adsorption of iodine at 500 ppm input concentration by a single layer of PAC media

| Media | Basis weight, g/m² | % of carbon in media | Volume (ml) of adsorbed iodine solution to 250 ppm limit (50%) | Amount of iodine adsorbed to 50% influent, mg (iodine)/g carbon | % of static sorption capacity |
|---|---|---|---|---|---|
| PAC/NC, #617 | 269 | 57 | 180 | 1170 | 147[a] |
| PAC/NC, #618 | 287 | 46 | 94 | 712 | 89[a] |
| PAC/NC, #619 | 356 | 44 | 95 | 607 | 76[a] |
| PAC/NC, #620 | 297 | 55 | 103 | 630 | 79[a] |
| PAC/NC, #621 | 322 | 44 | 150 | 1060 | 133[a] |

Note:
[a]iodine number for Calgon Carbon Corp. WPH PAC is >800 mg/g. In this example it is taken to be 800 mg/g.

The high adsorption capacity of PAC-NC for soluble contaminants is directly translatable to an air filter, where volatile organic molecules are able to be adsorbed by the PAC that is incorporated into air filter.

Additionally, the PAC-NC medium operating in either air or water is capable of removing chlorine and bromine as rapidly as it removes iodine. This filter medium could be used in chemical processing where chlorine is a reactant. Notably, retention of chlorine from escape to the atmosphere such as via a vent gas is very important as it is detectable by human smell at about 0.3 parts per million and above, and has an irritation threshold of about 0.5 parts per million. Furthermore, the claimed PAC-NC medium is useful in preventing leakage of chlorine gas during transport.

Example 25

Dirt Holding Capacity

The dirt holding capacity of sample PAC-NC (sample 621) for A2 fine test dust (PTI, Inc) was measured and compared (Table 21) to NC media, The test involved challenging 25 mm diameter discs with 250 NTU suspension of A2 fine dust in RO water until the pressure drop reached 40 psi. Effluent turbidity was less than the detectable limit of 0.01 NTU throughout the test in each case, demonstrating that the shedding of powder into the effluent was minimal. The new carbon filled media was as effective at removing such dust as NC media. This was a surprising result because it was previously assumed that PAC consumes the ability of the NC media to adsorb particles.

TABLE 21

Dirt holding capacity at 250 NTU input concentration[a]

| Media | Capacity, mg/cm² |
|---|---|
| PAC/NC #621 | 118 |
| NC | 110 |

Note:
[a]corresponds to A2 fine dust load of ~350 ppm

Examples

Filtration Device

The following examples illustrate several embodiments of the claimed device. These examples should not be construed as limiting. All percentages are by weight.

The fibrous structures comprising the device were produced from microglass fibers obtained from Lauscha Fiber International (borosilicate glass, grade B-06-F, 0.6 μm diameter), aluminum powder from Atlantic Equipment Engineers (AL-100, 1-5 μm), cellulose cotton linter pulp (grade 512) from Buckeye Technologies Inc., PAC from Calgon Carbon (WPH grade, 99%-100 mesh, 95%-200 mesh and 90%-325 mesh, APS ~28 μm), bicomponent polyester fibers (grade T105, 3.0 denier, 0.25 inches long) from Invista, Rhoplex HA-16 from Rohm and Haas company, iodine impregnated (0.1%) PAC (90%-325 mesh) from Cameron Carbon, Inc., and a slurry of refined lyocell (20% in water) from Fiber Innovation Technology.

Example 26

Nanoalumina/Microglass/Silver Furnish

In the following examples, furnishes of nano alumina on microglass were prepared by mixing 2.89 grams of microglass fibers together with 1.92 g of cellulose and dispersed in 0.8 L, of RO purified water using a kitchen style blender (12 speed Osterizer blender) on a "low-clean" setting for 2 minutes. Aluminum powder (1.61 g) was added to the mixture which was then mixed manually.

Figure 17:
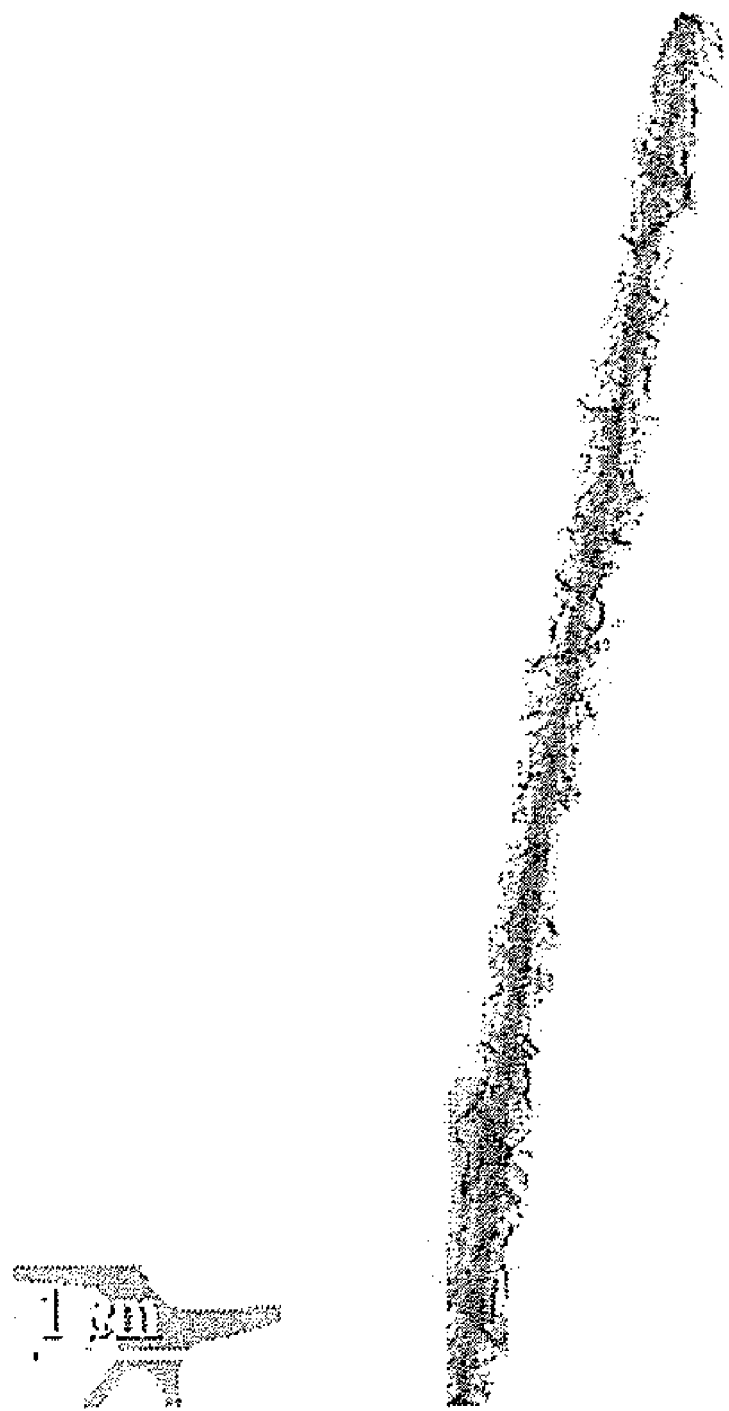

Ammonium hydroxide (8 ml of 36% per 800 ml of furnish) was added to initiate the reaction of aluminum with water to form the nano alumina (AlOOH) fibers and hydrogen. The mixture was boiled for about 10 minutes until the mixture turned white and was then cooled and neutralized to approximately pH 7 using hydrochloric acid. The transmission electron micrograph shown in FIG. 17 shows an example of a nano alumina fiber attached to a microglass fiber that resulted from the mixture described above. The nano alumina fibers are approximately 2-3 nm in diameter and approximately several hundred nm long.

Next, bicomponent polyester fiber (1.25 g) was homogenized in an Osterizer blender on a "low-clean" setting for 30 seconds and added to the furnish together with 0.1 g of Rhoplex after the nano alumina/microglass mixture was cooled and neutralized to increase the strength of the samples. Particles comprising silver components were mixed into the slurry either while the slurry was hot or after cooling but prior to blending. The furnish was diluted with 15 L of RO water and then drained through a screen to produce a fibrous structure that was about 0.8 mm thick with a basis weight of 220±20 g/m$^2$.

Table 22 shows the dynamic retention of MS2 virus and *E. coli* bacteria by various devices comprising the fibrous structures described above. There was no observable antimicrobial affect with neutral silver metal (samples #196 and 197) as compared to a control filter with no silver (sample 195). The bacteria assay of the last column was accomplished on fluid that was obtained off the front face of the filter by back-flushing. In contrast, when the fluid was filtered through devices comprising fibrous structures comprising silver ion particles deposited onto nano alumina fibers mixed with microglass fibers, there was a substantial reduction (about 2-4 orders of magnitude) in the amount of *E. coli* on the fibrous structure (samples 201-203).

for 2 minutes. The quantity of aluminum powder added to the mixture (0.61 g) was such that after reaction the solids would consist of 40 parts AlOOH and 60 parts lyocell fibers. Dry PAC powders were added before the aluminum-water reaction and the slurries were then manually mixed in a 1 L beaker and the aluminum-water reaction was carried out as in Example 26.

Table 23 shows the composition of PAC-containing furnishes with and without nano alumina fibers. As shown, the forming time with nano alumina is about 16% of that without nano alumina. The influent turbidity of the PAC-NC furnish was substantially below that without nano alumina, apparently as a result of the rapid attachment of the PAC to the NC. Macro fibrous agglomerations were formed that were visible in the stock solution in the case of nano alumina furnishes. Settling was very rapid when a half liter of stock solution of the lyocell furnish was mixed in a 750 ml beaker, occurring within 30-40 seconds, eventually clearing about 80% of the volume of the supernatant to a turbidity less than 10 NTU, while the PAC/lyocell (without nano alumina) furnish did not settle for several hours.

TABLE 22

Retention of Viruses and Retention/Elution of Bacteria by Silver-Treated Filters

| Sample # | Thickness, mm | Weight % fibers | Additive | MS2 % removal | *E. coli* % removal | *E. coli* back flushed from filter 24 hours later (cfu/mL) |
| --- | --- | --- | --- | --- | --- | --- |
| 188 | 0.8 | 0 | none | 21 | 86 | 32000 |
| 189 | 1.5 | 0 | none | 24 | 90 | 28000 |
| 190 | 0.4 | 0 | none | 17 | 70 | 56000 |
| 191 | 0.8 | 0 | none | 19 | 95 | 78000 |
| 194 | 1.6 | 40 | none | 99.992 | >99.9999 | 65000 |
| 195 | 1.5 | 40 | Ag gel | 99.994 | >99.9999 | 45000 |
| 196 | 1.5 | 40 | Ag gel | 99.998 | >99.9999 | 11000 |
| 197 | 1.6 | 40 | Ag colloid | 99.92 | >99.9999 | 35000 |
| 199 | 1.2 | 40 | Ag$_2$O + NH$_4$OH | 99.999 | 99.9998 | 4500 |
| 201 | 0.9 | 40 | AgClO$_4$ | 99.3 | 99.9998 | 51 |
| 202 | 0.9 | 40 | AgNO$_3$ | 98 | 99.9991 | 2300 |
| 203 | 0.9 | 40 | AgNO$_3$ | 85 | >99.9999 | 300 |

Example 27

Formation of PAC/Lyocell Furnish

Ten grams of refined lyocell (20% dry weight) were dispersed in 0.75 L of RO water using the same blender described in Example 26 and set to a "high-ice crush" setting Table 23 also shows that the effluent turbidity in the case of PAC-NC was approximately 12 times less than that when nano alumina is absent. When no nano alumina is present, a large fraction of activated carbon particles go into the drain, It is likely that these would be the smallest of the particles and the ones most likely to contribute to rapid adsorption kinetics.

The ability of the NC to form aggregates with PAC was demonstrated with lyocell as a substitute for microglass in the NC.

TABLE 23

Forming of PAC/lyocell furnishes

| Particle | Sample # | % Nano alumina | % Lyocell Fibers | % PAC at start | Forming time, min | Influent turbidity[a], NTU | Influent turbidity[b], NTU | Effluent turbidity[c], NTU |
|---|---|---|---|---|---|---|---|---|
| Calgon | 652 | 29 | 43 | 28 | 0.8 | 10 | <0.01 | 1.1 |
| PAC | 653 | 0 | 72 | 28 | 5.0 | 360 | 38 | 13 |

Note:
[a]turbidity measured 1 minute after mixing;
[b]turbidity measured 15 minutes after mixing
[c]turbidity measured immediately after sampling the effluent Example 28

PAC Handsheets

Table 24 shows the composition and properties of samples using component weights large enough to form 30 cm by 30 cm handsheets. Samples of PAC-NC were prepared as in Example 26, with the exception that cellulose was added prior to heating the mixture. PAC was added after the NC mixture was cooled and neutralized, along with bicomponent polyester fibers to increase the strength of the samples. In contrast to Examples 26 and 27, no Rhoplex-16 binder was added to the furnish in order to avoid deterioration of PAC properties, which is known in the In examples, the fibrous structure comprising PAC-NC is about 1.2 to about 2.0 mm thick depending in part on variations in the furnish and the amount of PAC added to the mixture. The pore size of the PAC-NC fibrous structure tends to be larger than that of structures only comprising NC, which imparts on PAC-NC fibrous structures a decreased flow resistance and an increased flow rate.

ciency of PAC/NC is compared to media from three manufacturers (A, B, and C) that were sectioned from cartridges (64 mm diameter and 250 mm long) obtained commercially.

Iodine solutions were passed through a single layer, 25 mm diameter disc of media sectioned from handsheets (Table 24) at a flow rate of 50 ml/min. Two ml aliquots were collected into a cuvette (1 cm path length) and the iodine concentration was measured with a Genesys-10 UV/VIS spectrophotometer (detection limit of 0.3 ppm iodine). For a 20 ppm iodine test, the absorbance values of both the stock solution and the effluent were measured at a wavelength of 290 nm.

Table 19 shows the volume of fluid that passed through the filters to reach 0.5 ppm and 10 ppm (50% of influent). The 0.5 ppm level is detectable to an average person drinking water and beyond that level the water becomes unpalatable. FIG. 16 shows a breakthrough curve for sample 617 that depicts the effect of iodine adsorption by one layer of fibrous structures compared to the commercially available media A, B, and C described above. In order to avoid any possibility of by-pass

TABLE 24

Composition and Properties of PAC/NC Test Filters

| Media | AlOOH, % | % Cellulose | % polyester fibers | % glass micro fibers | % PAC | Thickness, mm | Basis weight g/m$^2$ | Breaking length, dry, m | Average pore size, μm |
|---|---|---|---|---|---|---|---|---|---|
| 616 | 15 | 9 | 8 | 16 | 52 | 1.2 | 276 | 117 ± 4 | 3.8 |
| 617 | 14 | 8 | 8 | 13 | 57 | 1.2 | 269 | 111 ± 12 | 3.7 |
| 618 | 15 | 9 | 16 | 14 | 46 | 1.5 | 287 | 217 ± 6 | 4.8 |
| 619 | 12 | 7 | 25 | 12 | 44 | 2.0 | 356 | 691 ± 50 | 5.8 |
| 620 | 12 | 7 | 14 | 12 | 55 | 1.2 | 297 | 345 ± 50 | 3.9 |
| 621 | 11 | 7 | 27 | 11 | 44 | 1.9 | 322 | 651 ± 110 | 6.8 |
| NC[b] | 35 | 21 | 13 | 31 | 0 | 0.8 | 200 | 242 ± 20 | 2.3 |

Note:
[a]breaking length measured by TAPPI T-494 om-96 test method;
[b]handsheet of NC media was prepared as described in Example 26, with the exception that silver particles were not added to the mixture.

Example 29

The purpose of this series was to measure the dynamic adsorption efficiency of the fibrous structure at input concentrations of 20 ppm iodine in RO water. The ASTM iodine number, which relates saturation by iodine under static conditions, is the most popular figure of merit for activated carbons. In this example, the dynamic iodine adsorption effidue to lack of wetting, each sample was wet for 2 hours and then flushed as usual with RO water.

As shown in Table 19, a single layer of any of the commercially available media A, B, or C (approximately equivalent basis weight to the claimed PAC-NC fibrous structures) almost immediately allows iodine into the effluent that is at a level that is detectable by taste and odor. In contrast, the fibrous structures comprising PAC-NC passed approximately 800 ml of solution containing 20 ppm iodine before the level of iodine in the effluent reached 0.5 ppm. This extraordinary dynamic capacity compared to commercial media (greater than 800 to 1) was not anticipated, and is particularly surprising given the high flow rate and that the fibrous media comprised a single layer of the PAC-NC mixture.

The amount of iodine adsorbed to 10 ppm is also shown in Table 19, along with a calculated value of iodine capacity, comparing the mass of iodine removed under dynamic conditions versus the static adsorption capacity from manufacturers' published iodine numbers. The samples made from fibrous structures comprising the PAC/NC mixture all had similar breakthrough curves, with each retaining approximately 55%-72% of the iodine number, while the capacities of the commercial media to 10 ppm (50% of the influent) was at most only 1.4%.

Example 30

Figure 18:
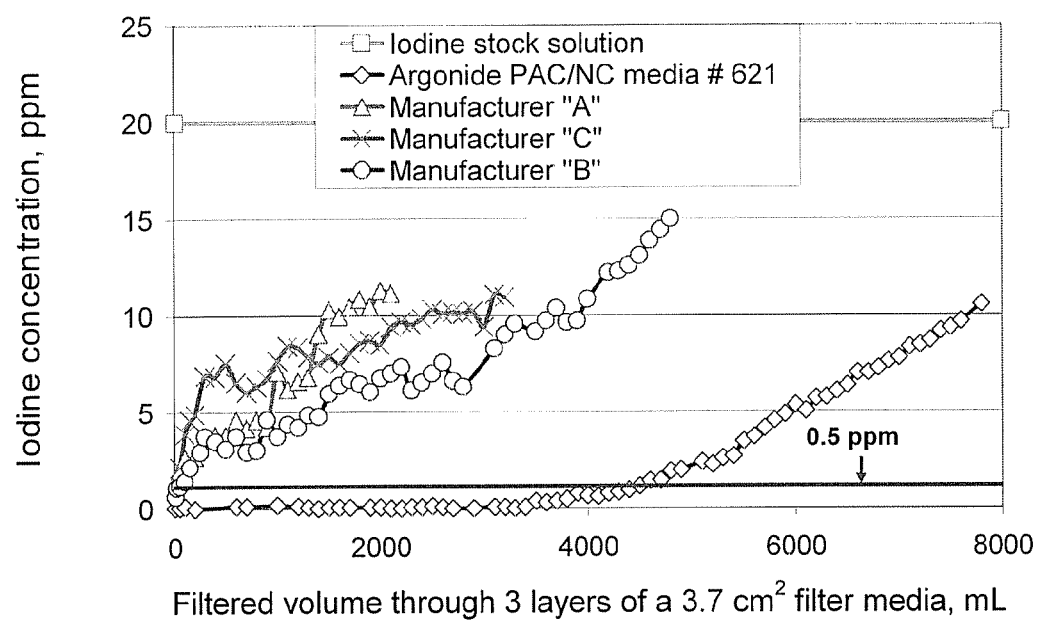

Example 29 was repeated with several samples, with the exception that the test involved three layers of sample 617 (fibrous structure comprising the PAC/NC mixture) compared to commercially available media A, B, and C. Table 25 shows the volume of effluent required to reach 0.5 ppm and 10 ppm (50% of influent) and FIG. 18 show breakthrough curves for sample 621 and commercially available media A, B, and C depicting the effect of three layers of the claimed fibrous structure on iodine adsorption.

The data show that three layers of the commercially available media almost immediately (within about 5-8 ml) allows iodine into the effluent at levels that are detectable by both taste and odor. In contrast, the data show that approximately 3800 ml of solution containing 20 ppm iodine were passed through the claimed fibrous structure comprising the PAC-NC mixture before iodine in the effluent reached 0.5 ppm, an improvement of about 500 to 1.

The amount of Iodine adsorbed to 10 ppm is also shown in Table 25 with a calculated value of iodine capacity, comparing the mass of iodine removed by the claimed fibrous structure comprising the PAC/NC mixture to the static adsorption capacity from manufacturers' iodine number values. PAC/NC (sample 621) retained approximately 91% of the static capacity for iodine. Two of commercial media attained 59% and 85%, but only at concentrations significantly greater than the 0.5 ppm level, e.g. at 10 ppm (50%) of the input concentration and higher.

TABLE 25

Adsorption of 20 ppm iodine by three layers of media

| Media | Basis weight, Layer, g/m$^2$ | % of carbon in media | Volume (ml) of iodine to 0.5 ppm | Volume (ml) of iodine to 10 ppm | Iodine adsorbed to 50% influent, mg (iodine)/ g carbon | % of static sorption capacity |
|---|---|---|---|---|---|---|
| PAC/NC, #621 | 322 | 44 | 3800 | 7800 | 734 | 91[a] |
| Manufacturer "A" | 350 | 50[b] | 5[d] | 1600[d] | 122[b] | 15[b,c] |
| Manufacturer "B" | 242 | 30[b] | 8[d] | 3700[d] | 680[b] | 85[b,c] |
| Manufacturer "C" | 237 | 30[b] | 5[d] | 2500[d] | 470[b] | 59[b,c] |

Notes:
[a] iodine number for Calgon WPH PAC is >800 mg/g. Calculation assumes it is 800 mg/g;
[b] estimated value;
[c] iodine number of 800 mg/g assumed for total mass of A, B, and C media;
[d] three series of measurements, reproducible within each series.

TABLE 26

Retention of *B. diminuta* bacteria by a single layer of NC

| Media | Thickness, mm | Basic weight, g/m$^2$ | Challenge water pH | TDS[a] g/L | BD, CFU[c]/ml | *B. diminuta* retention, % 0-10 ml | 60-70 ml | 130-140 ml |
|---|---|---|---|---|---|---|---|---|
| Nano alumina | 0.8 | 200 | 7.2 | 0 | 7·10$^5$ | 99.997 | 99.97 | 99.93 |
| | | | 9.2 | 0 | 1.3·10$^6$ | 99.99 | 99.9 | |
| | | | 7.2 | 30 | 1.2·10$^6$ | 99.9 | 99.7 | |

Note:
[a] total dissolved solids (TDS) as NaCl.

Example 31

Salt and High Alkalinity Affects on Retention

Table 26 shows the retention of *B. diminuta* bacteria by discs of NC media. Discs were continuously challenged with bacteria-laden fluid, with aliquots extracted initially and at two later intervals. The data show that the deterioration of adsorption efficiency is minimal with increasing loads of bacteria, under conditions of high pH, or in a background of sea salt.

Table 27 shows the retention of MS2 virus by such discs under a similar regimen. There was greater efficiency loss as compared to that seen with *B. diminuta*. Nevertheless, the retention still exceeded 90% in all cases. The retention of both bacteria and virus are substantially increased by increasing the number of layers of the fibrous structure. For example, a device comprising three layers of fibrous structure comprising NC (as prepared in Example 26, except without the addition of silver salt) is capable of 6 LRV of bacteria and 4 LRV of virus in a clean water background. Further layers are required to compensate for the burden of background natural organic matter, such as humic acid, that competes with the microbes for adsorption sites.

TABLE 27

Retention of MS2 By a Single Layer of NC

| Media | Thickness, mm | Basic weight, g/m² | pH | TDS[a] g/L | MS2[b], PFU/ml | MS2 removal, % 0-10 ml[c] | 60-70 ml[c] | 130-140 ml[c] |
|---|---|---|---|---|---|---|---|---|
| Nano alumina | 0.8 | 220 | 7.2 | 0 | $6 \cdot 10^5$ | 99.5 | 99.5 | 99.8 |
|  |  |  | 9.2 | 0 | $5 \cdot 10^5$ | 99.0 | 96.2 |  |
|  |  |  | 7.2 | 30 | $5 \cdot 10^5$ | 99.4 | 98.6 |  |
|  |  |  | 9.2 | 30 | $4 \cdot 10^5$ | 97 | 90 |  |

Notes:
[a]Total Dissolve Solids (TDS) - sea salts;
[b]MS2 input concentration, Plaque Forming Units (PFU);
[c]10 ml aliquots passed through 25 mm discs at 60 ml/min and collected into sterile vials.

Example 32

Device Comprising Iodinated PAC/NC//PAC/NC Fibrous Structures In A Spiral Wound Cartridge FIG. 20 shows a schematic of the internal construction of a filter cartridge comprising the claimed fibrous structures arranged in a spiral wound configuration that is used for purification of drinking water. In an example, a perforated polypropylene tube [1], purchased from Bentonville Plastics and having a diameter of about 33 mm and a length of about 125 mm, is used as a mandrel. The device has a first layer [2] that is comprised of two wraps of Typar scrim (commercially available from BBA Fiberweb). Two upstream fibrous structures (i.e., y=2) comprising the PAC/NC mixture [3] for filtration of iodine from the first layer are positioned upstream from ten downstream fibrous structures (i.e., n=10) comprising the PAC/NC mixture [4], with about 0.1% iodine in the PAC and with the PAC constituting about 57% in the NC. Optionally, an outer layer of glass media [5] having a pore size of approximately 8 μm is wrapped around the upstream iodine impregnated PAC/NC layer. In this example, the outer diameter of the wrap is approximately 68 mm. The purpose of the outer layer [5] is to serve as a prefilter for the removal of coarse particulates.

Preferably, the cartridge is end capped with a double open-ended arrangement using FDA approved two-component epoxy 7227 (Epic Resins) or plastisol (International Coatings, Inc). The cartridge is then placed into a housing with an inlet providing flow of contaminated water from the outside diameter through the several layers of fibrous structures and then out the central axis as clean and sanitized water.

The device shown in FIG. 20 is useful for in-line removal of microbes in a plumbed-in system, where the municipal water pressure delivered is about 3.5-5 bar. The data shown in Table 28 were collected from a sub-scale version of the filter described above and using a plurality of 25 mm discs to represent the layers shown schematically in FIG. 19. Additionally, the data in Table 28 show that the claimed device is capable of retaining greater than about 6 LRV of bacteria, greater than about 4 LRV of virus, and greater than about 3 LRV of 4.3 μm latex beads (used as a cyst surrogate) in a background of water containing fine test dust and also containing 10 ppm of total organic carbon as humic acid with a total turbidity of greater than 30 NTU (see Table 28).

Extrapolation of the data collected from the sub-scale device (see FIG. 20) suggests that the full-scale device is capable of 9100 L, capacity, starting with a flow rate greater than about 20 lpm and decreasing to about 8 lpm at 8000 L and then to 2 lpm at 9100 L.

TABLE 28

Retention of microbes by sub-scale iodine impregnated PAC[a]/NC filter[b] to EPA protocol[c]

| Test point | Pressure drop[d] bar | Test water Type | Test water Turbidity NTU | Test water pH | MS2, PFU/ml Influent PFU/ml | MS2, PFU/ml LRV | E. coli, CFU/ml Influent CFU/ml | E. coli, CFU/ml LRV |
|---|---|---|---|---|---|---|---|---|
| Start | 0.9 | RO water | <0.01 | 7.0 | $5.0 \cdot 10^4$ | >4.7 | $2.3 \cdot 10^6$ | >6.7 |
| Day 3 (middle) | 1.5 | RO water | <0.01 | 7.0 | $3.3 \cdot 10^4$ | >4.5 | $3.3 \cdot 10^6$ | 6.2 |
| Day 6 (middle) | 2.2 | RO water | <0.01 | 7.0 | $1.5 \cdot 10^5$ | 4.9 | $3.0 \cdot 10^6$ | 6.2 |
| After 48 hrs stagnation | 2.2 | RO water | <0.01 | 7.0 | $6.0 \cdot 10^5$ | >5.5 | $2.2 \cdot 10^6$ | >6.3 |
| Day 7 (middle) | 2.7 | EPA #3 | 30.8 | 8.8 | $1.2 \cdot 10^6$ | >5.8 | $2.1 \cdot 10^6$ | >6.3 |
| Day 8 (near end) | 2.7[e] | EPA #3 | 31.8 | 9.2 | $1.3 \cdot 10^6$ | 6.1 | $1.3 \cdot 10^6$ | >6.1 |
| After 48 hrs stagnation | 2.7[f] | EPA #3 | 31.0 | 9.0 | $2.1 \cdot 10^6$ | >6.0 | $1.5 \cdot 10^6$ | >6.2 |
| Day 10½ | 2.7[g] | EPA #3 | 31.0 | 9.0 | $3.0 \cdot 10^6$ | >6.2 | $1.5 \cdot 10^6$ | >6.5 |

Notes:
[a] 0.1% wt % iodine in PAC (Cameron Carbon);
[b] 10 layers of NC containing 0.1% wt % iodine in PAC (57% PAC in NC) followed by 2 layers of PAC (57%)/NC;
[c] sampling plan: 33 ppm humic acid (Na salt) used to adjust TOC of EPA water #3 to >10 ppm;
[d] @ 11 ml/cm²/min;
[e] @ 7 ml/cm²/min;
[f] @ 5 ml/cm²/min;
[g] @ 5 ml/cm²/min.

Example 33

Device Comprising Iodinated PAC/NC//NC//PAC/NC Fibrous Structures Arranged in a Spiral Design Example 32, described above, was repeated except that the fibrous structures were arranged in the following configuration: Four upstream fibrous structures (i.e., y=4) comprising the PAC/NC mixture were impregnated with 0.1% iodine followed by six downstream fibrous structures (i.e., n=6) comprising the NC mixture. Optionally, an outer (upstream) layer of glass media [5] having a pore size of approximately 8 µm is wrapped around the upstream iodine impregnated PAC/NC fibrous structure.

Extrapolation of the data collected from the sub-scale device (see FIG. 20) suggests that the full-scale device is capable of retaining about 6 LRV of bacteria, about 4 LRV of virus, and about 3 LRV of cyst surrogate (4.3 µm latex beads) to the EPA protocol (see Table 29).

TABLE 29

Retention of microbes by sub-scale iodine impregnated PAC[a]/NanoCeram filter[b] to EPA protocol[c]

| Test point | Pressure drop[d], Bar | Test water Type | Test water Turbidity NTU | Test water pH | MS2, PFU/ml Influent PFU/ml | MS2, PFU/ml LRV | E. coli, CFU/ml Influent CFU/ml | E. coli, CFU/ml LRV |
|---|---|---|---|---|---|---|---|---|
| Start | 0.9 | RO water | <0.01 | 7.0 | $5.0 \cdot 10^4$ | >4.7 | $2.3 \cdot 10^6$ | >6.7 |
| Day 3 (middle) | 1.5 | RO water | <0.01 | 7.0 | $3.3 \cdot 10^4$ | >4.5 | $3.3 \cdot 10^6$ | >6.8 |
| Day 6 (middle) | 2.2 | RO water | <0.01 | 7.0 | $1.5 \cdot 10^5$ | >5.2 | $3.0 \cdot 10^6$ | >6.8 |
| After 48 hrs stagnation | 2.2 | RO water | <0.01 | 7.0 | $6.0 \cdot 10^5$ | >5.5 | $2.2 \cdot 10^6$ | >6.3 |
| Day 7 (middle) | 2.7 | EPA #3 | 30.8 | 8.8 | $1.2 \cdot 10^6$ | >5.8 | $2.1 \cdot 10^6$ | >6.3 |
| Day 8 (near end) | 2.7[e] | EPA #3 | 31.8 | 9.2 | $1.3 \cdot 10^6$ | 4.6 | $1.3 \cdot 10^6$ | >6.1 |
| After 48 hrs stagnation | 2.7[f] | EPA #3 | 31.0 | 9.0 | $2.1 \cdot 10^6$ | >6.0 | $1.5 \cdot 10^6$ | 6.2 |
| Day 10½ | 2.7[g] | EPA #3 | 31.0 | 9.0 | $3.0 \cdot 10^6$ | >6.2 | $1.5 \cdot 10^6$ | 6.2 |

Notes:
[a] 0.1% wt % iodine in PAC;
[b] four layers of (a) containing 57% PAC in NC following by 6 layers of NC and then 2 layers of 57% PAC/NC;
[c] sampling plan as in Example 32;
[d] @ 11 ml/cm²/min;
[e] @ 3 ml/cm²/min;
[f] @ 2 ml/cm²/min;
[g] @ 1 ml/cm²/min.

Example 34

Device Comprising Silver Impregnated NC Fibrous Structures Arranged in a Hybrid Cartridge Design The data shown in Table 30 show the retention of E. coli and MS2 virus by a subscale point of use filter using a 7 µm pore size prefilter in front of fibrous structure comprising NC and impregnated with silver (1%, see Example 8). FIG. 19 is a schematic showing the internal construction of a hybrid filter cartridge having a pleated fibrous structure that surrounds eight spiral wound upstream fibrous structures (i.e., y=8) comprising the NC mixture impregnated with silver. In another example, the upstream spiral wound fibrous structure comprises the PAC/NC mixture and further comprises PAC impregnated with silver or an antimicrobial such as silver or at least one halogen. In an example, the PAC is purchased as impregnated with silver (Cameron Carbon or Calgon Carbon) or the PAC-NC fibrous structure may be treated with an iodine solution either prior to assembly or even after assembly into a filter cartridge. In another example, the upstream PAC layer is impregnated with another halogen such as chlorine, bromine, or a metal known to deactivate microbes (zinc and copper).

A schematic of the device is shown in FIG. 19. One upstream fibrous structure (i.e., y=1) comprising NC and silver particles deposited on the nano alumina fibers (as in Example 27 above) was inserted into a 51 mm diameter filter holder with an effective filtration area of 26 cm$^2$ to simulate the pleated section. Eight downstream fibrous structures (i.e., n=8) comprising the NC mixture, having a 25 mm diameter, were used to simulate the spiral wound section. The discs were held by 25 mm diameter filter holders with effective area of 3.7 cm$^2$.

Table 30 shows the results of testing a sub-scale version of the hybrid device depicted schematically in FIG. 19. As shown, the device is capable of removing greater than 5 LRV of bacteria and 4 LRV of virus in a background of dust and natural organic matter. The device is also capable of filtering and sanitizing (by iodine) cysts that are about 4 still in size.

Extrapolation of the data collected and described above demonstrate that full-scale cartridges having diameters of 63 mm and lengths of 250 mm, for example, would be capable of 16 lpm of flow at the start of flow, 8 lpm of flow at 4000 L and 4 lpm of flow at 8000 L. Additionally, the data demonstrate that a single water purification cartridge, such as the ones shown schematically in FIGS. 19 and 20, for example, having a conventional housing and dimensions of 63 mm diameter and 250 mm length, can remove cysts, bacteria and virus to the EPA standard and achieve that standard for large (e.g., 8000 liters) volumes of water at acceptable flow rates. A device capable of achieving such results is not known in the art.

TABLE 30

MS2 and *E. coli* testing of a sub-scale POU NC media

| Test point (liters) | Pressure drop, psi | Influent *E. coli* CFU/ml | *E. coli* LRV[a] | Influent MS2 CFU/ml | MS2 LRV[a] |
|---|---|---|---|---|---|
| 8.9[b] | 30 | 2.9 · 10$^5$ | >6.0 | 1.5 · 10$^4$ | >4.2 |
| After 63 hrs of stagnation[c] | 27 | 2.9 · 10$^5$ | >5.8 | 1.5 · 10$^4$ | >4.2 |
| 19.8[b] | 36 | 1.3 · 10$^5$ | >5.0 | 7 · 10$^4$ | >4.8 |
| After 15 hrs of stagnation[c] | 36 | 1.3 · 10$^5$ | >5.4 | 7 · 10$^4$ | >4.8 |
| 28.1[b] | 36 | 6.8 · 10$^5$ | >6.1 | 6.9 · 10$^4$ | >4.8 |
| After 15 hrs of stagnation[c] | 36 | 6.8 · 10$^5$ | >6.1 | 6.9 · 10$^4$ | >4.8 |
| 40.0[b] | 27 | 1.8 · 10$^5$ | >5.6 | 6.9 · 10$^4$ | >5.1 |
| After 15 hrs of stagnation[c] | 26 | 1.8 · 10$^5$ | >5.6 | 6.9 · 10$^4$ | >4.8 |
| 54.9[b] | 40 | 4.9 · 10$^5$ | >6.3 | 3.9 · 10$^4$ | 4.7 |
| After 15 hrs of stagnation[c] | 40 | 4.9 · 10$^5$ | >6.0 | 3.9 · 10$^4$ | 4.5 |
| 62.5[b] | 34 | 1.0 · 10$^5$ | >5.3 | 1.9 · 10$^4$ | >4.4 |
| After 15 hrs of stagnation[c] | 34 | 1.0 · 10$^5$ | >5.3 | 1.9 · 10$^4$ | >4.3 |
| 72[b] | 40 | 1.0 · 10$^5$ | >5.3 | 1.0 · 10$^4$ | >4.0 |
| After 15 hrs of stagnation[c] | 40 | 1.0 · 10$^5$ | >5.3 | 1.0 · 10$^4$ | >4.0 |

Notes:
[a] Logarithm Removal Value;
[b] 100 ml aliquot was collected into a sterile vial at a flow rate of 30 ml/min;
[c] 50 ml aliquot collected immediately after the start of filtration.

CALCULATIONS

From the data shown in Table 1, the air permeability B(m$^2$) for the samples were determined as:

$$B = v\mu z/\Delta P, \qquad [2]$$

where:
v—flow velocity, m/s at a given ΔP
μ—air viscosity. For air—μ=18.6·10$^{-6}$ Pa s
z—thickness of the media
ΔP—pressure drop across the media, Pa Equation 2 assumes that the flow through the filter is in the viscous range. Moreover, in the case of gas-flow measurements it requires two additional conditions: (i) the pore diameters are larger than 1 micron (ii) the absolute pressure on the upstream face is no greater than 1.1 times of that on the downstream face, i.e., the upstream gage pressure should be no more than 40 inches of H$_2$O, when the downstream gage pressure is zero (i.e., 400 inches of H$_2$O absolute). When those two conditions are met Equation 2 may be used to deduce permeability.

From Eq. [2] and FIG. 1 the permeability of filter media was determined. From the permeability value and porosity the flow-averaged flow diameter, d, was determined as:

$$d^2 = 32B/\epsilon^2 \qquad [3]$$

where ε—porosity.

Flow diameters d are shown in Table 1. The average pore size of the nano alumina media ranged from 4.2 to 38 μm.

From FIG. 1 as well as similar graphs for the other samples, the dependence of linear velocity of air through the media versus the applied pressure drop was determined and is shown in Table 1. From these equations the air ΔP (in mm water, gauge) at a linear flow of 3.2 m/min are compared with that of the HEPA.

While the foregoing has been set forth in considerable detail, it is to be understood that the examples and detailed embodiments are presented for elucidation and not limitation. Design variations, especially in matters of shape, size, and arrangements, may be made but are within the principles of the invention. Those skilled in the art will realize that such changes or modifications of the invention or combinations of elements, variations, equivalents, or improvements therein are still within the scope of the invention as defined in the appended claims and that the present invention may be suitably practiced in the absence of any limitation not explicitly described in this document.

We claim:

1. A filtration device, said filtration device comprising at least one cartridge, each said cartridge having a support member that supports at least one fibrous structure, each said fibrous structure comprising nano alumina fibers and second fibers mixed with said nano alumina fibers, wherein said second fibers are arranged to create asymmetric pores.

2. A filtration device as in claim 1 wherein at least one of said fibrous structures further comprises a plurality of particles deposited on said nano alumina fibers.

3. A filtration device as in claim 2 wherein said particles are selected from the group consisting of fine particles, ultrafine particles, and nanosize particles.

4. A filtration device as in claim 1 wherein at least one of said cartridges comprises 1+y upstream fibrous structures and 1+n downstream fibrous structures, wherein y is any integer from 0 to y, and wherein n is any integer from 0 to n.

5. A filtration device as in claim 2 wherein said particles comprise an antimicrobial agent.

6. A filtration device as in claim 5 wherein said antimicrobial agent is selected from the group consisting of powdered activated carbon, impregnated powdered activated carbon, silver, copper, zinc, at least one halogen, organic chemical powders, and a combination thereof.

7. A filtration device as in claim 6 wherein said impregnated powdered activated carbon is impregnated with an impregnant selected from the group consisting of at least one halogen, silver, zinc, copper, chloramine, and a combination thereof.

8. A filtration device as in claim 6 wherein said impregnated powdered activated carbon is impregnated with iodine.

9. A filtration device as in claim 1 wherein said filtration device is used to purify drinking water.

10. A filtration device as in claim 1 wherein said nano alumina fibers have an aspect ratio that is greater than about 5 and a lesser dimension that is less than about 50 nm.

11. A device for purifying drinking water, said device comprising 1+y upstream fibrous structures and 1+n downstream fibrous structures, wherein y is any integer from 0 to y and wherein n is any integer flom 0 to n, each said fibrous structure comprising nano alumina fibers and second fibers mixed with said nano alumina fibers, said second fibers arranged to create asymmetric pores, said 1+y upstream fibrous structures further comprising a plurality of particles deposited on said nano alumina fibers.

12. A device as in claim 11 wherein said device is combined with an antimicrobial source, said source being positioned upstream from said device.

13. A device as in claim 11 wherein said particles are selected from the group consisting of fine particles, ultrafine particles, and nanosize particles.

14. A device as in claim 11 wherein said particles are selected from the group consisting of an antimicrobial agent, powdered activated carbon, impregnated powdered activated carbon, silver, copper, zinc, at least one halogen, organic chemical powders, and a combination thereof.

15. A device as in claim 11 wherein said particles are iodine.

16. A device as in claim 11 wherein said particles are an antimicrobial agent.

17. A device as in claim 11 wherein said particles are powdered activated carbon.

18. A device as in claim 17 wherein said powdered activated carbon is impregnated.

19. A device as in claim 18 wherein said impregnated powdered activated carbon is impregnated with an impregnant selected from the group consisting of an antimicrobial agent, silver, copper, zinc, chloramine, at least one halogen, and a combination thereof.

20. A device as in claim 18 wherein said impregnated powdered activated carbon is impregnated with iodine.

21. A device as in claim 11 wherein said 1+n downstream fibrous structures further comprise a plurality of particles deposited on said nano alumina fibers.

22. A device as in claim 21 wherein said particles are selected from the group consisting of fine particles, ultrafine particles, and nanosize particles.

23. A device as in claim 21 wherein said particles are selected from the group consisting of an antimicrobial agent, powdered activated carbon, impregnated powdered activated carbon, silver, copper, zinc, at least one halogen, and a combination thereof.

24. A device as in claim 11 wherein said device is capable of sanitizing water to at least one of the following: a. greater than about 6 LRV of bacteria; b. greater than about 4 LRV of virus; and c. greater than about 3 LRV of cysts.

25. A device as in claim 11 wherein at least one of said fibrous structures is capable of retaining at least about 99.9% of fine particle dust.

26. A device as in claim 11 wherein said upstream and downstream fibrous structures are unified.

27. A device as in claim 11 further comprising a prefilter.

28. A filtration device as in claim 4 wherein said upstream and downstream fibrous filters are unified in a single fibrous structure.

29. A filtration device as in claim 1 wherein said device is portable.

30. A filtration device as in claim 29 wherein said portable device operates without the use of a pump.

* * * * *